United States Patent
Ueda

[11] Patent Number: 6,108,450
[45] Date of Patent: Aug. 22, 2000

[54] THRESHOLD MATRIX-EMPLOYED ERROR DIFFUSION IMAGE CONVERSION METHOD

[75] Inventor: Masashi Ueda, Nagoya, Japan

[73] Assignee: Brother Kogyo Kabushiki Kaisha, Nagoya, Japan

[21] Appl. No.: 08/971,189

[22] Filed: Nov. 17, 1997

[30] Foreign Application Priority Data

Nov. 19, 1996 [JP] Japan .................................. 8-308341
Nov. 19, 1996 [JP] Japan .................................. 8-308342
Nov. 19, 1996 [JP] Japan .................................. 8-308343

[51] Int. Cl.$^7$ ...................................................... G06K 9/36
[52] U.S. Cl. .......................................... 382/237; 382/270
[58] Field of Search .................................... 382/237, 254, 382/270–273; 358/455–457, 463, 465

[56] References Cited

U.S. PATENT DOCUMENTS

| | | | |
|---|---|---|---|
| 5,111,310 | 5/1992 | Parker et al. ............................ | 358/456 |
| 5,204,760 | 4/1993 | Murayama et al. ..................... | 358/456 |
| 5,535,020 | 7/1996 | Ulichney ................................. | 358/467 |
| 5,818,604 | 10/1998 | Delabastita et al. .................... | 358/456 |
| 5,911,007 | 6/1999 | Miyake ................................... | 382/233 |

OTHER PUBLICATIONS

Floyd, R., et al., "An Adapative Algorithm for Spatial Greyscale," *Proceeding of the S.I.D.,* vol. 17/2, Second Quarter 1976, pp. 75–77.

Billotet–Hoffmann, C., et al., "On the Error Diffusion Technique for Electronic Halftoning," *Proceedings of the S.I.D.,* vol. 24/3, 1983, pp. 253–258.

Jarvis, J.F., et al., "A Survey of Techniques for the Display of Continuous Tone Pictures on Bilevel Displays," *Computer Graphics and Image Processing,* 5, 1976, pp. 13–40.

Ulichney, R., "The void–and–cluster method for dither array generation," *SPIE* vol. 1913, (1993), pp. 332–343.

*Primary Examiner*—Thomas D. Lee
*Assistant Examiner*—Stephen Brinich
*Attorney, Agent, or Firm*—Oliff & Berridge, PLC

[57] ABSTRACT

An input density for a subject pixel position (x, y) is retrieved in S230. A modified density value I'(x, y) is calculated in S240 based on the input density value I(x, y) and the error e(x, y) stored in the corresponding error buffer. Then, in S250, a discrimination value for the subject pixel position (x, y) is retrieved from the bilevel threshold value matrix Mat2( ) which is produced through the blue noise characteristic method. One of two threshold values is assigned to the retrieved discrimination value. Thus, a threshold value T is determined for the subject pixel (x, y). Then, an output density value O(x, y) is determined based on the modified density value I'(x, y) and the threshold value T in S260, S270, and S280. Then, an error value E(x,y) is calculated based on the output density value O(x, y) and the modified density value I'(x, y). The error value E(x,y) is distributed to the error buffer 16 in S300 dependently on the error distribution matrix Bat( ). The above-described process is performed onto all the pixels of the input image.

60 Claims, 44 Drawing Sheets

FIG. 2

| 2 | 130 | 34 | 162 | 10 | 138 | 42 | 170 |
|---|---|---|---|---|---|---|---|
| 226 | 66 | 194 | 98 | 234 | 74 | 202 | 106 |
| 50 | 178 | 18 | 146 | 58 | 186 | 26 | 154 |
| 218 | 114 | 242 | 82 | 210 | 122 | 250 | 90 |
| 14 | 142 | 46 | 174 | 6 | 134 | 38 | 166 |
| 238 | 78 | 206 | 110 | 230 | 70 | 198 | 102 |
| 62 | 190 | 30 | 158 | 54 | 182 | 22 | 150 |
| 214 | 126 | 254 | 94 | 222 | 118 | 246 | 86 |

~Mat( )

PIXEL (THRESHOLD)

FIG. 3

SUBJECT PIXEL
PIXEL POSITION (x, y)

|  | i=−2 | i=−1 | i=0 | i=1 | i=2 |
|---|---|---|---|---|---|
| j=0 |  |  | * | 7/48 | 5/48 |
| j=1 | 3/48 | 5/48 | 7/48 | 5/48 | 3/48 |
| j=2 | 1/48 | 3/48 | 5/48 | 3/48 | 1/48 |

~Bmat'( )

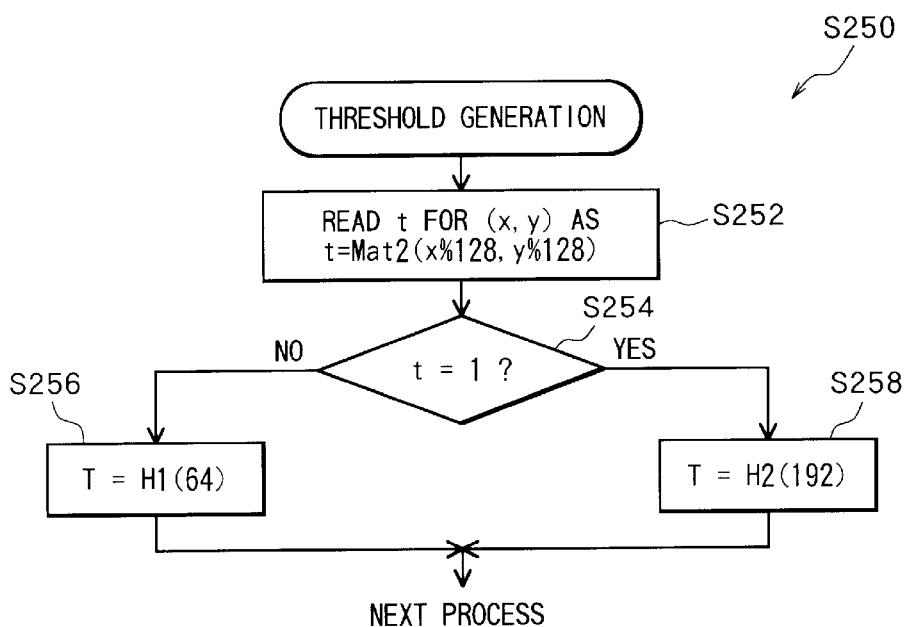

FIG. 16 (a)

| ELEMENT POSITION (X,Y) \ DENSITY VALUE i | 0 | 1 | 2 | 3 | 4 | 5 | 6 | ... | 255 |
|---|---|---|---|---|---|---|---|---|---|
| ⋮ | ⋮ | ⋮ | ⋮ | ⋮ | ⋮ | ⋮ | ⋮ | | ⋮ |
| (15, 36) | ○ | ○ | ● | ● | ● | ● | ● | ... | ● |
| (15, 37) | ○ | ○ | ○ | ○ | ○ | ● | ● | ... | ● |
| (15, 38) | ○ | ○ | ○ | ○ | ○ | ○ | ○ | ... | ● |
| (15, 39) | ○ | ○ | ○ | ○ | ● | ● | ● | ... | ● |
| (15, 40) | ○ | ○ | ○ | ● | ● | ● | ● | ... | ● |
| ⋮ | ⋮ | ⋮ | ⋮ | ⋮ | ⋮ | ⋮ | ⋮ | | ⋮ |

○ : OFF
● : ON

FIG. 16 (b)

| ELEMENT POSITION (X,Y) \ DENSITY VALUE i | 0 | 1 | 2 | 3 | 4 | 5 | 6 | ... | 255 |
|---|---|---|---|---|---|---|---|---|---|
| ⋮ | ⋮ | ⋮ | ⋮ | ⋮ | ⋮ | ⋮ | ⋮ | | ⋮ |
| (15, 36) | ○ | ○ | ● | ○ | ● | ○ | ○ | ... | ● |
| (15, 37) | ○ | ○ | ○ | ● | ● | ○ | ● | ... | ● |
| (15, 38) | ○ | ○ | ○ | ○ | ● | ● | ○ | ... | ● |
| (15, 39) | ○ | ○ | ○ | ● | ○ | ● | ○ | ... | ● |
| (15, 40) | ○ | ● | ○ | ○ | ● | ● | ○ | ... | ● |
| ⋮ | ⋮ | ⋮ | ⋮ | ⋮ | ⋮ | ⋮ | ⋮ | | ⋮ |

FIG. 26

| 0 | 0 | 1 | | 1 |
|---|---|---|---|---|
| 1 | 1 | 0 | | |
| 0 | 0 | 0 | | |
| | 1 | 1 | | |
| | | 0 | | |
| | | | | 0 | ← Mat2"( )
| | | | | 1 |
| 0 | | | | 0 |
| 0 | 1 | | | 1 |

H1 = 2
H2 = 2 5 3

H1 = 1 6
H2 = 2 5 3

H1 = 3 2
H2 = 2 5 3

H1 = 6 4
H2 = 2 5 3

H1 = 2
H2 = 2 5 3

H1 = 2
H2 = 1 9 2

H1 = 6 4
H2 = 1 9 2

H1 = 6 4
H2 = 2 2 4

H1 = 6 4
H2 = 2 4 0

H1 = 6 4
H2 = 2 5 3

THRESHOLD MATRIX-EMPLOYED ERROR DIFFUSION IMAGE CONVERSION METHOD

BACKGROUND OF THE INVENTION

1. Field of the Invention

The present invention relates to a method of converting continuous tone images into pseudo-halftone binary images.

2. Description of Related Art

An error diffusion process has been proposed by Floyd, et al. in "An Adaptive Algorithm for Spatial Gray Scale" SID 17 [1976]. This error diffusion process can convert a natural image comprised of plural tone levels into a high quality binary image. It is noted, however, that the resultant binary image suffers from undesirable textures. A method has been proposed to solve this problem. This method is disclosed in "On The Error Diffusion Technique for Electronic Halftoning" C. Billotet-Hoffmann and O.Bryngdahl 1983 SID Vol. 24/3.

SUMMARY OF THE INVENTION

It is conceivable to provide a method of FIG. 1 for converting continuous tone images into pseudo-halftone images with the error diffusion method as described below.

When the process is started, an error buffer, to be described later, is initialized to have zero values, and the following processes are started. First, variables x and y are initialized to zero (0) in S1 and S2. The variables x and y are for defining a subject pixel position of a continuous tone image whose density I is to be converted into a binary value. It is noted that a main scanning direction x is defined along each pixel line, and an auxiliary scanning direction y is defined perpendicular to the main scanning direction x.

Then, input density I(x,y) (where $0 \leq I \leq 255$) for the subject pixel (x, y) of an input continuous tone image is retrieved in S3. Then, an error sum e(x, y) is retrieved from a corresponding memory location (x, y) in the buffer memory. The error sum e(x,y) is an accumulated amount of errors distributed from already-processed twelve neighboring pixels. The density value I(x, y) is then modified by the error sum e(x, y) in S4. That is, the modified density I'(x, y) is calculated through the following formula (1):

$$I'(x, y) = I(x, y) + e(x, y) \qquad (1)$$

In S5, a threshold value T is read out from a predetermined multilevel threshold matrix Mat( ) for the subject pixel location (x, y). That is, a threshold value T is read out from the multilevel threshold matrix Mat( ) at an element position (x%8, y%8) which corresponds to the subject pixel position (x, y). This reading operation is performed through calculating the following formula (2):

$$t = Mat(x\%8, y\%8) \qquad (2).$$

wherein Mat( ) is a multilevel threshold matrix having a two-dimensional size of 8×8 as shown in FIG. 2, for example. The matrix Mat( ) lists an integer threshold value at each element position. A plurality of kinds of integer threshold values are distributed in the matrix Mat( ). % is an operator for calculating a remainder produced when a value appearing preceding the operator % is divided by another value appearing following the operator %. That is, x % 8 indicates a remainder produced when x is divided by eight (8), and y % 8 indicates a remainder produced when y is divided by eight (8). For example, if x=8, x % 8=0. If x=12, x % 8=4.

Accordingly, when the subject pixel position is (0, 0), a threshold value T of 2 is read out from an element position (0, 0) of the multilevel threshold value matrix Mat( ) because x % 8=0 and y % 8=0. Similarly, when the subject pixel position is (10, 100), a threshold value T of 46 is read out from an element position (2, 4) of the threshold value matrix Mat( ) because x % 8=2 and y % 8=4.

Then, in S6, the modified density I'(x, y), which has been calculated in S4, is compared with the threshold T which has been obtained in S5. When $I'(x, y) \geq T$ (no in S6), the subject pixel is turned ON in S12. That is, the subject pixel density is converted into an output density value O(x,y) of one (1). When I'(x, y)<T (yes in S6), on the other hand, the subject pixel is turned OFF in S7. That is, the subject pixel density is converted into an output density value O(x,y) of zero (0).

Then, a binary conversion error E(x, y) is calculated for the subject pixel (x, y) in the following formula (3):

$$E(x, y) = I'(x, y) - O(x, y) \qquad (3)$$

Thus produced binary conversion error e(x, y) is then distributed to the error buffer at a location (x+i, y+j) for each of neighboring twelve pixels not yet processed. The binary conversion error is distributed to the neighboring pixels in a weighted basis defined by a predetermined error diffusion matrix Bmat'( ) through the following formula (4):

$$e(x+i, y+j) += Bmat'(i,j) \times E(x, y) \qquad (4)$$

wherein += is an operator for calculating a sum of a distributed fraction of the error E(x, y) and a value already stored in the error buffer (x+i, y+j). A representative example of the matrix Bmat'( ) is shown in FIG. 3. In the matrix Bmat'( ), * indicates a subject pixel position (x, y), and each value in the matrix indicates a coefficient to be multiplied with the error E(x, y) before being distributed to a neighboring pixel (x+i, y+j), which is located relative to the subject pixel (x, y) as shown in the matrix. Thus distributed error fractional portions are accumulated in a corresponding memory location (x+i, y+j) in the error buffer according to the formula (4). For example, the next pixel (x+1, y) on the same pixel line receives a $7/48^{th}$ part of the error E(x, y). The $7/48^{th}$ part of the error E(x, y) is therefore accumulated in the corresponding memory location (x+1, y) of the error buffer.

Next, in S10, it is judged whether or not all the pixels in the present pixel line along the main scanning direction (x direction) have been processed. When any pixels remain unprocessed (no in S10), a pixel position is shifted to the next pixel position (x+1, y) in S13, and the process returns to S3. Then, the process from S3 is repeated. When all the pixels have been processed in the subject pixel line (yes in S10), on the other hand, it is judged in S11 whether or not all the pixels in the input image have been processed. When any pixels remain unprocessed (no in S11), the pixel position is shifted to the next pixel line in the auxiliary scanning direction in S14. Then, the process returns to S2. Then, the process from S2 is repeated. When all the pixels have been processed (yes in S11), this process ends.

Through applying the threshold value matrix Mat( ) of FIG. 2 to the error diffusion method, it is possible to prevent occurrence of undesirable textures and to prevent occurrence of nonuniformity of dots at density rapid changing portions.

When producing the multilevel threshold matrix of FIG. 2, several threshold values are selected uniformly from a plurality of values, which are distributed discretely at an equal interval within a predetermined density range of the input image, i.e., a density range between its lowest density value and its highest density value. The selected threshold values are located in the respective element positions of the threshold matrix in the order of their amounts in accordance with a predetermined locating scheme.

The threshold matrix in the example of FIG. 2 is prepared to process input images whose density levels are distributed from zero (0) to 255. Sixty-four threshold values 2, 6, 10, . . . ,and 254, which are discretely distributed in the density range of 0 to 255 at the interval of f our (4), are selected as threshold values. The sixty-four values 2, 6, 10, . . . ,and 254 are divided into 16 groups, each of which is comprised of four successive values. That is, the first group is constructed from 2, 6, 10, and 14, the second group is constructed from 18, 22, 26, and 30, and so on. The sixteen groups of threshold values are successively located on element positions in the threshold matrix so that four threshold values constituting each group are located on four convex points of a corresponding 5 by 5 square defined in the threshold matrix. It is noted that while FIG. 2 shows a threshold matrix of a 8×8 size for simplicity and clarity, an actually-used threshold matrix has a much larger size, such as 128×128, 256×256, or the like. Accordingly, a considerably large number of threshold values are stored in the threshold matrix.

Because the threshold matrix is thus comprised of the large number of values, an image conversion device, for converting continuous tone images into pseudo-halftone images, has to be provided with a memory having a large storage capacity. It may be possible to decrease the size of the threshold matrix or the total number of kinds of different threshold values included in the threshold matrix. In this case, however, resultant pseudo-halftone images will suffer from undesirable textures or will suffer from nonuniformity in dots appearing at its density rapid-changing portions.

It is therefore, an object of the present invention to overcome the above-described drawbacks, and to provide an improved method for converting continuous tone images into pseudo-halftone images of high quality while using a small amount of storage area.

In order to attain these and other objects, the present invention provides a method for converting a continuous tone image into a pseudo-halftone image, the method comprising the steps of: preparing a threshold matrix which has several elements which are two-dimensionally arranged, each element defining one threshold value; receiving data of a continuous tone image desired to be converted into a pseudo-halftone image, the continuous tone image having a plurality of pixels which are two-dimensionally arranged, each pixel having one density value; and subjecting all the pixels of the continuous tone image to an error-diffusion binary conversion process with using the threshold matrix, to thereby convert the density values of the pixels into binary values while diffusing generated errors to neighboring pixels.

According to another aspect, the present invention provides a method for converting a continuous tone image into a pseudo-halftone image, the method comprising the steps of: receiving data of a continuous tone image desired to be converted into a pseudo-halftone image, the continuous tone image having a plurality of pixels which are two-dimensionally arranged, each pixel having one density value; and subjecting all the pixels of the continuous tone image to an error-distribution binary conversion process with using a threshold matrix, the threshold matrix having several elements which are two-dimensionally arranged, each element defining one threshold value, to thereby convert the density values of the pixels into binary values while distributing generated errors to neighboring pixels, the threshold matrix being produced in one of a blue noise mask production manner and a uniform density matrix error-distribution binary conversion manner.

According to further aspect, the present invention provides a data recording medium for storing data of a program for converting a continuous tone image into a pseudo-halftone image, the program comprising: a program for preparing a threshold matrix which has several elements which are two-dimensionally arranged, each element defining one threshold value; a program for receiving data of a continuous tone image desired to be converted into a pseudo-halftone image, the continuous tone image having a plurality of pixels which are two-dimensionally arranged, each pixel having one density value; and a program for subjecting all the pixels of the continuous tone image to an error-diffusion binary conversion process with using the threshold matrix, to thereby convert the density values of the pixels into binary values while diffusing generated errors to neighboring pixels.

BRIEF DESCRIPTION OF THE DRAWINGS

The above and other objects, features and advantages of the invention will become more apparent from reading the following description of the preferred embodiment taken in connection with the accompanying drawings in which:

FIG. 2 illustrates a threshold matrix used in the process of FIG. 1;

FIG. 3 illustrates an error distribution matrix used in the process of FIG. 1;

FIG. 10 shows a process of producing a threshold;

FIG. 11 illustrates a small-sized error distribution matrix;

FIGS. 16(a) and 16(b) illustrate how respective elements are turned on and off at each uniform density matrix;

FIG. 26 illustrates a modification of the threshold matrix of FIG. 24;

DETAILED DESCRIPTION OF THE PREFERRED EMBODIMENTS

Figure 1:
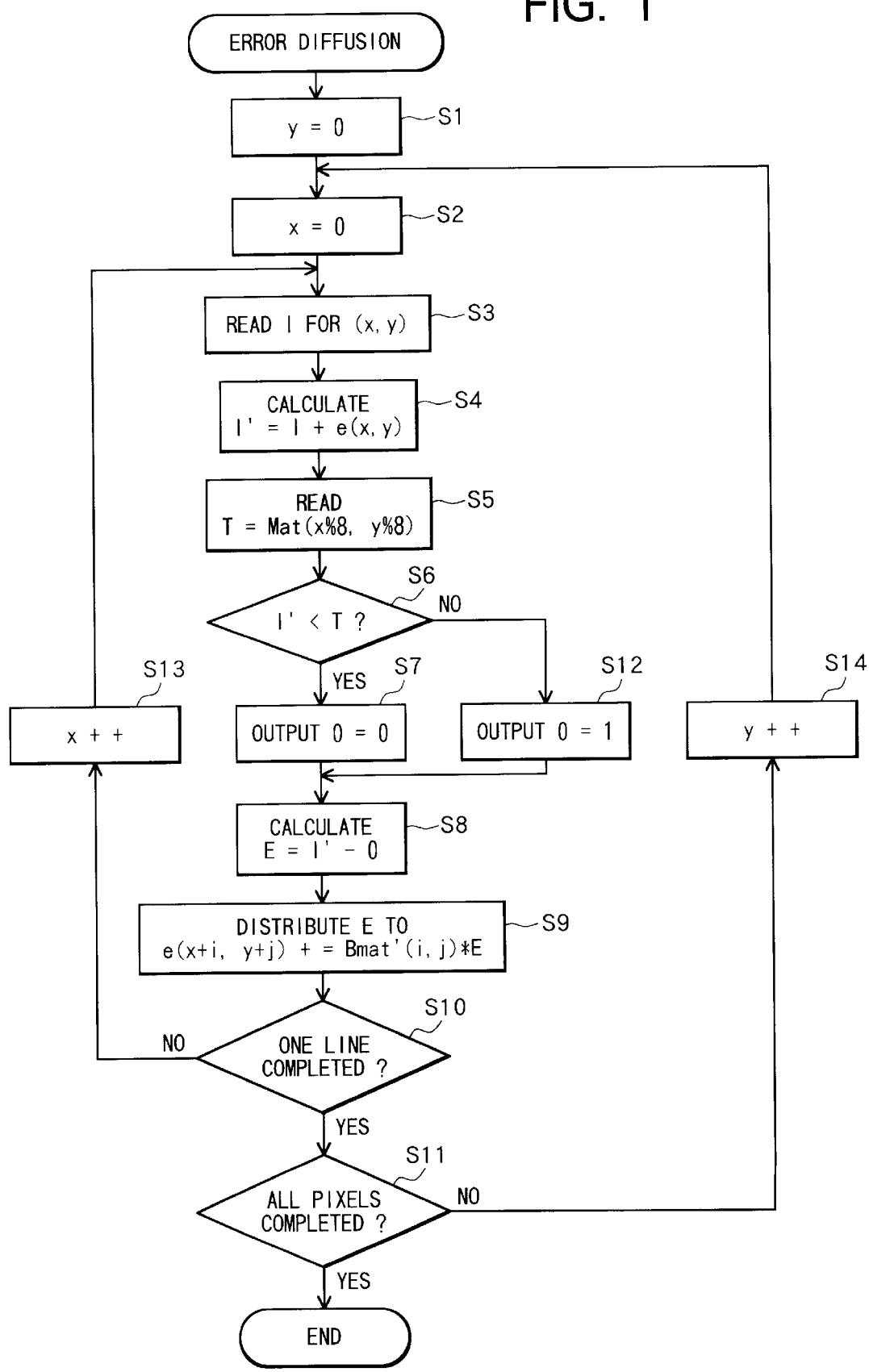
FIG. 1 is a flow chart of a conceivable threshold matrix-employed error diffusion process.

A method according to preferred embodiments of the present invention will be described in greater detail while referring to the accompanying drawings wherein like parts and components are designated by the same reference numerals.

[First Embodiment]

A first embodiment will be described below with reference to FIGS. 4 through 11.

Figure 4:
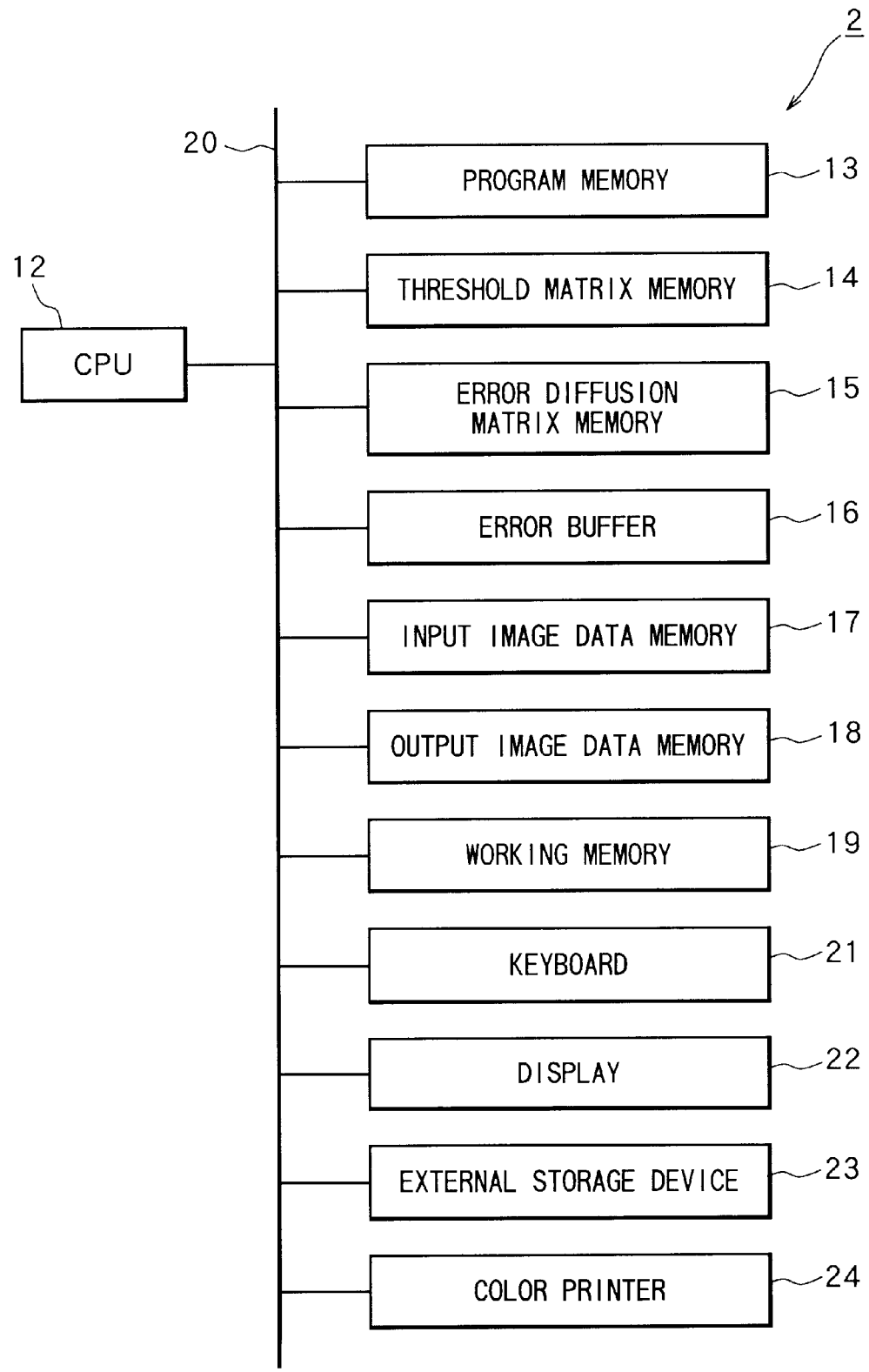
FIG. 4 is a block diagram of a continuous tone image conversion device applied to which a threshold matrix-employed image error diffusion conversion method according to a first embodiment of the present invention.

FIG. 4 is a block diagram of a continuous tone image data conversion device 2, to which applied is a threshold matrix-employed error diffusion image conversion method of the present invention. More specifically, the device 2 is provided to convert input continuous tone images with 256 tone levels into binary pseudo-halftone output images through an error diffusion image conversion method with using a threshold matrix.

A main part of the image conversion device 2 is constructed from a microcomputer. The microcomputer includes: a CPU 12; a program memory 13 constructed from a ROM; a threshold matrix storage portion 14 constructed from a RAM; an error distribution matrix storage memory 15 constructed from another RAM; an error buffer 16 also constructed from another RAM; an input image memory 17 also constructed from another RAM; an output image memory 18 constructed from still another RAM; and a working memory 19 constructed from another RAM. The respective elements 12 through 19 are connected to one another via a system bus line 20 to exchange control signals and data signals therebetween.

The image conversion device 2 is further provided with: input/output elements, such as a keyboard 21, a mouse device (not shown) and a display 22, which are required for the device 2 to perform a computing operation; an external storage device 23 such as a hard disk drive and a floppy disk drive; and a color printer 24. These elements 22 through 24 are also connected to the elements 12–19 via the bus 20.

Figure 5:
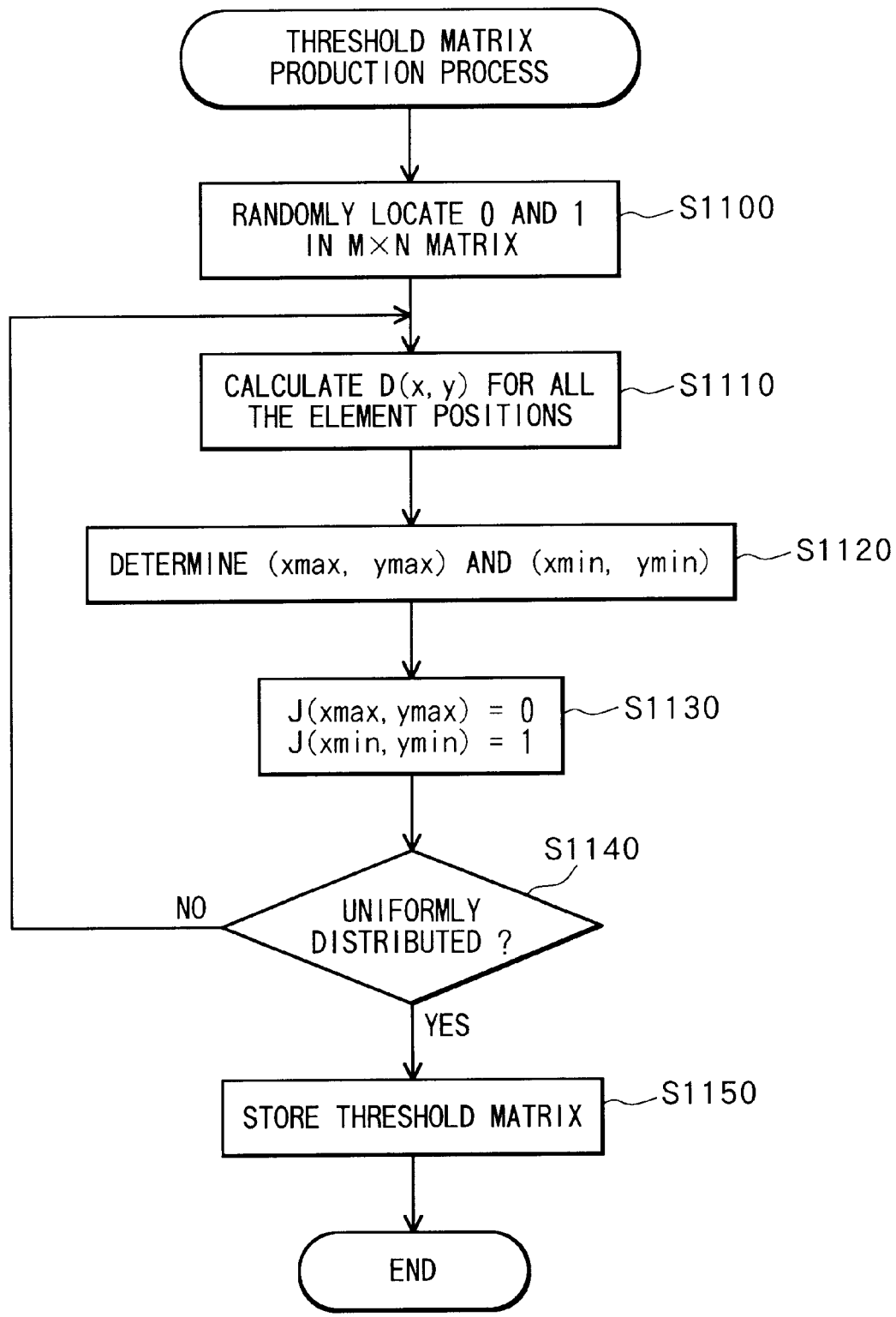
FIG. 5 is a flow chart of a threshold matrix production process according to the first embodiment of the present invention.
Figure 9:
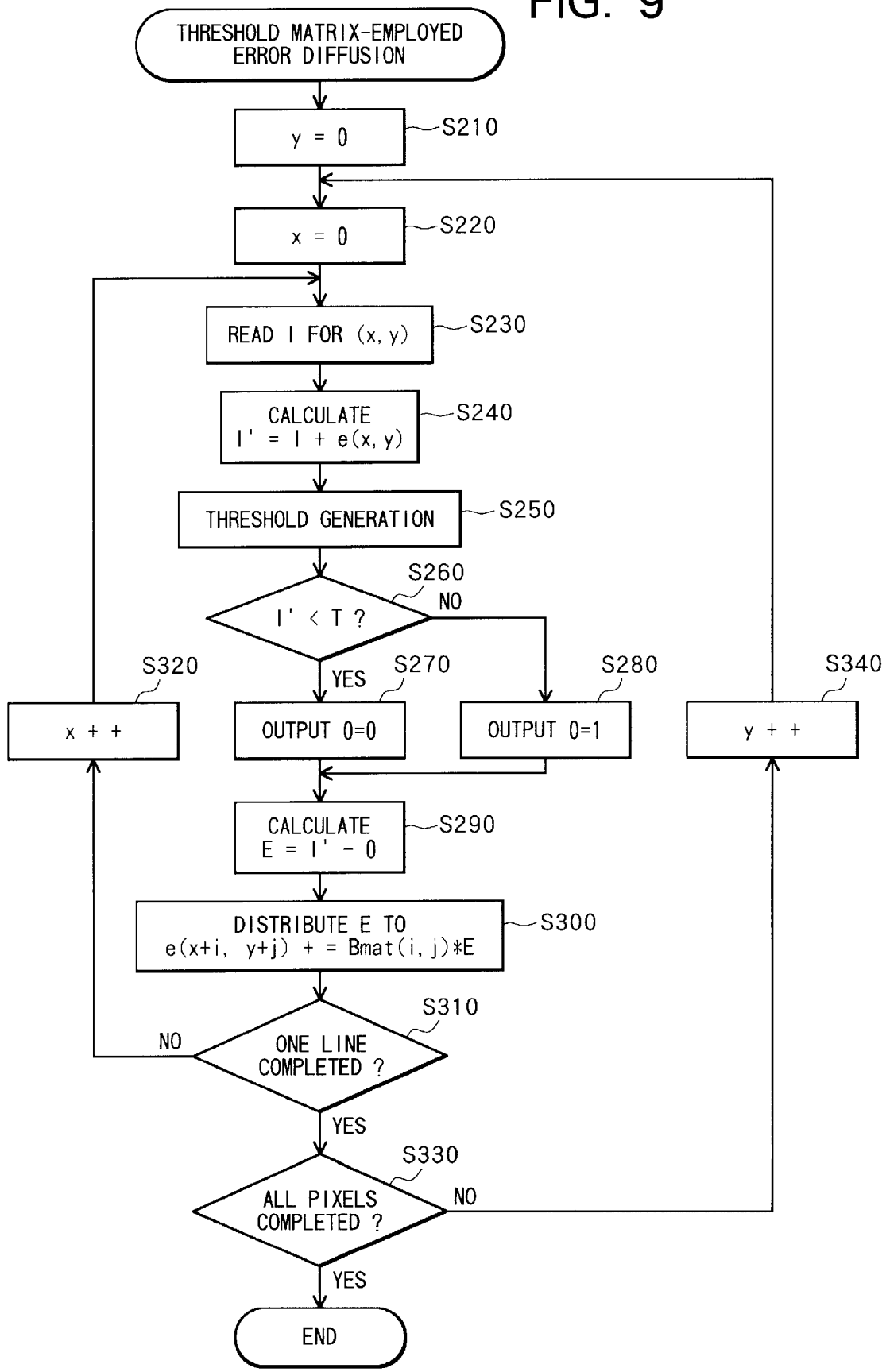
FIG. 9 is a flow chart of a threshold matrix error diffusion image conversion process with using the threshold matrix.

The program storage portion 13 stores therein: a basic program required for the device 2 to perform a computing operation; a threshold matrix production process as shown in FIG. 5; a threshold matrix-employed error diffusion image conversion process as shown in FIGS. 9 and 10 for converting continuous tone images into pseudo-halftone binary images; and other various processing programs. Each program is executed by the CPU 12 when required. It is noted that data of those programs may be previously stored in a floppy disk, a magnetooptical disk, a CD-ROM or the like. When required, data of the programs is retrieved from these data storage media by the operation of the external storage device 23 and is written into the working memory 19.

The threshold matrix storage portion 14 is for storing a bilevel threshold matrix Mat2( ) which is produced through the threshold matrix production process of FIG. 5 as will be described later. In the bilevel threshold matrix Mat2( ), two kinds of discrimination values are distributed two-dimensionally. According to the present embodiment, the threshold matrix Mat2( ) is produced through a blue noise mask production method.

The error distribution matrix storage portion 15 previously stores therein an error diffusion matrix Bmat( ) shown in FIG. 11. As shown in FIG. 11, the error distribution matrix Bmat( ) indicate: neighboring pixels, to which a binarization error, occurred at a certain pixel during the error diffusion image conversion process of FIG. 9, is distributed; and distribution rates at which the error is distributed to the neighboring pixels.

The error buffer 16 is for storing errors distributed to each pixel from its neighboring pixels. The input image data storage portion 17 is for storing data of a continuous tone image inputted from the external storage element 23 or the like to be converted into a pseudo-halftone image. The output image data storage portion 18 is for storing the pseudo-halftone image data which is obtained when the continuous tone image data in the storage portion 17 is subjected to the error diffusion image conversion process. When required, the thus obtained pseudo-halftone image data is displayed on the display 22 or is recorded by the color printer 24.

With the above-described structure, the device 2 of the present embodiment converts a continuous tone image into a pseudo-halftone image with employing a threshold matrix stored in the memory 14 in an error diffusion method. The threshold matrix defines a threshold value at each element position. During the error diffusion image conversion process, each pixel density value is compared with a threshold value retrieved from the threshold matrix at an element position corresponding to the pixel position. Based on the compared result, the pixel density value is converted into a binary value. An error occurred through the binarization operation is effected to neighboring pixels.

Especially, according to the present embodiment, the threshold matrix is produced in a manner determined by a blue noise mask producing method. The blue noise mask production method is provided for producing a dither matrix which is for converting a continuous tone image into a pseudo-halftone image through a manner different from the error diffusion method. According to the blue noise mask production method, a bilevel mask (binary pattern) is first prepared. The bilevel mask is provided with a plurality of elements which are arranged two-dimensionally. Either one of two (first and second) different values are assigned to each element. A ratio between the number of the first value-assigned elements relative to the number of the second value-assigned elements is predetermined. Distribution of the first and second values is evaluated, and the first and second values are distributed so that any clusters are not formed from any of the first and second values. Based on the matrix, a plurality of bilevel matrices are produced. A multilevel threshold matrix is then produced based on the plurality of bilevel matrices. A representative example of the blue noise mask production method is a method as proposed in "The Void and Cluster method for dither array generation" by Robert Ulichney SPIE Vol. 1913. It is noted, however, that other various types of blue noise mask production methods can be employed.

According to the present embodiment, a threshold matrix, in which threshold values are distributed according to the blue noise mask production method, is employed in the error diffusion image conversion process. When this threshold matrix is used during the error diffusion image conversion process, it is possible to prevent occurrence of any undesirable textures or any desirable dot clusters in a resultant pseudo-halftone image even when the error diffusion operation is performed with a relatively small-sized error diffusion matrix or even when the threshold matrix has a relatively small number of kinds of threshold values. It is therefore possible to use a small amount of capacity for storing the threshold matrix.

The resultant pseudo-halftone image has a high quality even when the threshold matrix is a bilevel matrix which has only two kinds of threshold values. When the threshold matrix is thus comprised of the small number of kinds of threshold values, it is advantageous to store discrimination values indicative of the respective kinds of threshold values. Each discrimination value can be represented by data with a small amount, such as a one bit number "zero (0)" or "one (1)". A data group is prepared from a plurality of the discrimination values indicative of the threshold values on all the element positions of the threshold matrix. The discrimination value group is stored in the form of a data table in the memory 14. It is sufficient that the memory capacity is small. When desiring to perform an error diffusion image conversion process with a threshold matrix, the threshold matrix is recovered from the discrimination value table.

In order to produce a bilevel threshold matrix through the blue noise mask production method, a method of producing an initial binary pattern, as described in the "The Void and Cluster method for dither array generation," can be employed. This initial binary pattern is comprised of only two kinds of values, and is used as the bilevel threshold matrix. Because the bilevel threshold matrix has only two kinds of threshold values, it is possible to efficiently and easily produce the bilevel threshold matrix in comparison with producing a multilevel threshold matrix having three or more kinds of threshold values. It is noted, however, that the multilevel threshold matrix can be produced from the bilevel threshold matrix.

When desiring to produce a bilevel threshold matrix through the blue noise mask production method, two kinds of threshold values "0" and "1" are located throughout the matrix so that the concentration or density of neighboring "0", data elements located around each "0" data element will substantially be uniform and so that the concentration or density of neighboring "1" data elements located around each "1" data element will substantially be uniform.

More specifically, the matrix is first prepared so that the two kinds of (first and second) threshold values are distributed in a random order throughout all the element positions. Then, for each of the elements having the first threshold value, the concentration or density of neighboring elements having the same threshold value is calculated. Then, a single first value-assigned element that has the highest concentration or density of the neighboring first value-assigned elements is determined. This element is termed a first value highest density position. Similarly, for each of the elements having the second threshold value, the concentration or density of neighboring elements having the same threshold value is calculated. A single second value-assigned element that has the highest concentration or density of the neighboring second value-assigned elements is determined. This element is termed a second value highest density position. Then, the first threshold value at the first value highest density position is replaced with the second threshold value at the second value highest density position. This process is repeated until the matrix has uniform distribution of the first and second threshold values. Thus, a bilevel threshold matrix with uniformly distributed two values is obtained.

The thus produced threshold matrix does not include threshold values to be actually used in the conversion process of FIG. 9. Instead, the matrix includes a plurality of discrimination values for discriminating between the threshold values to be used. Only a small amount of storage area is required to store the discrimination values in the matrix. When using a threshold matrix to convert a continuous tone image into a pseudo-halftone image, a threshold value is determined based on a discrimination value which is retrieved from an element position corresponding to a subject pixel position of the continuous tone image to be processed.

For example, when desiring to use two kinds of threshold values of 64 and 192, the two kinds of values are represented by the two different discrimination values of zero (0) and one (1). The matrix produced as comprised of the discrimination values "0" and "1" is stored as a threshold matrix. During the error diffusion image conversion process of FIG. 9, when the discrimination value of zero (0) is retrieved, a threshold value of 64 is set to be used. When the discrimination value of one (1) is retrieved, on the other hand, a threshold value of 192 is set to be used. Thus, the threshold matrix comprised of the discrimination values of zero (0) and one (1) is equivalent to a threshold matrix comprised of 64 and 192. Because the discrimination values are smaller than the threshold values 64 and 192 to be actually used, it is possible to save a capacity of a memory for storing the threshold matrix. Because the discrimination values are stored, not only the pair of the threshold values of 64 and 192, but also other various pairs of threshold values can be set in accordance with the discrimination values. Accordingly, the single threshold matrix stored in the memory can correspond to a plurality of threshold matrices. Also in this respect, it is possible to further save the memory capacity.

The threshold matrix production process according to the present embodiment will be described below in greater detail with reference to FIGS. 5 through 8.

This process is executed by the CPU 12. This process is for producing a bilevel threshold matrix Mat2( ) with using the blue noise mask production method. It is noted that the bilevel threshold matrix Mat2( ), to be produced, is capable of converting a continuous tone image whose density levels are discretely distributed within 256 levels from a level "zero (0)" to a level "255". It is noted that the level "zero (0)" indicates black, and the level "255" indicates white.

When the process starts, a memory region of a two-dimensional M by N dot size is prepared in the working memory 19 for storing therein a M column by N row threshold matrix Mat2( ). Then, in S100, element values J(x, y) of either zero (0) or one (1) are randomly located in all the element positions (x, y) where x and y are integers and 0≦x≦M-1 and 0≦y≦N-1. This operation is performed to successively generate random numbers and to assign the values of "0" and "1" in correspondence with the generated random numbers.

Then, in S110, an expected density value D(x, y) is calculated for each element position (x, y) where an element value J(x, y) of zero (0) or one (1) is located. The expected density value D(x, y) is calculated based on a weighting function f(Δx, Δy) and element values J(x-Δx, y-Δy) for elements (x-Δx, y-Δy) that are located in the neighborhood of the subject element (x, y). That is, the expected density value D(x, y) is calculated through the following formula (5):

$$D(x, y) = \sum_{\Delta x=-i}^{i} \sum_{\Delta y=-j}^{j} \{f(\Delta x, \Delta y) \times ABS[J(x+\Delta x, y+\Delta y) - (\text{majority value})]\} \quad (5)$$

where <i<Δx<i and -j<Δy<j, 0<i<M, and 0<j<N. ABS[ ] is a function for calculating an absolute value of a value appearing inside the symbol [ ]. The "majority value" is defined as a value of "0" or "1" set in S100 for more than half of all the elements of the M×N matrix. A "minority value" is defined as a value of zero (0) or one (1) set for less than half of all the elements. For example, when more than half of the elements in the M x N matrix are set to "0", the majority value is zero (0) and the minority value is one (1). Elements having the majority values are referred to as majority elements, and elements having the minority values are referred to as minority elements. The weighting function f(Δx, Δy) is for calculating a weighting value that decreases away from a subject element position (x, y). Various functions can be used as the weighting function f(Δx, Δy). A representative example of the weighting function f(Δx, Δy) is given by the following formula (6):

$$f(\Delta x, \Delta y) = \exp(-d^2/2S^2) \quad (6)$$

where $d^2 = \Delta x^2 + \Delta y^2$. S is an adjustment factor such as 1.5.

It is noted that D(x,y) for each element (x,y) indicates concentration or density of elements that are located around the subject element (x,y) and that have the same value as that of the subject element (x,y). For example, D(x,y) becomes minimum at a certain element position (x,y) around which majority elements are concentrated at a maximum degree. D(x,y) becomes maximum at another certain element position (x,y) around which minority elements are concentrated at a maximum degree. If f(x,y) is a fixed value, D(x,y) will simply indicate the number of elements that are located around the subject pixel (x,y) in a predetermined range and that have the same value as that of the subject element (x,y). If f(x,y) is a value changing depending on the values of x and y, on the other hand, D(x,y) will not simply indicate the number of the same-valued elements around the subject element (x,y).

Figure 6:
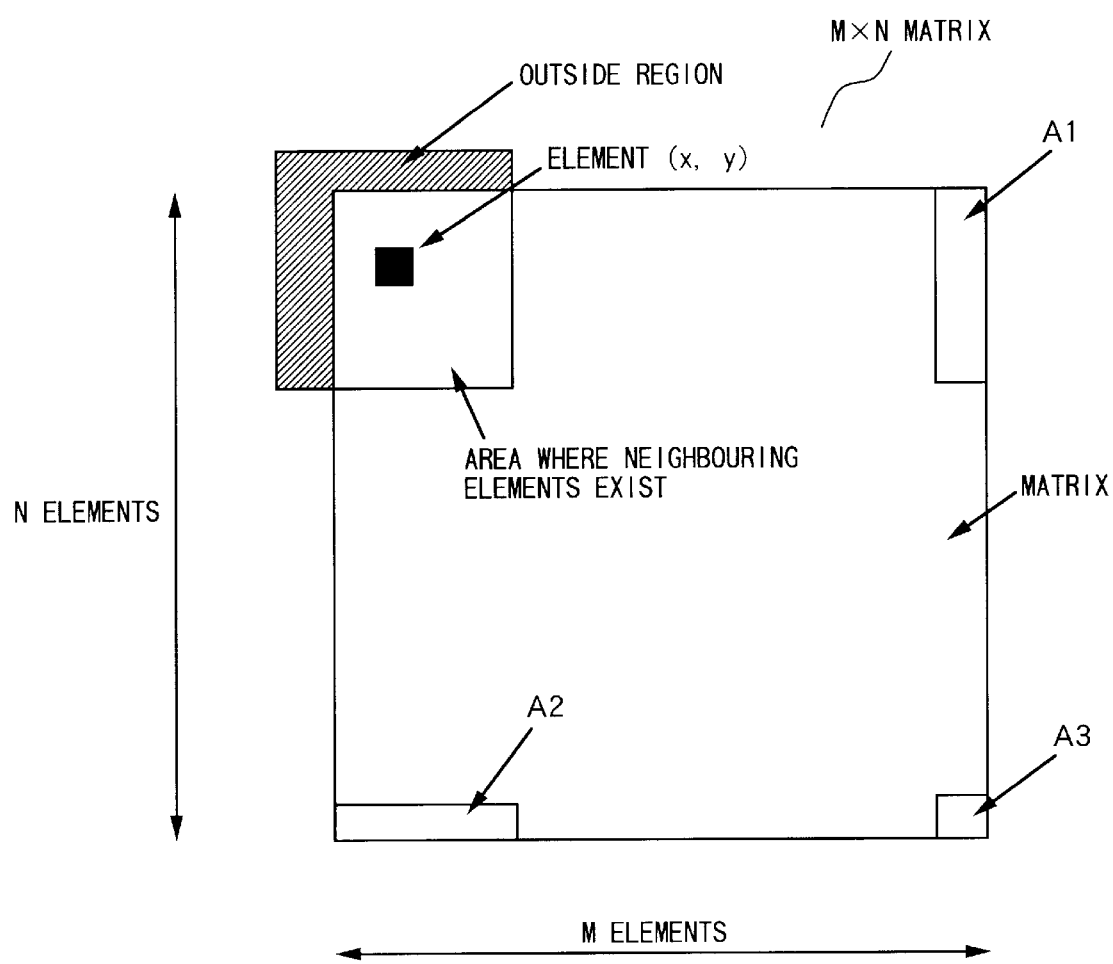
FIG. 6 illustrates an area in which neighboring elements are defined for calculating an expected density for a subject element.

It is further noted that when the subject element (x, y) is near to boundary edges of the M by N matrix, it is assumed that the M by N matrix will be replicated over a two-dimensional space to tile the entire space as shown in FIG. 6. For example, when calculating the expected density value D(x, y) for the subject element (x, y) shown in FIG. 6, those elements (x-Δx, y-Δy) defined in the neighborhood of the subject element (x, y) are located not only in the inside of the M by N matrix but also in the outside area of the matrix as indicated by slanted line. In this case, element values J(x-Δx, y-Δy) for those neighboring elements are set as equal to element values J of elements as located in corresponding three areas A1, A2, and A3 shown in the drawing.

After the expected density values D(x,y) are calculated for all the elements, the program proceeds to S120. In S120, an element (xmax, ymax) having a highest expected density D(xmax, ymax) is determined among all the elements having the element values J(x, y) of "1". This element will be referred to as a "highest expected density element" hereinafter. Then, an element (xmin, ymin) having a lowest expected density D(xmin, ymin) is determined among all the elements having the element values J(x, y) of "0". This element will be referred to as a "lowest expected density element" hereinafter.

Then, in S130, the highest expected density element (xmax, ymax) and the lowest expected density element (xmin, ymin) are caused to switch their element values. That is, the element value "1" at the highest expected density element (xmax, ymax) is changed into "0". The element value "0" at the lowest expected density element (xmin, ymin) is changed into "1". That is, J(xmax, ymax)=0, and J(xmin, ymin)=1.

Then, in S140, a predetermined evaluation operation is achieved to judge whether or not the values of "0" and "1" are uniformly distributed in the M by N matrix. This evaluation can be performed through showing the resultant M by N matrix on the display 22 or the color printer 24 to let a user visually observe the M by N matrix. This evaluation is therefore performed subjectively by the user.

When the user confirms in S140 that the values of "0" and "1" are not yet uniformly distributed in the M by N matrix (no in S140), the user manipulates the keyboard 21 to input this instruction. As a result, the processes of S110 through S130 are performed again before the judgment of S140 is performed next. When the user confirms that the values of "0" and "1" become uniformly distributed in the M by N matrix (yes in S140), the user manipulates the keyboard 21 to input this instruction. The matrix, thus finally obtained to have the uniformly distributed values "0" and "1", is set as a bilevel threshold matrix Mat2( ).

It is noted that the evaluation process of S140 can be performed by the CPU 12 objectively as described below.

S140 is designed to perform the process the same as that of S110 to calculate expected density values D(x, y) for all the elements (x, y) in the M by N matrix which have already been subjected to the replacement operation of S120. Also during this step, a highest value is calculated among expected density values D(x, y) calculated for all the minority elements. This highest value is set as a highest expected density value "Dmax". Then, a lowest value is calculated among expected density values D(x, y) calculated for all the majority elements. The lowest value is set as a lowest expected density value "Dmin".

Then, an evaluation value "Eva" is calculated as a difference between the values "Dmax" and "Dmin". That is, Eva=Dmax−Dmin. It is noted that as the routine of S110 S140 is repeated, the evaluation value Eva gradually decreases in a direction toward zero, but finally converges to reach a certain value higher than zero.

Accordingly, in S140, it is judged whether or not the evaluation value "Eva" has sufficiently converged to the certain value. When it is judged that the evaluation value Eva obtained at the present routine is smaller than that obtained at the latest routine, it is determined that the evaluation value "Eva" is still being decreased as the routine of S110–S140 is repeated. It is therefore determined that the evaluation value "Eva" has not yet been converged to the certain value. It is therefore determined that the values of "0" and "1" are not yet uniformly distributed. Because the judgment in S140 becomes negative, the processes of S110 through S130 are performed again before the judgment of S140 is performed next. It is noted that because the process the same as that of S110 is performed in the judgment process of S140, if the negative judgment is attained in S140, the program skips S110 and directly proceeds to S120. Only the processes of S120 and S130 are repeated.

When it is judged that the evaluation value Eva has been sufficiently converged to the certain value, on the other hand, it is confirmed that the values of "0" and "1" are uniformly distributed in the M by N matrix. For example, when the evaluation value "Eva" obtained at the present routine is equal to or larger than that obtained at the latest routine, it is determined that the evaluation value "Eva" has been converged to the certain value.

When it is thus confirmed that the values of zero (0) and one (1) are uniformly distributed in the M by N matrix (yes in S140), this matrix is set as a bilevel threshold matrix Mat2( ). It can therefore be said that the bilevel threshold matrix Mat2( ) is obtained to have two discrimination values of "0" and "1" distributed uniformly. The bilevel threshold matrix Mat2( ) is then stored in the threshold matrix storage portion 14 in S150, and the threshold matrix production process ends.

Figure 7:
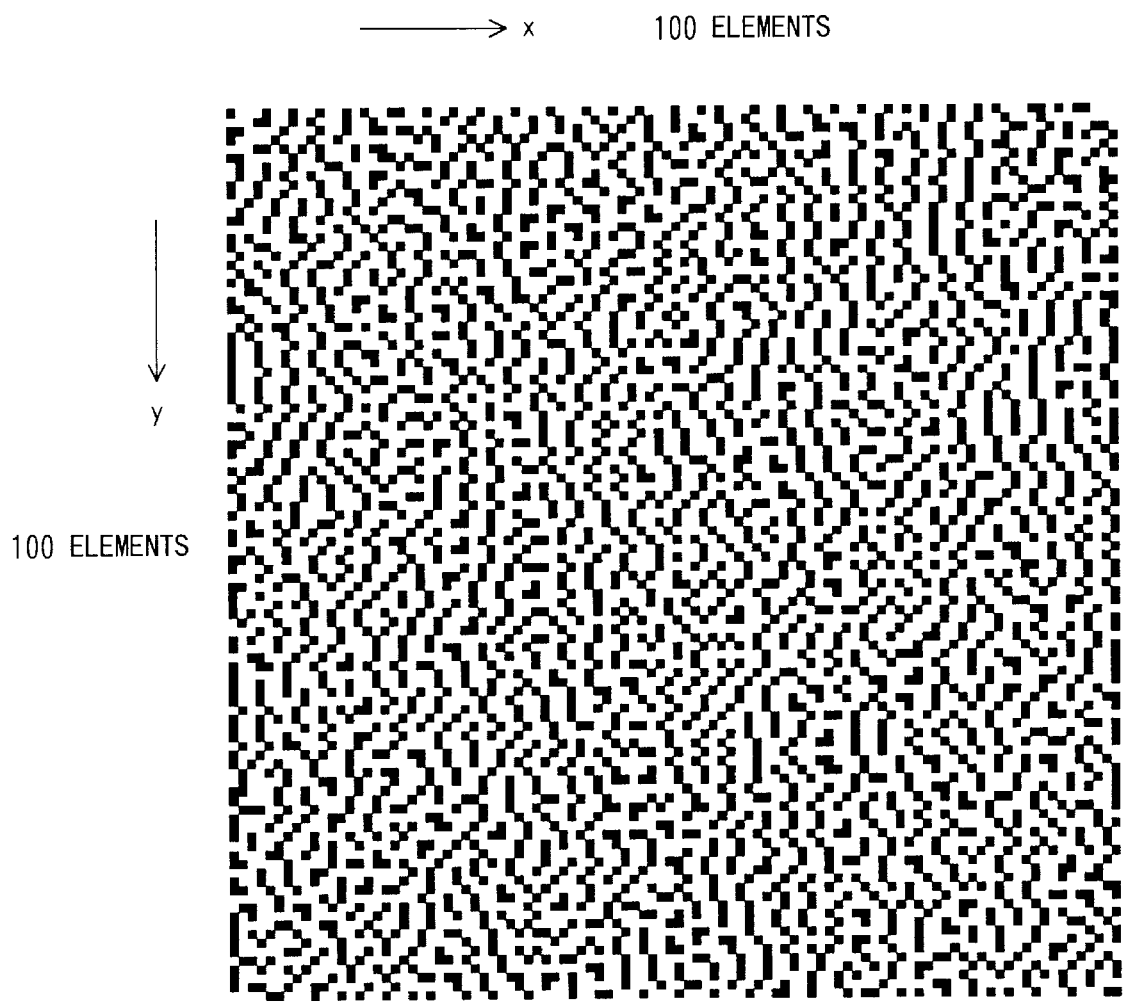
FIG. 7 illustrates an example of a bilevel threshold matrix comprised of 100×100 elements and produced through the process of FIG. 5.
Figure 8:
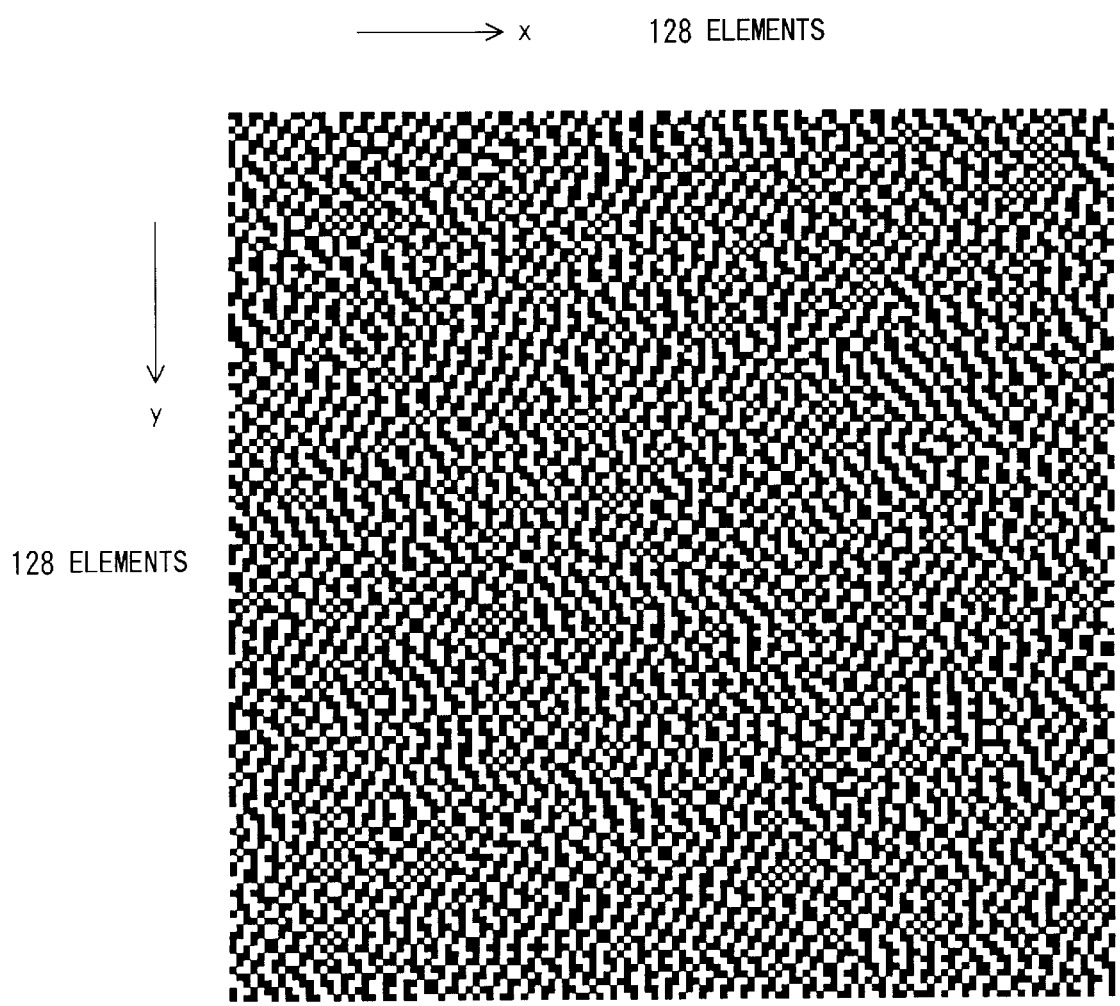
FIG. 8 illustrates an example of a bilevel threshold matrix comprised of 128×128 elements and produced through the process of FIG. 5.

An example of the thus produced bilevel threshold matrix Mat2( ) is shown in FIG. 7. This matrix has a size of 100×100. That is, the matrix is obtained through the above-described process in which M=N=100. FIG. 8 shows another bilevel threshold matrix Mat2( ) of a size of 128×128 which is produced also through the above-described process. In the drawings, a white dot indicates an element (x, y) whose element value J(x, y) is equal to "0", and a black dot indicates an element (x, y) whose element value J(x, y) is equal to "1".

The threshold matrix-employed error diffusion image conversion process will be described below with reference to FIGS. 9 through 11. This process is executed by the CPU 12 to convert data of a continuous tone image stored in the input image data memory 17 into data of a pseudo-halftone image with the use of the bilevel threshold matrix Mat2( ) produced through the above-described process.

When the error diffusion image conversion process is started, the error buffer 16 is initialized to have zero values, and the following processes are started. Variables x and y are initialized to zero (0) in S210 and S220. The variables x and y are for defining a subject pixel position of a continuous tone image whose density I is to be converted into a binary value. It is noted that a main scanning direction x is defined along each pixel line, and an auxiliary scanning direction y is defined perpendicular to the main scanning direction x. Then, in S230, input density I(x,y) (where $0 \leq I \leq 255$) of a subject pixel (x, y) in the continuous tone image is retrieved from the memory 17.

An error sum e(x, y) is retrieved from a corresponding memory location (x, y) in the buffer memory 16. The error sum e(x,y) is an accumulated amount of errors distributed from already-processed two neighboring pixels. The density value I(x, y) is then modified by the error sum e(x, y) in S240. That is, the modified density I'(x, y) is calculated through the following formula (7):

$$I'(x, y) = I(x, y) + e(x, y) \qquad (7)$$

Then, a threshold value calculation process of S250 is achieved.

The threshold value matrix Mat2( ) produced during the threshold value matrix production process of FIG. 5 includes only the values of "1" and "0". These values "1" and "0" are discrimination values indicative of two kinds of threshold values to be used in the present process. More specifically, these values "0" and "1" are discrimination values indicative of a dark side threshold value H1 and a bright side threshold value H2 where H1<H2. It is therefore necessary to set the two threshold values H1 and H2 for the discrimination values "0" and "1". In this embodiment, the two threshold values H1 and H2 are previously determined in correspondence with a density range of the input continues tone image. In this example, the range of the density I in the continuous tone image is between 0 and 255. That is, $0 \leq I \leq 255$. Accordingly, the dark side threshold value H1 is set to 64, for example, in correspondence with the discrimination value of "0". The bright side threshold value H2 is set to 192, for example, in correspondence with the discrimination value "1". It is noted that the relationship between the threshold values "64" (H1) and "192" (H2) and the discrimination values "0" and "1" is previously stored in the threshold matrix memory 14. That is, the memory 14 is previously stored with data indicative of the relationship between the discrimination value "0" and the threshold value "64" (H1) and between the discrimination value "1" and the threshold value "192" (H2).

The process of S250 is therefore designed as shown in FIG. 10 to calculate a threshold value T for the subject pixel (x, y) based on the relationship between the threshold values and the discrimination values. That is, a discrimination value t is set as equal to a value that is read out in S252 from the bilevel threshold value matrix Mat2( ) at an element position (x%M, y%N) which corresponds to the subject pixel position (x, y). This discrimination value reading operation is performed through calculating the following formula (8):

$$t = Mat2(x\%M, y\%N) \qquad (8).$$

wherein Mat2( ) is the threshold value matrix having the size of M×N as shown in FIG. 8, for example. The matrix Mat2( ) stores either "0" or "1" at each element position. % is an operator for calculating a remainder produced when a value appearing preceding the operator % is divided by another value appearing following the operator %. Accordingly, x%M indicates a remainder produced when x is divided by M, and y%N indicates a remainder produced when y is divided by N. When using the 128×128-sized threshold value matrix Mat2( ) of FIG. 8, if x=200, x%128= 72. If x=112, x%128=112.

When using the 128×128-sized threshold value matrix Mat2( ) of FIG. 8, therefore, if the subject pixel position is (0, 0), a value is read out from an element position (0, 0) of the threshold value matrix Mat2( ) because x%128=0 and y%128=0. Because the matrix Mat2( ) of FIG. 8 includes a threshold value of "1" (=black dot in FIG. 8), a discrimination value t is set equal to one (1). Similarly, if the subject pixel position is (128, 129), a threshold value is read out from an element position (0, 1) of the threshold value matrix Mat2( ) because x%128=0 and y%129=1. Because the matrix Mat2( ) of FIG. 8 includes a threshold value of "0" (=white dot in FIG. 8), a discrimination value t is set to zero (0).

Then, in S254, it is judged whether or not the thus determined discrimination value t is equal to one (1). If the discrimination value t is equal to one (1) (yes in S254), a threshold value T for the subject pixel (x, y) is set to H2 of 192 in S258. If the discrimination value t is equal to zero (0) (no in S254), on the other hand, a threshold value T for the subject pixel (x, y) is set to H1 of 64 in S256.

When the threshold calculation process of S250 is thus completed, the program proceeds to S260. In S260, the modified density I'(x, y) which has been calculated in S240 is compared with the threshold T which has been obtained for the subject pixel (x, y) in S250. When I'(x, y)≧T (no in S260), the subject pixel is turned ON in S270. That is, the subject pixel density is converted into an output density value O(x,y) of one (1). When I'(x, y)<T (yes in S260), on the other hand, the subject pixel is turned OFF in S280. That is, the subject pixel density is converted into an output density value O(x,y) of zero (0). The thus obtained output density value O(x,y) is stored in the output image data memory 18 as pseudo-halftone binary image data.

Next, in S290, a binary conversion error E(x, y) is calculated for the subject pixel (x, y) in the following formula (9):

$$E(x, y) = I'(x, y) - O(x, y) \qquad (9)$$

Thus produced binary conversion error E(x, y) is then distributed to an error buffer (x+i, y+j) for each of neighboring two pixels not yet processed. The error E(x, y) is distributed to the neighboring unprocessed pixels in a weighted basis defined by a predetermined error diffusion matrix Bmat ( ) as expressed by the following formula (10):

$$e(x+i, y+j) += Bmat(i,j) \times E(x, y) \qquad (10)$$

wherein += is an operator for calculating a sum of a distributed fraction of the error E(x, y) and a value already stored in the error buffer (x+i, y+j). A representative example of the matrix Bmat (,) is shown in FIG. 11.

The matrix Bmat ( ) is previously stored in the memory 15. In the matrix Bmat ( ), * indicates a subject pixel position (x, y), and each value in the matrix indicates a coefficient to be multiplied with the error E(x, y) before being distributed to a neighboring pixel (x+i, y+j) that is located relative to the subject pixel (x, y) as shown in the matrix. Thus distributed error fractional portions are accumulated in a corresponding memory location (x+i, y+j) in the error buffer 16 according to the formula (10). For example, the next pixel (x+1, y) on the same pixel line receives a half part of the error E(x, y). The half part of the error E(x, y) is therefore accumulated in the corresponding memory location (x+1, y) in the error buffer 16. Similarly, another pixel (x, y+1) located on the next pixel line receives a remaining half part of the error E(x, y). The remaining half part of the error E(x, y) is therefore accumulated in the corresponding memory location (x, y+1) in the error buffer 16.

The matrix Bmat ( ) has a smaller size relative to the Bmat'( ) of FIG. 3 used in the conceivable error diffusion method. Because the threshold value matrix Mat2( ) has a blue noise characteristic, it is sufficient to use the thus small-sized error diffusion matrix Bat( ). Even with the small-sized error diffusion matrix Bat( ), it is still possible to obtain a high quality binary pseudo-halftone image. Because such a small-sized matrix Bmat( ) is used, the amount of calculation required to be performed during the binary conversion operation can be decreased. It is possible to perform the image conversion process of FIG. 9 within a short period of time. Of course, it is possible to use the error diffusion matrix Bmat'( ) as shown in FIG. 3, thereby further increasing the quality of the resultant binary image.

Next, in S310, it is judged whether or not all the pixels in the present pixel line along the main scanning direction (x direction) have been processed. When any pixels remain unprocessed (no in S310), a pixel position is shifted to the next pixel position (x+1, y) in the same pixel line in S320. That is, x is incremented by one. Then, the process returns to S230. The process from S230 is repeated.

When all the pixels have been processed in the subject pixel line (yes in S310), on the other hand, it is judged in S330 whether or not all the pixels in the input image have been processed. When any pixels remain unprocessed (no in S330), the pixel position is shifted to the next pixel line in the auxiliary scanning direction (y direction) in S340. That is, y is incremented by one. Then, the process returns to S220, and the process from S220 is repeated. When all the pixels have been processed (yes in S330), on the other hand, this process ends.

At this time, the output image data memory 18 stores therein the binary density data O(x, y) set in S270 or S280 for all the pixel positions (x, y) of the input image. The binary density data O(x, y) for all the pixel positions represent a pseudo-halftone image for the inputted continuous tone image. The pseudo-halftone image suffers from no undesirable textures or nonuniformity in dots.

As described above, according to the first embodiment, an input density for a subject pixel position (x, y) is retrieved in S230. A modified density value I'(x, y) is calculated in S240 based on the input density value I(x, y) and the error sum e(x, y) stored in the corresponding error buffer. Then, in S250, a discrimination value for the subject pixel position (x, y) is retrieved from the bilevel threshold value matrix Mat2( ) which is produced through the blue noise characteristic method. One of two threshold values is assigned to the retrieved discrimination value. Thus, a threshold value T is determined for the subject pixel (x, y). Then, an output density value O(x, y) is determined based on the modified density value I'(x, y) and the threshold value T in S260, S270, and S280. Then, an error value E(x,y) is calculated based on the output density value O(x, y) and the modified density value I'(x, y). The error value E(x,y) is distributed to the error buffer 16 in S300 dependently on the error distribution matrix Bmat( ). The above-described process is performed onto all the pixels of the input image.

According to the present embodiment, the threshold value matrix Mat2( ) is produced while using the blue noise mask producing method. Accordingly, two kinds of threshold values are arranged in the thus produced threshold value matrix Mat2( ) nonperiodically. The threshold value matrix is used in the error diffusion image conversion process to convert a continuous tone image into a pseudo-halftone image. Even when the error distribution matrix Bmat( ) having a small size is used, the resultant pseudo-halftone image will not suffer from any undesirable textures. Any dot clusters or dot voids will not be produced in the resultant pseudo-halftone image even at its density rapid changing regions. A high quality pseudo-halftone image can be obtained. It is advantageously sufficient that the threshold matrix storage portion 14 has a small storage capacity.

Even when a threshold value matrix Mat2( ), to be used in the error diffusion image conversion process of FIG. 9, has to have threshold values such as "64" and "192" which have to be represented by eight bits, the threshold value matrix Mat2( ) can be stored in the memory 14 in the form comprised of two discrimination values of "0" and "1". Each discrimination value can be represented by one bit. Accordingly, the bilevel threshold value matrix Mat2( ), per se. can be constructed from a small amount of data. It is sufficient that the memory 14 has a considerably small capacity.

The bilevel threshold value matrix Mat2( ) is thus stored in the memory as indicative of the two discrimination values. Accordingly, any pair of values, other than the pair of values of "64" and "192" can be used as threshold values during the error diffusion image conversion process of FIG. 9. It is unnecessary to store data of a plurality of different threshold value matrices. It is sufficient that the memory 14 has a considerably small amount of capacity. It is also possible to freely change the threshold values in accordance with a required image quality control. It is possible to efficiently process and adjust color of the continuous tone image.

[Second Embodiment]

A second embodiment will be described below with reference to FIGS. 12 through 17.

The threshold matrix production operation may not be performed in the above-described blue noise mask production method, but may be performed in a manner as described below.

A uniform density matrix is first prepared to have a plurality of elements having density values equal to a single density value. The uniform density matrix is converted into a binary matrix through an error-distributing binary conversion process. That is, each element density value is compared with a predetermined threshold value. Based on the compared result, the element density value is converted into a binary value. An error occurred through the binarization operation is effected to neighboring elements. The thus obtained binary matrix has two kinds of values. A threshold matrix is produced through locating two kinds of threshold values in element positions corresponding to the element positions in the binary matrix where the two kinds of values are located.

Figure 14:
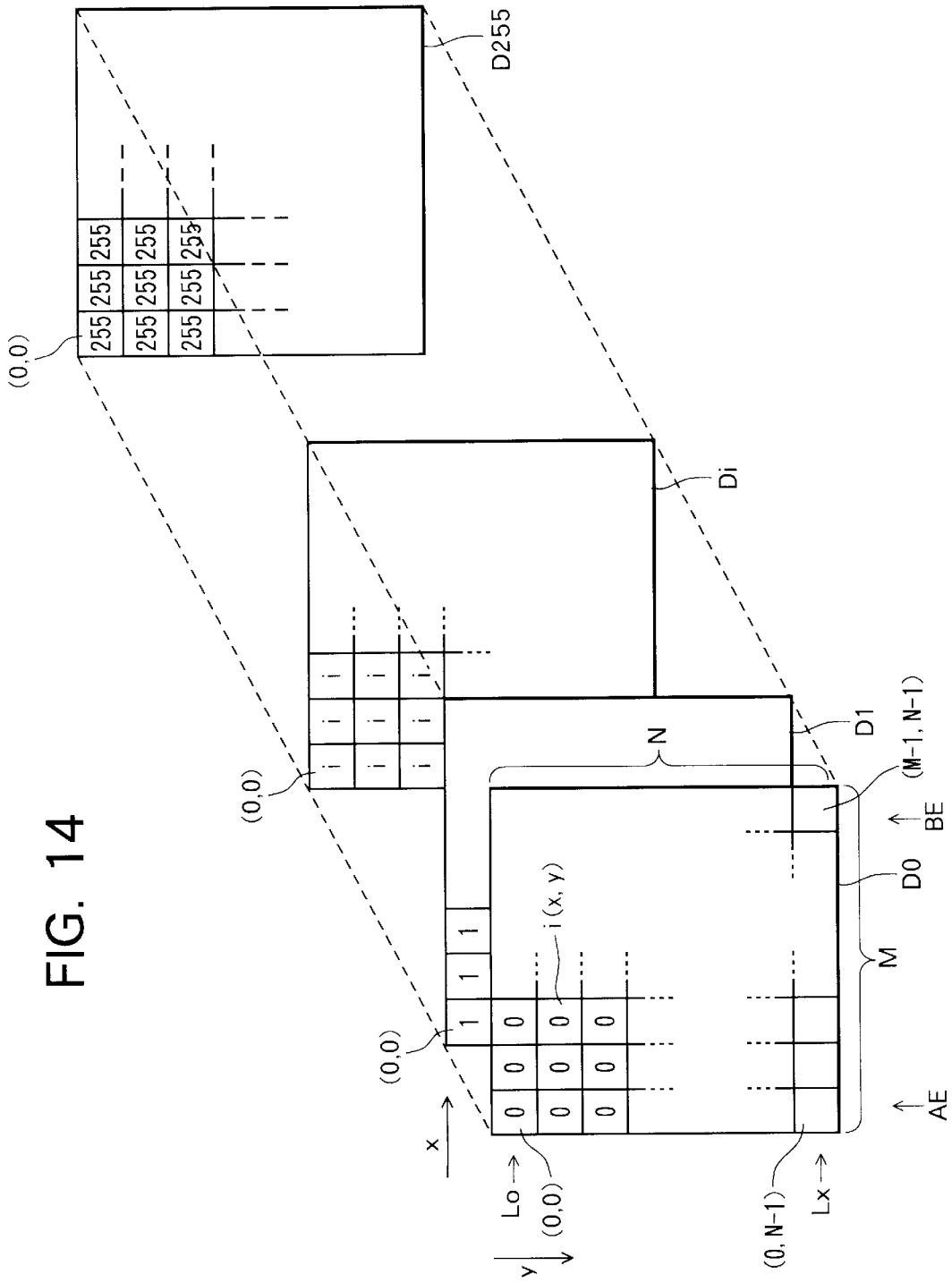
FIG. 14 illustrates uniform density matrices used in the process of FIG. 12.

More specifically, in one uniform density matrix Di, a plurality of elements are arranged two-dimensionally as shown in FIG. 14. Each element has a density i of the same value ($0 \leq i \leq 255$). The density value i of each element in the matrix Di is converted into a binary value (0 or 1) while a generated error (which will be referred to as "binary-conversion error" hereinafter) is distributed to neighboring elements. In order to distribute the binary-conversion error to neighboring elements, various types of error distribution operations can be employed. That is, it is possible to employ an error diffusion method, a minimized average error method, and the like. The minimized average error method is for adding, to a density value of a subject element to be processed, fractional portions of binary-conversion errors which have been generated when neighboring elements are processed. This method is described by J. F.Jarvis, C. N.Judice, and W. H.Ninke, in "A Survey of Techniques for the Display of Continuous Tone Pictures on Bilevel Displays", Computer Graphics and Image Processing.5, 13–40(1976). The error diffusion method is for distributing an error, generated when each element is processed, to neighboring elements not yet processed. This method is described in great detail by Robert W.Floyd and Louis Steinberg in "An Adaptive Algorithm for Spatial Greyscale", Proceeding of the S.I.D. Vol.17/2,1976.

According to this process, the threshold values can be located in the threshold matrix in a desirable manner. When the threshold matrix is used during the error diffusion image conversion process of FIG. 9, it is possible to prevent occurrence of any undesirable textures or any undesirable dot clusters even in density rapid-changing portions in a resultant pseudo-halftone image even when the error diffusion image conversion operation is performed with the relatively small-sized error diffusion matrix Bmat( ) or even when the threshold matrix is produced to have a relatively small number of kinds of threshold values. The image conversion operation can be attained with using a small amount of memory area.

Preferably, a plurality of uniform density matrices having different uniform densities may be first prepared. The above-described error-distributing binary conversion method is repeatedly performed to successively convert the plurality of uniform density matrices into a plurality of binary matrices while referring to a binary state of an already-produced binary matrix. A uniform density matrix having a desired element density is converted into a binary value matrix. A bilevel threshold matrix is then produced through locating two kinds of threshold values in positions corresponding to the element positions in the binary matrix where the two kinds of values are located. Thus, the uniform density matrix with the desired density is converted into the binary value matrix while referring to the binary state of other already-processed uniform density matrices. The binary value matrix has a proper distribution of the two kinds of values.

More specifically, the density value on each element in each uniform density matrix is converted into a binary value dependent on a binary value of a corresponding element on another uniform density matrix (closest uniform density matrix) which has been already processed and which has a density value closest to that of the subject uniform density matrix. In more concrete terms, the density value at each element on each uniform density matrix is converted compulsively into a value of one (1) when a corresponding element on the closest uniform density matrix, which has been already processed and which has a density value closest to that of the uniform density matrix, has been converted to the value of one (1).

It is noted that the plurality of density values in the plurality of uniform density matrices are distributed discretely in a predetermined density range. Accordingly, when successively converting the plurality of uniform density matrices into binary value matrices in the manner as described above, a uniform density matrix, whose density value is the lowest one of the plurality of density values, is first converted into a binary value matrix. That is, each density value in the lowest uniform density matrix is converted into a binary value of zero (0) or one (1) through the error-distributing binary conversion method. Or, another uniform density matrix, whose density value is the highest one of the plurality of density values, may be first converted into a binary matrix. That is, each density value of the highest uniform density matrix is converted into a binary value of zero (0) or one (1) through the error-distributing binary conversion method. Then, other remaining uniform density matrices are converted into binary matrices while referring to the binary state of the already-processed matrix.

Or, the density value of each element at each uniform density matrix may be converted into a binary value dependent both on: a binary value of a corresponding element on a lower-closest uniform density matrix which has been already processed and which has a density value closest to and lower than that of the subject uniform density matrix; and a binary value of a corresponding element on a higher-closest uniform density matrix which has been already processed and which has a density value closest to and higher than that of the uniform density matrix. In this case, when successively converting the plurality of uniform density matrices into binary value matrices, a uniform density matrix, whose density value is the lowest one of the plurality of density values, and another uniform density matrix, whose density value is the highest one of the plurality of density values, are first converted into binary value matrices. That is, each density value in each uniform density matrix is converted into a binary value of zero (0) or one (1) through the error-distributing binary conversion method. Then, other remaining uniform density matrices are converted into binary matrices. That is, the density value of each element on each of the remaining uniform density matrices is converted compulsively into a first value when both of a corresponding element on the lower-closest uniform density matrix and a corresponding element on the upper-closest uniform density matrix have been converted to the first value. The density value of each element on each uniform density matrix is converted compulsively into a second value when both of the corresponding element on the lower-closest uniform density matrix and the corresponding element on the upper-closest uniform density matrix have been converted to the second value.

An example of the method of producing a threshold value matrix Mat2( ) according to the present embodiment will be described below with reference to FIG. 12. This process is for producing a bilevel threshold matrix Mat2( ) which is for converting continuous tone images represented by 256 tone levels I ($0 \leq I \leq 255$) into pseudo-halftone binary images.

In S410, the CPU 12 first produces a uniform density matrix D0 whose all of the elements have a density value i of zero (0) and another uniform density matrix D255 whose all of the elements have density values i of 255. The matrices D0 and D255 are shown in FIG. 14. Both of two matrices D0 and D255 are converted into two binary matrices F0 and F255 through an error-distributing binary conversion process. That is, the density value i(x,y) of each element (x,y) is added with a sum E of errors distributed from neighboring already-processed elements, and the thus modified density value I(x,y) is compared with a predetermined threshold value t (128, for example). When the modified density I(x,y) is higher than the threshold t, the element is determined as ON (1). When the modified density I(x,y) is equal to or lower than the threshold t, on the other hand, the element (x,y) is determined as OFF (0). A generated error e will be distributed to neighboring elements not yet processed.

Figure 15:
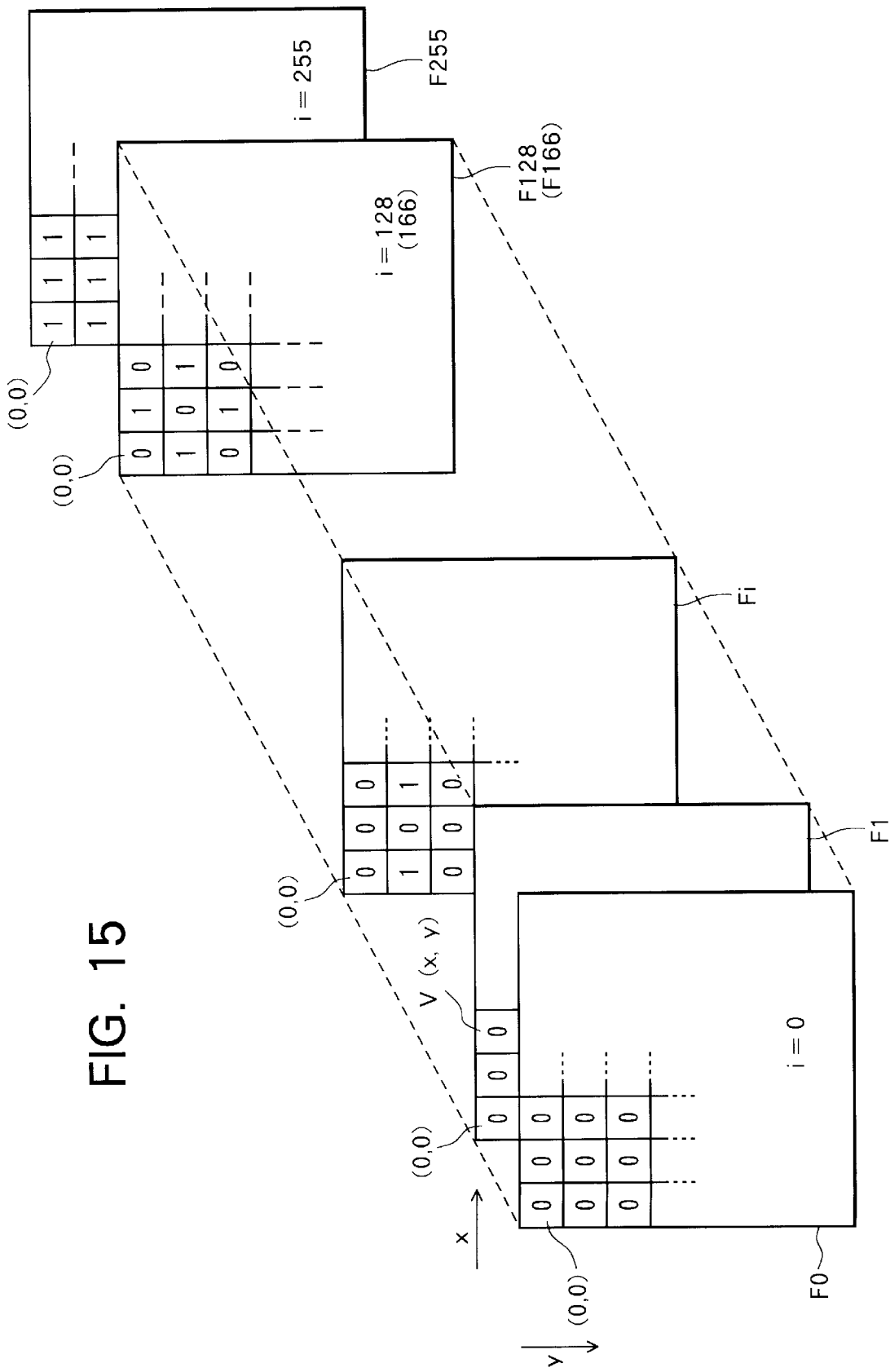
FIG. 15 illustrates binary matrices produced during the process of FIG. 12.
Figure 17:
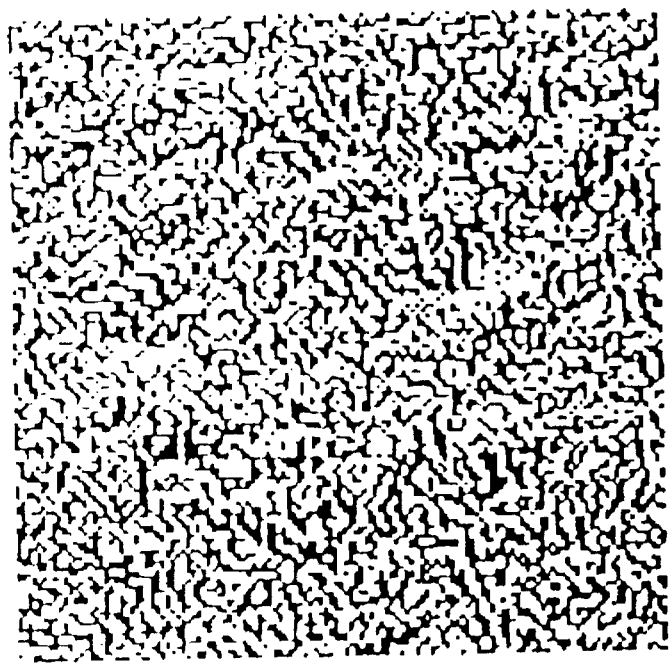
FIGS. 17(a) and 17(b) show examples of binary matrices produced through the process of FIG. 12.
Figure 17:
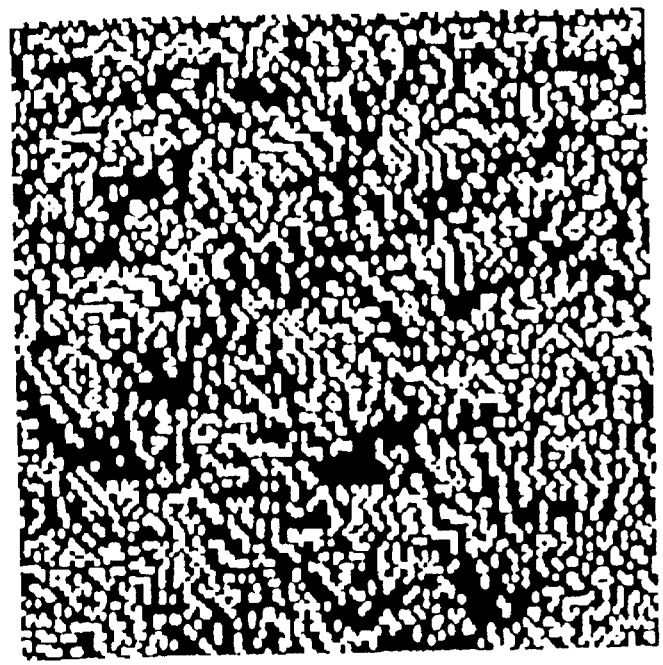

It is noted that during S410, the two uniform density matrices D0 and D255 are produced and then read into the working memory 19. The obtained two binary matrices F0 and F255 are stored also in the working memory 19 in S420. The matrices F0 and F255 are shown in FIG. 15. Details of the error-distributing binary conversion process will be described later.

Because all the elements in the matrix D0 have density values i of zero (0), the matrix F0 has all the elements of zero (0) ("OFF"). Similarly, because all the elements in the matrix D255 have density values i of 255, the matrix F255 has all the elements of one (1) ("ON"). Accordingly, it may be possible not to perform the above-described error-distributing binary conversion operation, but to previously prepare and store both the binary matrix F0 whose all the elements are zero (Off) and the binary matrix F255 whose all the elements are 255 (On).

Then, the value i is initialized to one (1) in S430, and another uniform density matrix Di (i=1) whose all the elements have a density of one (1) is prepared and subjected to an error-distributing binary process in S440. It is noted that while the process of S440–S470 are repeatedly conducted, matrices D1 through D128 shown in FIG. 14 are successively converted into binary value matrices F1 through F128 shown in FIG. 15. All the elements in each of the matrix Di (i=1 through D128) have a corresponding density i. During S440, each matrix Di is prepared and read into the working memory 19.

Figure 13:
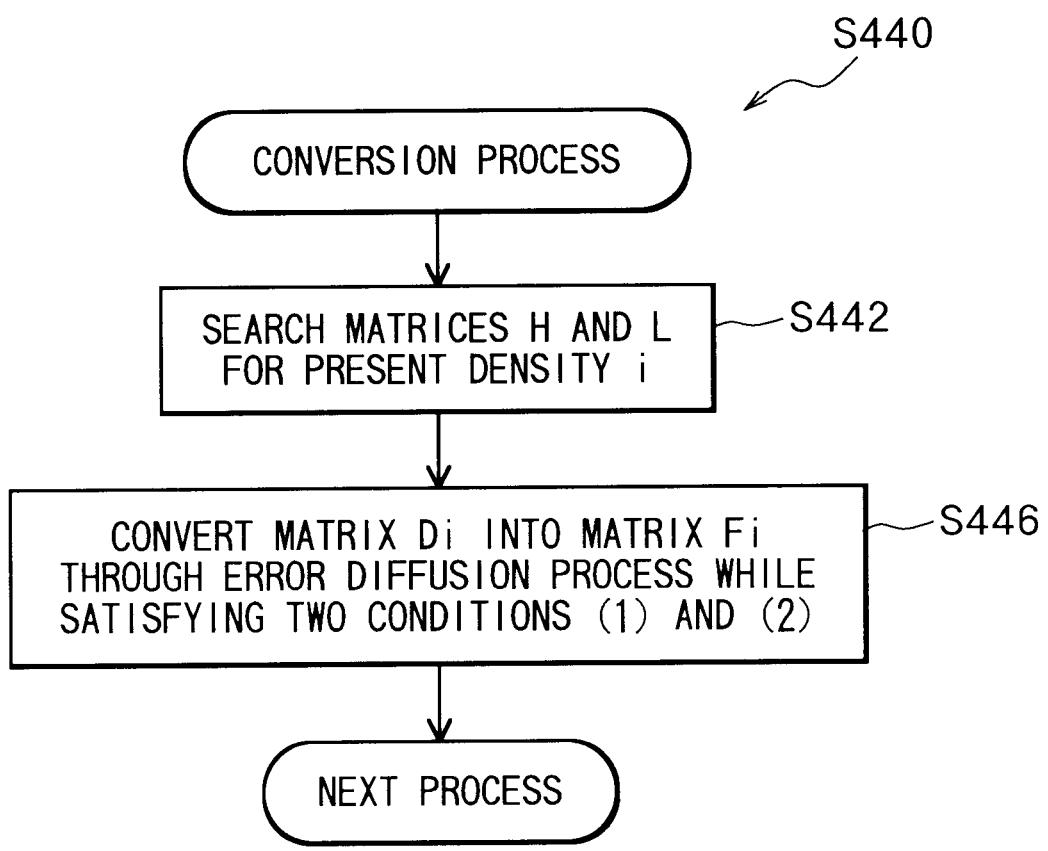
FIG. 13 shows a process of binary converting a uniform density matrix into a binary matrix in the process of FIG. 12.

This conversion process of S440 will be described below with reference to FIG. 13. First, in S442, the CPU 12 searches the content of the working memory 19 to find out an upper-closest binary value matrix H and a lower-closest binary value matrix L for a subject matrix Di to be processed. The upper-closest binary value matrix H is defined as a binary value matrix FiH which has been already obtained through the conversion process (S410 or S440) based on a uniform density matrix DiH whose density value iH is higher than the present value i but is closest to the present value i. The lower-closest binary value matrix L is defined as a binary value matrix FiL which has been already obtained through the conversion process (S410 or S440) based on a uniform density matrix DiL whose density value iL is lower than the present value i but is closest to the present value i.

The present routine from S440–S470 is repeated while i is incremented one by one until i reaches the desired density of 128, in this example. Accordingly, for each matrix Di, the upper-closest matrix H is always the matrix F255, and the lower-closest matrix L is always a matrix F(i−1). For example, when the present value i is equal to one, the upper-closest matrix H and the lower-closest matrix L are the matrices F255 and F0, respectively. When the present value i is equal to two, the upper-closest matrix H and the lower-closest matrix L are the matrices F255 and F1, respectively.

It is noted that according to the present embodiment, it is desirable to finally obtain a threshold value matrix in which a half of the elements have discrimination values "0" and a half of the elements have discrimination values "1". Accordingly, the desired density i is set to 128 ($\approx$255/2), and the routine of S440–S470 is repeated until i reaches 128.

Next, in S446, the subject matrix Di is converted into a binary value matrix Fi while performing an error-distributing binary conversion operation. That is, elements (x,y) of the subject matrix Di are successively converted into binary values. It is noted that this binary conversion process of S446 is modified to satisfy the following conditions:

[1] The density value i at each element (x,y) on the subject matrix Di is compulsively converted into an "ON" state (1) when corresponding elements (x,y) on both of the upper-closest and lower-closest matrices H and L have been converted into "ON" states (1); and

[2] The density value i at each element (x,y) on the subject matrix Di is compulsively converted into an "OFF" state (0) when corresponding elements (x,y) on both the upper-closest and lower-closest matrices H and L have been converted into "OFF" states.

It is noted that the conditions [1] and [2] can be said differently that the density value i at each element (x,y) on each matrix Di is converted so that if the corresponding elements (x,y) on both the upper-closest and lower-closest matrices H and L are equal to each other, the density value i at the each element (x,y) on the matrix Di is compulsively converted into the value the same as that of the corresponding elements (x,y) on the matrix H or L.

In more concrete terms, when the corresponding elements (x,y) on the matrixes L and H have been converted into different binary values, an ordinary error distribution binary process is attained for the subject element (x,y). That is, the density value i(x,y) of a subject element (x,y) is added with a sum E of errors distributed from neighboring elements, and the thus modified density value I(x,y) is compared with the predetermined threshold value t (128, in this example). When the modified density I(x,y) is higher than the threshold t, the element is determined as ON (1). When the modified density I(x,y) is equal to or lower than the threshold t, on the other hand, the element (x,y) is determined as OFF(0). A generated error e will be distributed to neighboring elements.

Contrarily, when the binary states of the corresponding elements on the matrices L and H are the same as each other and therefore satisfy the above-described condition [1] or [2], the above-described threshold-comparing operations are not conducted. That is, after the density value i(x,y) of the subject element (x,y) is modified by the error sum E distributed from neighboring elements, the modified density I(x,y) of the subject element is automatically converted into ON or OFF according to the above-described condition [1] or [2]. Thereafter, a binary conversion error "e" is determined as a difference between the thus determined binary value (255 (On) or 0 (OFF)) and the modified density value I(x,y). The error will be distributed to neighboring elements. That is, when the subject element satisfies the condition [1], the element is turned ON regardless of a relationship between the modified value and the predetermined threshold value t. When the subject element satisfies the condition [2], the element is turned OFF regardless of a relationship between the modified value I(x,y) and the predetermined threshold value t.

When all the elements in the matrix Di are thus converted into binary values and the matrix Di is completely converted into a binary value matrix Fi, the matrix Fi is stored in the memory 19 in S450. Then, in S460, the CPU 12 judges whether or not the present density value i is equal to 128. Because the density value i is first set to one (1) (No in S460), the program proceeds to S470 where the uniform density value "i" is incremented by one. Then, the program returns to S440. In S440, the CPU 12 converts the matrix D2, whose all the elements have the density of two (2), into a binary matrix F2. In S450, the matrix F2 is stored in the working memory 19.

The above-described processes of S440, S450, and S460 are repeated to convert a uniform density matrix Di into a binary matrix Fi and then to store the matrix Fi while the uniform density value i is incremented one by one in S470. When the processes of S440 and S450 for the uniform density matrix D128 (i=128) are completed, the working memory 19 stores therein 130 binary value matrices F0–F128 and F255 as shown in FIG. 15, which are obtained based on the uniform density matrices D0–D128 and D255. Because the desired density value i is now equal to 128 ("yes" in S460), the binary matrix F128 (i=128) is stored in S480 in the threshold value matrix storage portion 14 as a binary threshold value matrix Mat2( ).

FIG. 16(a) illustrates how each element position (x,y) on each matrix Di is turned ON or OFF in S446. As apparent from the drawing, for each element position (x,y), when a certain element on a certain matrix Di is turned ON, corresponding elements i'(x,y) on all the subsequent matrices Di'(i'>i) satisfy the condition [1] and therefore are turned ON. This is because during the binary conversion process of S446, binary conversion is performed while considering, with using the conditions [1] and [2].

If the conversion process is achieved without referring to the above-described condition [1] or [2], even when a certain element i(x,y) on a certain matrix Di is turned ON, corresponding elements i'(x,y) on the subsequent matrices Di' (i'>i) may possibly be turned OFF as shown in FIG. 16(b). Accordingly, ON and OFF elements will be distributed nonuniformly. However, according to the present embodiment, occurrence of ON and OFF will be uniformly distributed. Accordingly, the produced binary threshold matrix Mat2( ) can convert continuous tone images into high quality pseudo-half tone images with high resolution and with restrained undesirable textures in comparison to the case where the binary threshold matrix Mat2( ) were produced without referring to the condition [1] or [2].

FIG. 17(a) shows a part of the binary matrix F128 obtained according to the present embodiment. In the drawing, black dots represent ON elements, and white dots represent OFF elements. FIG. 17(b) shows a part of another binary matrix F192 which is obtained according to the present embodiment when the process of FIG. 12 is performed until i reaches 192. As apparent from each drawing, both of the ON dots and OFF dots are distributed over the matrix uniformly to a proper extend but still nonperiodically.

Each of the thus produced binary threshold value matrices F128 and F192 is used as a threshold matrix Mat2( ) in the above-described error diffusion image conversion process of FIG. 9. The same advantages as obtained in the first embodiment are attained. That is, continuous tone images can be converted into high quality binary images without any undesirable textures or any nonuniformity in dots.

Next will be given a detailed description of the error-distributing binary conversion operation employed in each of S410 and S446.

Figure 12:
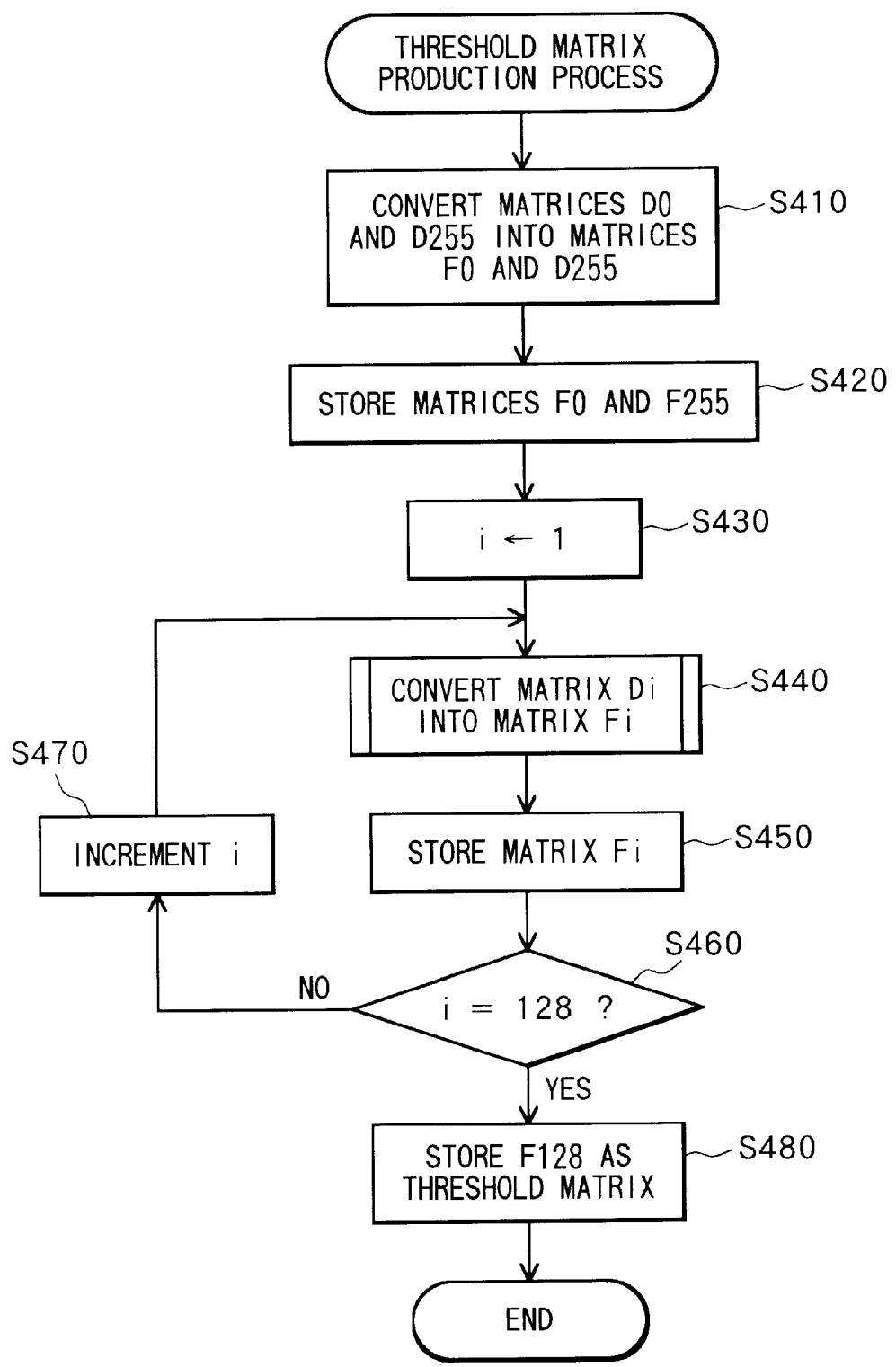
FIG. 12 is a flow chart of a threshold matrix production process of a second embodiment.

It is noted that the error buffer 16 is used for storing errors obtained during the process of FIG. 12. The error buffer 16 has M by N memory locations (0, 0)–(M−1, N−1) where M and N are integers higher than one. As shown in FIG. 14, in each uniform density matrix Di, elements are arranged in N element lines and in M element columns. A main scanning direction X is defined along each element line, and an auxiliary scanning direction Y is defined along each element column. All the element positions are defined by (x, y) coordinates along X and Y axes. An original element point (0,0) is located at an upper-and-left corner of each matrix Di. A last element point (M−1, N−1) is located at a lower-and-right corner of each matrix Di. The M element columns are arranged in the main scanning direction x from a leading edge AE to a trailing edge BE. During the binary conversion process, the elements are processed from left to right along each element line in the main scanning direction X. The element lines are processed from top (leading element line L0) to bottom (trailing element line Lx) in the auxiliary scanning direction Y. That is, the elements (0, 0), (1, 0), . . . , and (M−1, 0) are first processed in this order.

When the element (M−1, 0) is processed, the processing for the next element line is started. That is, elements (0, 1), (1, 1), . . . , and (M−1, 1) are processed in this order. In the same manner, the subsequent element lines are successively processed. Then, elements (0, N−1), (1, N−1, 1), . . . , and (M−1, N−1) are processed in this order. Then, the process for the entire matrix Di is completed.

A first example of the binary conversion process will be described below. This example employs the minimized average error method.

When a certain element (x, y) is subjected to the conversion process, the density value i(x, y) of the subject element (x, y) is modified by a sum E of fractional portions of binary errors "e" which are generated at already-processed twelve neighboring elements. The modified density value I(x, y) is calculated as follows:

$$I(x, y)=i(x,y)+E$$

It is noted that the binary error sum E is calculated based on a coefficient matrix α and the binary errors "e" generated during the conversion processes at neighboring twelve elements. That is, $$E(x,y)=(1/\Sigma \alpha ab)\times \Sigma(\alpha b \times eab)$$

The coefficient matrix α is shown below. (This matrix α is stored in the memory 13.)

$$\alpha \equiv \begin{pmatrix} 1 & 3 & 5 & 3 & 1 \\ 3 & 5 & 7 & 5 & 3 \\ 5 & 7 & * & & \end{pmatrix}$$

α ab is a coefficient value located at a location (a, b) in the matrix α. −2≦a≦2, −2≦b≦0. eab is a binary conversion error e(x+a,y+b) generated at a neighboring element (x+a, y+b). The neighboring element (x+a,y+b) is located at a position corresponding to a location (a, b) relative to the subject element (x,y) indicated by * in the coefficient matrix α. The error eab, i.e., e(x+a,y+b) is retrieved from a corresponding location (x+a,y+b) of the error buffer 16. For example, the subject element (x,y) receives a 5/48th part of an error generated at the element (x−2, y). Thus, the subject density value i(x,y) is added with a sum E of the error fractions distributed from the already-processed twelve neighboring elements.

The modified density I(x, y) is compared with a predetermined threshold t (128, for example) which is also stored in the memory 13. When I(x, y)>t, the subject element (x, y) is turned ON. That is, the subject element density is converted into V(x,y) of one (1). When I(x, y)≦t, on the other hand, the subject element (x, y) is turned OFF. That is, the subject element density is converted into V(x,y) of zero (0).

It is noted that in S440, if the condition [1] or [2] is satisfied for the subject position (x, y), the above-described comparing-and-binarization operation is not performed, but the subject density value I(x, y) is compulsively converted into a binary state value V(x,y) which is the same as that of the binary value V(x,y) already obtained on the corresponding position (x,y) on the matrix H or L.

When the subject element is turned ON, a binary conversion error e(x, y) is calculated in the following formula:

$$e(x, y)=I(x, y)-255$$

When the subject element is turned OFF, on the other hand, a binary conversion error e(x, y) is calculated in the following formula:

$$e(x, y)=I(x, y)$$

Thus calculated binary conversion error e(x, y) is stored in the buffer 16 at a corresponding location (x,y).

The above-described calculations are successively performed for all the elements (x, y) in the subject matrix Di. As a result, the subject matrix Di is converted into a corresponding binary matrix Fi.

A second example of the binary conversion operation will be described below. This example employs the error diffusion method.

When a certain element (x, y) is subjected to the conversion process, an error sum E(x, y) is retrieved from the corresponding memory location (x, y) in the buffer memory 16. The error sum E is an accumulated amount of errors distributed from already-processed twelve neighboring elements. The density value i(x, y) is modified by the error sum E(x, y). That is, the modified density I(x, y) is calculated through the following formula:

$$I(x, y)=i(x, y)+E(x, y)$$

The modified density I(x, y) is compared with the predetermined threshold value t (128). When I(x, y)>t, the subject element is turned ON. That is, the subject element density is converted into the binary value V(x,y) of one (1). When I(x, y)≦t, the subject element is turned OFF. That is, the subject element density is converted into the binary value V(x,y) of zero (0).

It is noted that in S440, if the condition [1] or [2] is satisfied for the subject position (x, y), the above-described comparing-and-converting operation is not performed. Instead, the subject density value i(x, y) is compulsively converted into a binary state value V(x,y) which is the same as that of the binary state value V(x,y) already determined for the corresponding position (x, y) on each matrix H or L.

When the subject element (x, y) is turned ON, a binary conversion error e(x, y) is calculated for the subject element in the following formula:

$$e(x, y)=I(x, y)-255$$

When the subject element is turned OFF, on the other hand, a binary conversion error e(x, y) is calculated for the subject element in the following formula:

$$e(x, y) = I(x, y)$$

Thus produced binary conversion error e(x, y) is then distributed to the neighboring twelve elements not yet processed. This distributing operation is performed in a weighted basis defined by the matrix Bmat'( ) shown in FIG. 3 in the same manner as in the step S9 in FIG. 1. It is noted that the matrix Bmat'( ) is stored in the memory 13. Thus, the binary conversion error e(x, y) is broken up into twelve parts, and are distributed to twelve neighboring elements not yet processed. For example, 7/48th part of the error e(x,y) is provided to the next element (x+1, y) on the same element line.

The above-described calculations are successively performed for all the elements (x, y) in the subject matrix Di. As a result, the matrix Di is converted into a corresponding matrix Fi.

In the above description, the conversion process of S440 is repeatedly performed while the uniform density value i is incremented one by one in S470. Accordingly, the condition [2] is not necessarily referred to. In this case, each matrix Di may be converted into a matrix Fi while simply referring to the already-processed lower-closest binary matrix L (=F(i−1)). Each element (x,y) on each matrix Di may be compulsively turned ON when a corresponding element (x,y) on the lower-closest binary matrix L has been turned ON. That is, when ON appears on a certain element (x,y) at a certain matrix Di, the CPU 12 may continue turning ON the corresponding elements (x,y) of subsequent matrices Di' (i'>i).

Or, the conversion process of S440 may be repeatedly performed while the uniform density value i is decreased one by one from 254 to the desired value (128 in this example). In this case, the conversion process can be performed while referring only to the condition [2]. In this case, each matrix Di may be converted into a matrix Fi simply referring to the already-processed upper-closest binary matrix H (=F(i+1)). Each element (x,y) on each matrix Di may be compulsively turned OFF when a corresponding element (x,y) on the upper-closest binary matrix H has been turned OFF. That is, when OFF appears on a certain element (x,y) at a certain matrix Di, the CPU 12 may continue turning OFF the corresponding elements (x,y) in the subsequent matrices Di (i<255).

Or, the processes of S440–S470 can be modified to determine a value i of a subject matrix Di to be processed, as a central value between density values i of already-processed two matrices Di, and then to process the subject matrix. That is, the conversion process of S440 is successively achieved onto a matrix Di whose value (i) is equal to the exact center of the values iH and iL of its already-processed upper-closest and lower-closest matrices H and L. The uniform density values i of 1 to 254 may be previously arranged so that each density value i is equal to a central integer between its upper-closest density value iH and its lower-closest uniform density value iL. For example, in the first routine of S440–S470, a matrix D128, whose density value i (=128) is equal to the center of the density values of the already-produced binary matrices F0 and F255, is first processed into a matrix F128. Then, a binary matrix D64, whose density value i (=64) is equal to the center of the density values of the already-produced binary matrices F0 and F128, is processed into a matrix F64. Next, a matrix D191, whose density value i (=191) is equal to the center of the density values of the already-produced binary matrices F128 and F255, is processed into a matrix F191. Thus, the matrices Di, whose densities i are about the center between the densities of the already-processed upper-closest and lower-closest matrices H and L, are successively converted into matrices Fi while referring to the conditions [1] and [2].

[Third Embodiment]

A third embodiment of the present invention will be described below with reference to FIGS. 18 and 19.

In the second embodiment, the binary threshold matrix Mat2( ) is produced to have a size of M×N which is the same as those of the uniform density matrices D0–D128 and D255. In other words, the binary threshold matrix Mat2( ) is produced based on all the binary states of the elements (0,0)–(M−1,N−1) of the matrix D128. However, according to the present embodiment, the binary threshold matrix Mat2( ) is produced to have a size much smaller than those of the matrices D0–D128 and D255. In more concrete terms, the binary threshold matrix Mat2( ) is produced based on only a predetermined area within the matrix F128.

Figure 18:
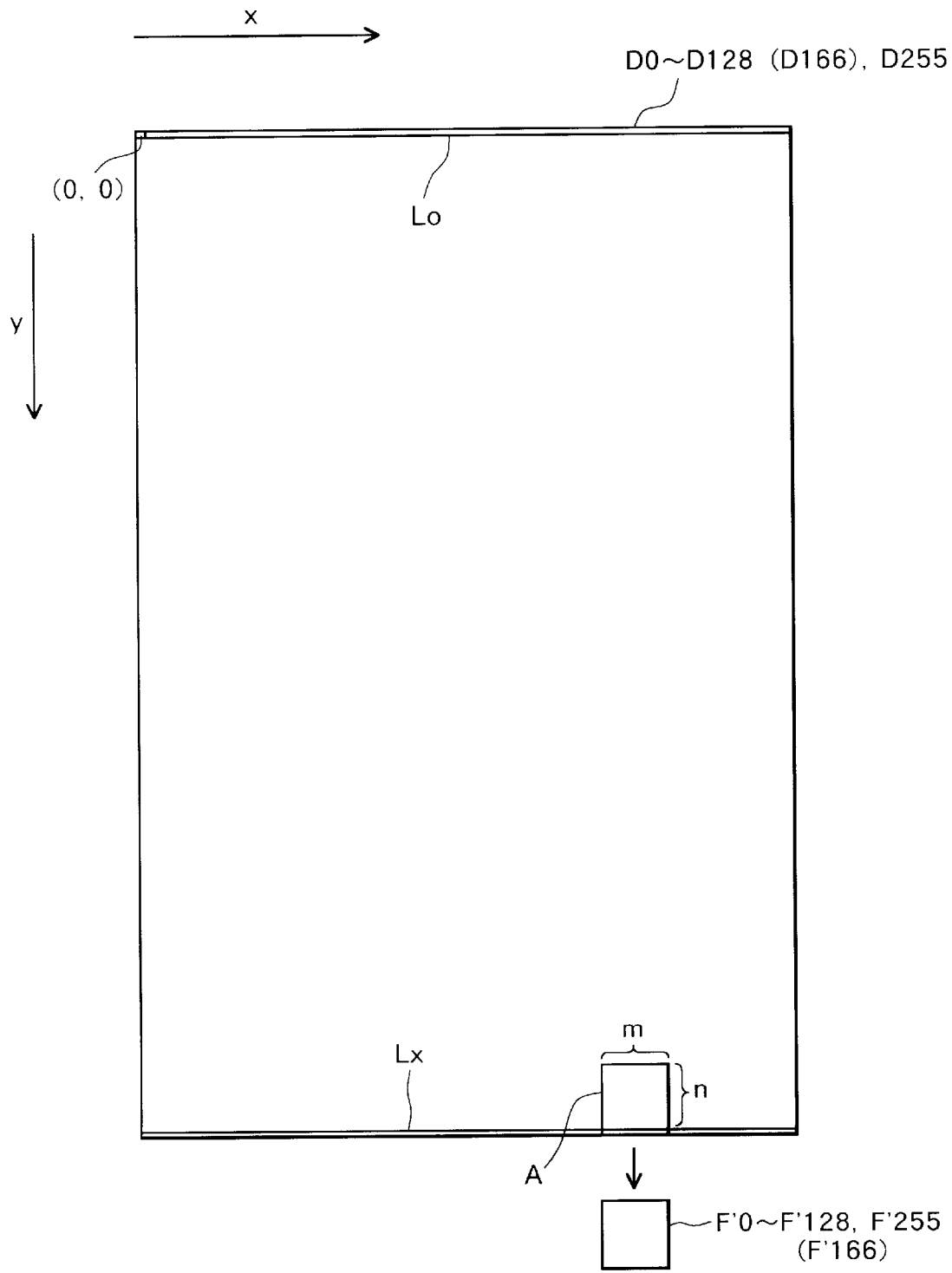
FIG. 18 illustrates a relationship between a predetermined area used for producing a threshold matrix in each uniform density matrix according to a third embodiment.

As shown in FIG. 18, a region A is defined within each matrix Di. According to the present embodiment, when the elements in each matrix Di are converted into binary values, binary values of only the elements within the region A are stored in the working memory 19. Accordingly, binary value -matrices F0' through F128' and F255' are produced based on binary values obtained on only elements located within the regions A of the corresponding matrices D0–D128 and D255.

According to this example, the region A is located at the same position throughout all the matrices D0–D128 and D255. The region A is constructed from m by n elements. As also shown in FIG. 18, the region A does not include the leading element line L0, but includes the last element line Lx. The region A is thus set for the following reasons: The error distribution binary conversion operation is started from the leading element line L0 and ended at the last element line Lx. No element lines exist preceding the leading element line L0. When the element values on the leading element line L0 are converted into binary values, the produced errors are distributed to neighboring elements on the same and following lines. Accordingly, much more distortions are liable to occur in the binary states at the elements on the leading element line L0 than at elements on the succeeding element lines. Accordingly, there is a possibility that dots generated in the leading element line L0 will tend to be concentrated around certain elements and therefore will generate undesirable dot patterns. However, effects from these distortions decrease away from the leading element line L0. The distortion effects become minimum at the last element line Lx.

Next, the binary threshold matrix producing process according to the present embodiment will be described below in greater detail with reference to FIG. 19.

Figure 19:
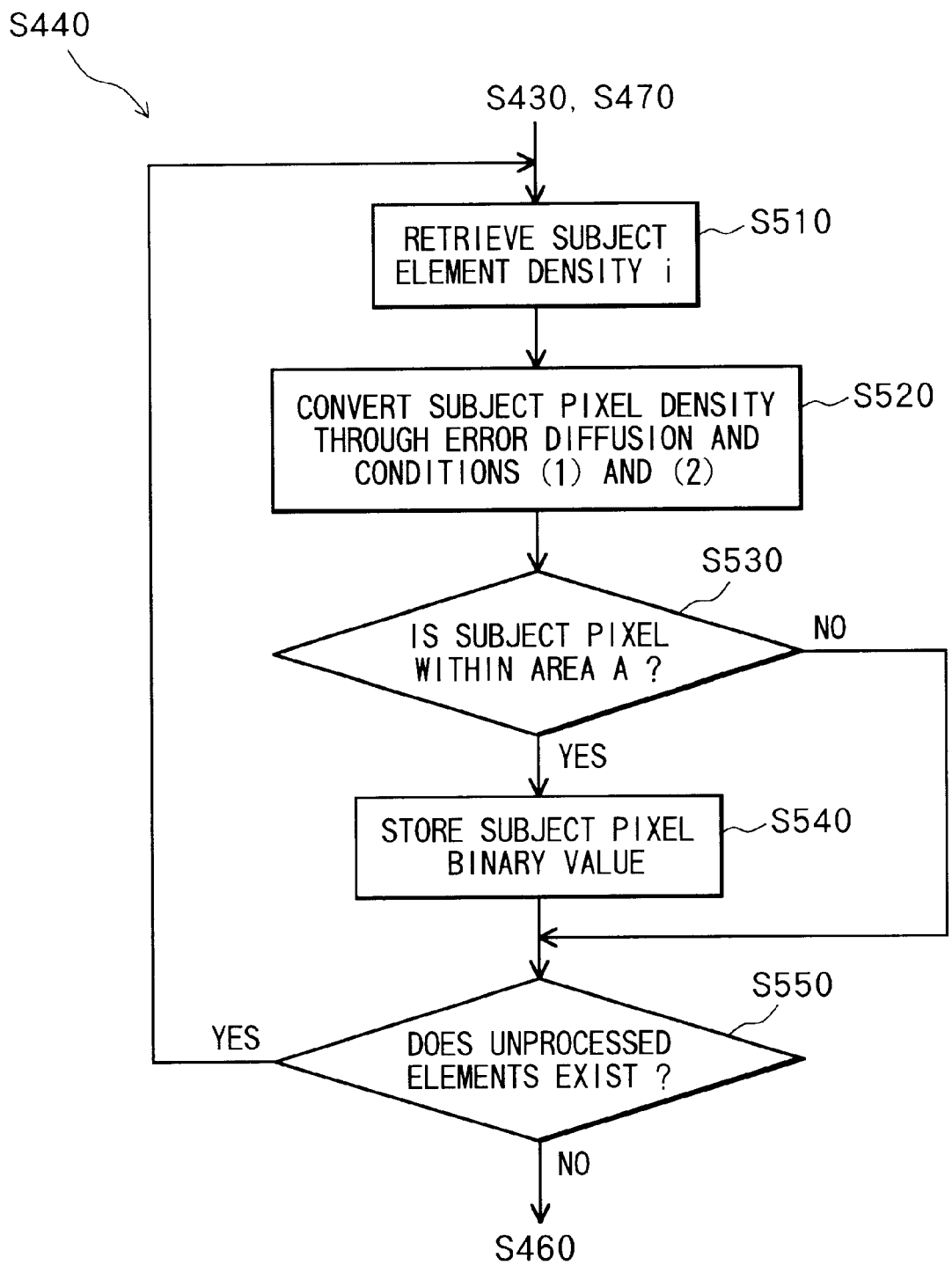
FIG. 19 shows a part of the binary matrix production process according to the third embodiment.

The process is the same as that of the second embodiment except that S440 and S450 of the second embodiment are replaced with steps S510–S550 shown in FIG. 19. That is, after the uniform density value i is set in S430 or 470, density value i(x,y) (=i) of one element (x,y) in the subject matrix Di (i=0) is retrieved from the working memory 19 in S510. In this example, the subject element (x,y) is initially located on the original point (0, 0).

Next, in S520, the density value i(x,y) of the subject element is converted into a binary value V(x,y) of 0 or 1 while performing the error distribution binary conversion operation and while referring to the conditions [1] and [2]. That is, the density value i(x,y) is modified into a modified value I(x,y) by an error sum E from neighboring elements. If any of the conditions [1] and [2] are not satisfied, when I>t, V(x,y) is set to one (1), and when I≦t, V(x,y) is set to zero (0). On the other hand, if the condition [1] is satisfied, V(x,y) is compulsively set to one (1) regardless of the relationship between the I and t. Similarly, if the condition [2] is satisfied, V(x,y) is compulsively set to zero (0) regardless of the relationship between the values I (x,y) and t. Then, a binary error e(x, y) is calculated, and stored in the error buffer memory 16. That is, when employing the minimized average error method, the error e(x, y) is simply stored in a memory location (x, y) of the buffer memory 16. When employing the error diffusion method, the error e(x, y) is divided into several fractions, and stored in memory locations for neighboring unprocessed elements.

Then, it is judged in S530 whether or not the subject element (x, y) is located in the region A. When the subject element (x, y) is located in the region A (yes in S530), the binary value V(x, y) is stored in the working memory 19 at a corresponding location (x, y) in S540. When the subject element is not located in the region A (no in S530), on the other hand, the binary value V(x, y) is not stored in the working memory 19.

Next, in S550, it is judged whether or not any unprocessed elements remain in the subject matrix Di. When some unprocessed elements still exist (yes in S550), the program returns to S510 where the above-described processes are attained for the next unprocessed element. Thus, during a repeated routine of S510–S550, elements of the subject matrix Di are processed one by one in the same manner. It is noted that the judgment in S550 may be modified so as to judge whether or not any unprocessed elements exist in the region A.

When the negative judgment is achieved in S550, that is, when all the elements in the subject matrix Di have been processed, a corresponding binary value matrix Fi' is completely produced in the memory 19. Then, the program proceeds to S460 (FIG. 12) where it is judged whether or not the present value i reaches 128.

When i is not equal to 128 (no in S460), the value i is incremented by one in S470, and the program returns to S510. Then, in the same manner as described above, the next matrix Di+1 is processed to produce a corresponding matrix Fi+1'. Thus, the matrices D1–D128 are successively processed to produce binary value matrices F1'–F128'. When the affirmative judgment is attained in S460, therefore, the working memory 19 stores 130 matrices F'0–F'128 and F'255 each of which has been produced from the region A of a corresponding one of the matrices D0–D128 and D255. Each matrix Fi' is therefore constructed from only m by n elements.

Then, in S480, the binary matrix F'128 is stored in the threshold value matrix storage portion 14 as a binary threshold matrix Mat2( ). Thus, the threshold value matrix producing process is completed. The thus produced binary threshold matrix Mat2( ) is applied to the error diffusion image conversion process of FIG. 9. As a result, the same advantages are obtained as in the first and second embodiments. Especially, because the region A does not include the leading element line L0, but includes the last element line Lx, the produced matrix F'128 is not affected by the distortions which are generated at the leading element line L0 during the error distribution binary conversion process. The matrix F'128 can produce higher quality pseudo-halftone images which do not suffer from any undesirable textures.

It is noted that it may be possible to produce a binary matrix F128 in the same manner as in the second embodiment. A bilevel threshold matrix may be produced from the part A of the binary matrix F128. Or, a bilevel threshold matrix may be produced through locating two kinds of threshold values H1 and H2 in positions corresponding to the element positions in the part A of the binary matrix F128 where the two kinds of values are located.

[Fourth Embodiment]

A fourth embodiment will be described below with reference to FIGS. 20 through 22.

Figure 20:
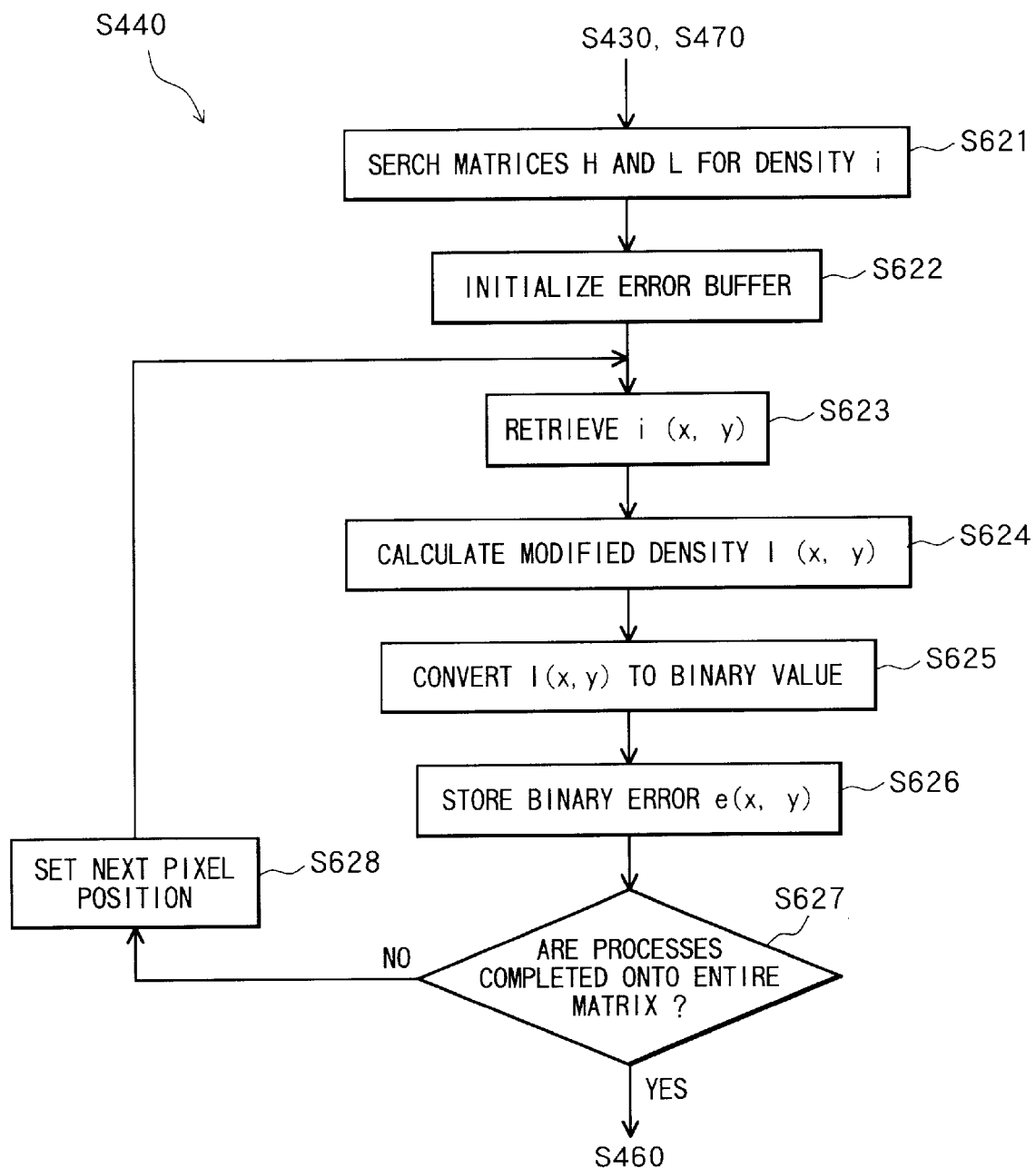
FIG. 20 shows a part of the binary matrix production process according to a fourth embodiment.

The error distribution binary conversion process of S510–S550 in the third embodiment can be replaced with processes of S621–S628 in the present embodiment as shown in FIG. 20. In this process, the minimized average error method is employed and modified as described blow.

During this process, the CPU 12 first searches in S621 both an upper-closest and lower-closest matrices H and L for the subject matrix Di (i=1) to be processed. Because the density value i is first set to a value of 1 in S430, the matrices F255 and F0, already produced in S410, are determined as the upper-closest and lower-closest matrices H and L.

Next, the error buffer 16 is initialized in S622. Then, in S623, the CPU 12 retrieves a density value i(x, y) of a subject element (x, y) in the subject matrix Di. In this example, the retrieved element is processed through the modified minimized average error method. It is noted that during a repeated routine of S623–S628, the elements are processed from left to right along each element line. The element lines are processed from top to bottom. It is now assumed that each uniform density matrix Di (i=1 through 128) has M×N elements. In the first routine of S623–S628, the upper-left original element (0,0) is processed. Every time one element (x,y) is processed in the routine of S623–S628, the next element (x+1,y) is processed in the next routine. When an element (M−1, y) is processed at a certain routine, an element (0, y+1) at the next line is processed next. Then, the process is performed for that line from left to right.

It is noted that the density values i(x,y) of all the elements (x, y) for the subject uniform density matrix Di have the same value of i. Accordingly, it is unnecessary to retrieve the value i(x,y) from the memory 19 in S623. It is possible to simply set the value i to the value i(x,y). Then, in S624, the value i(x, y) of the subject element (x,y) is modified by an error sum E through the following formula (11):

$$I(x,y)=i(x,y)+E \tag{11}$$

According the present embodiment, the error sum E is calculated by the following formula (12):

$$E(x,y)=(1/\Sigma \alpha pq) \times \Sigma(\alpha pq \times eab) \tag{12}$$

where $$\alpha \equiv \begin{pmatrix} 1 & 3 & 5 & 3 & 1 \\ 3 & 5 & 7 & 5 & 3 \\ 5 & 7 & * & & \end{pmatrix}$$

where $$a \leftarrow (x+p)\%M \tag{13}$$

$$b \leftarrow [y+q+int\{(x+p)/M\}] \tag{14}$$

where % is an operator for calculating a remainder produced when (x+p) is divided by M, int {} is an operator for calculating an integer part of a value within {}, and (p, q) is a coordinate of a neighboring element in the coefficient matrix α relative to the origin (0, 0) where the subject element * is located. $-2 \leq q \leq 0$. It is noted that when q=0, $-2 \leq p \leq -1$. When q=-1 or -2, $-2 \leq p \leq 2$.

Figure 21:
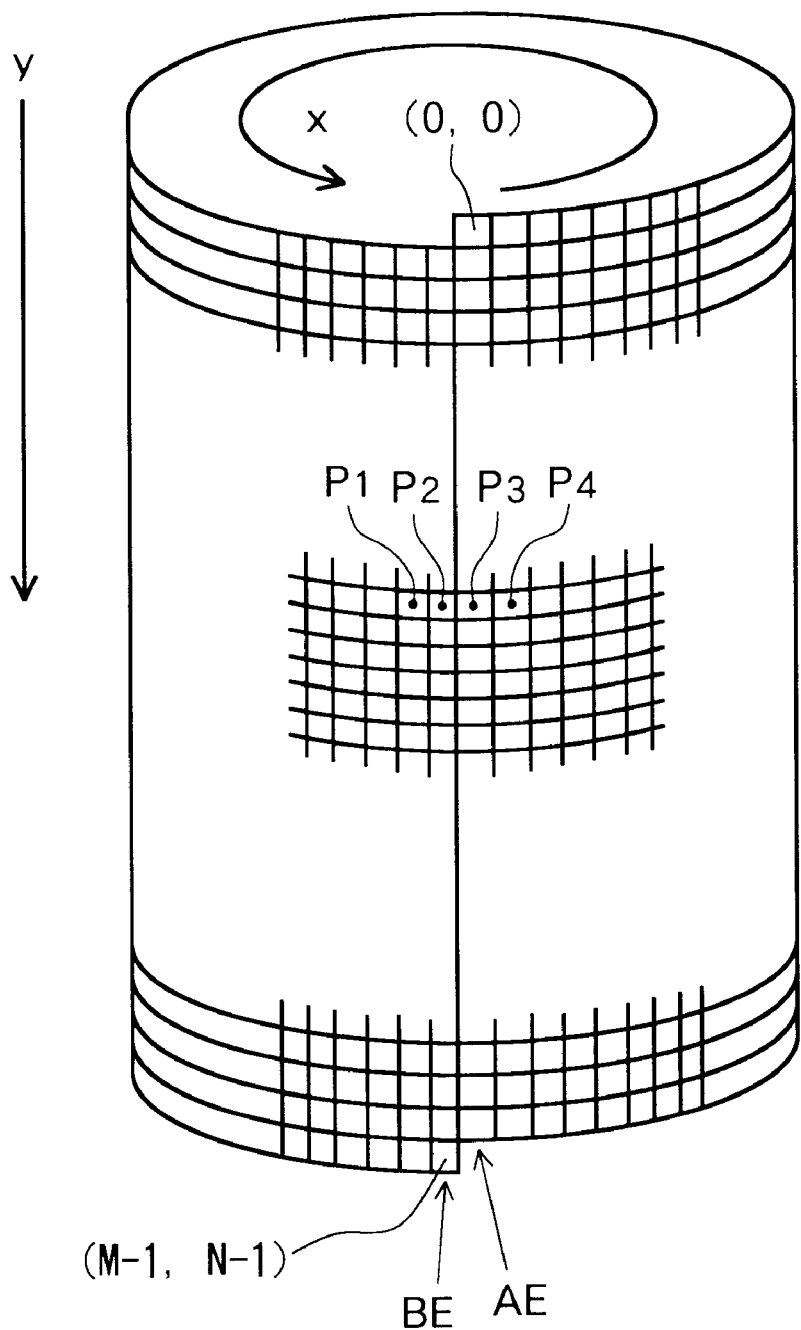
FIG. 21 illustrates how to attain continuity in performing binary conversion operation according to the fourth embodiment.
Figure 22:
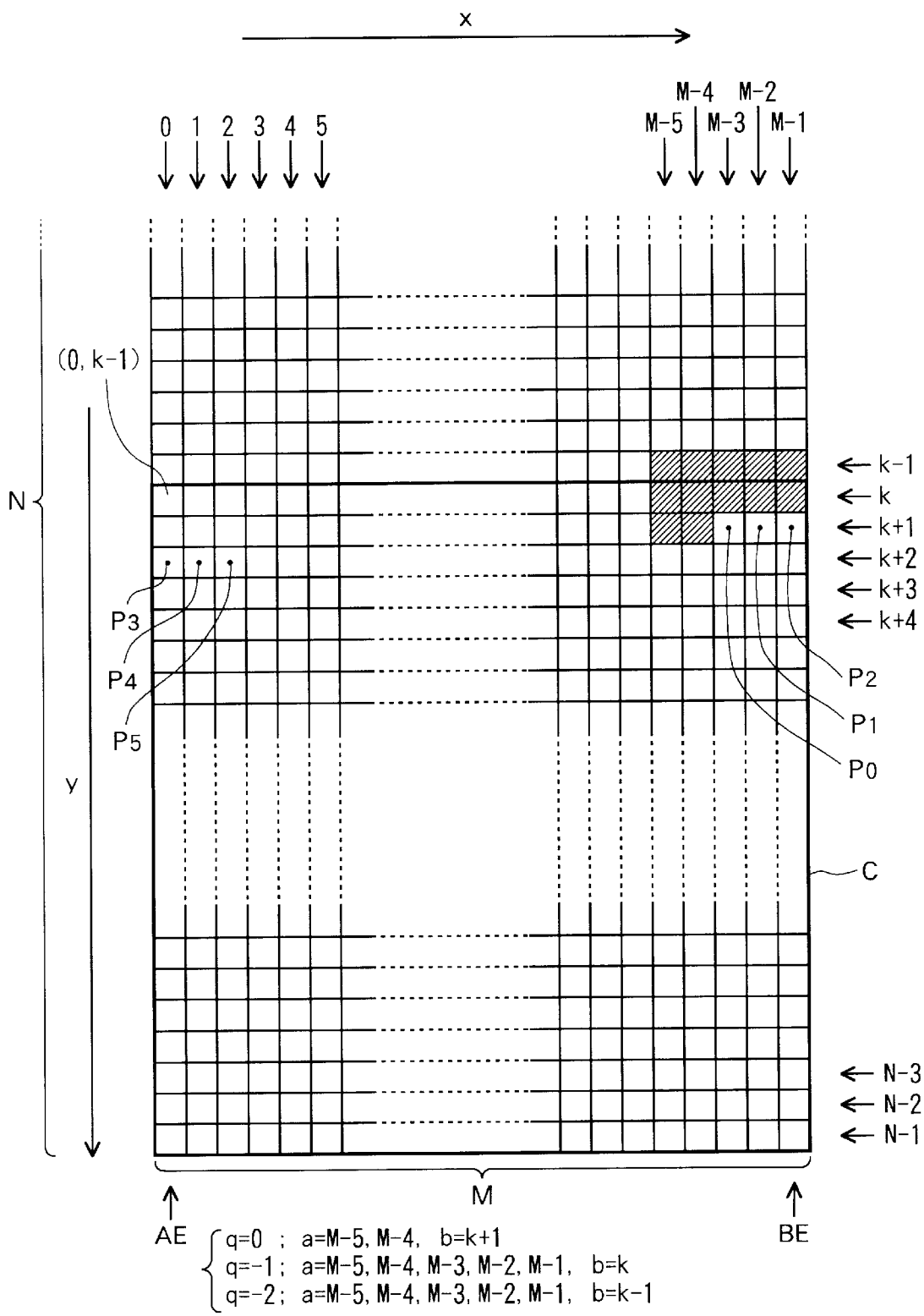
FIGS. 22(a) through 22(f) illustrate how to distribute an binarization error to neighboring pixels according to the fourth embodiment.
Figure 22:
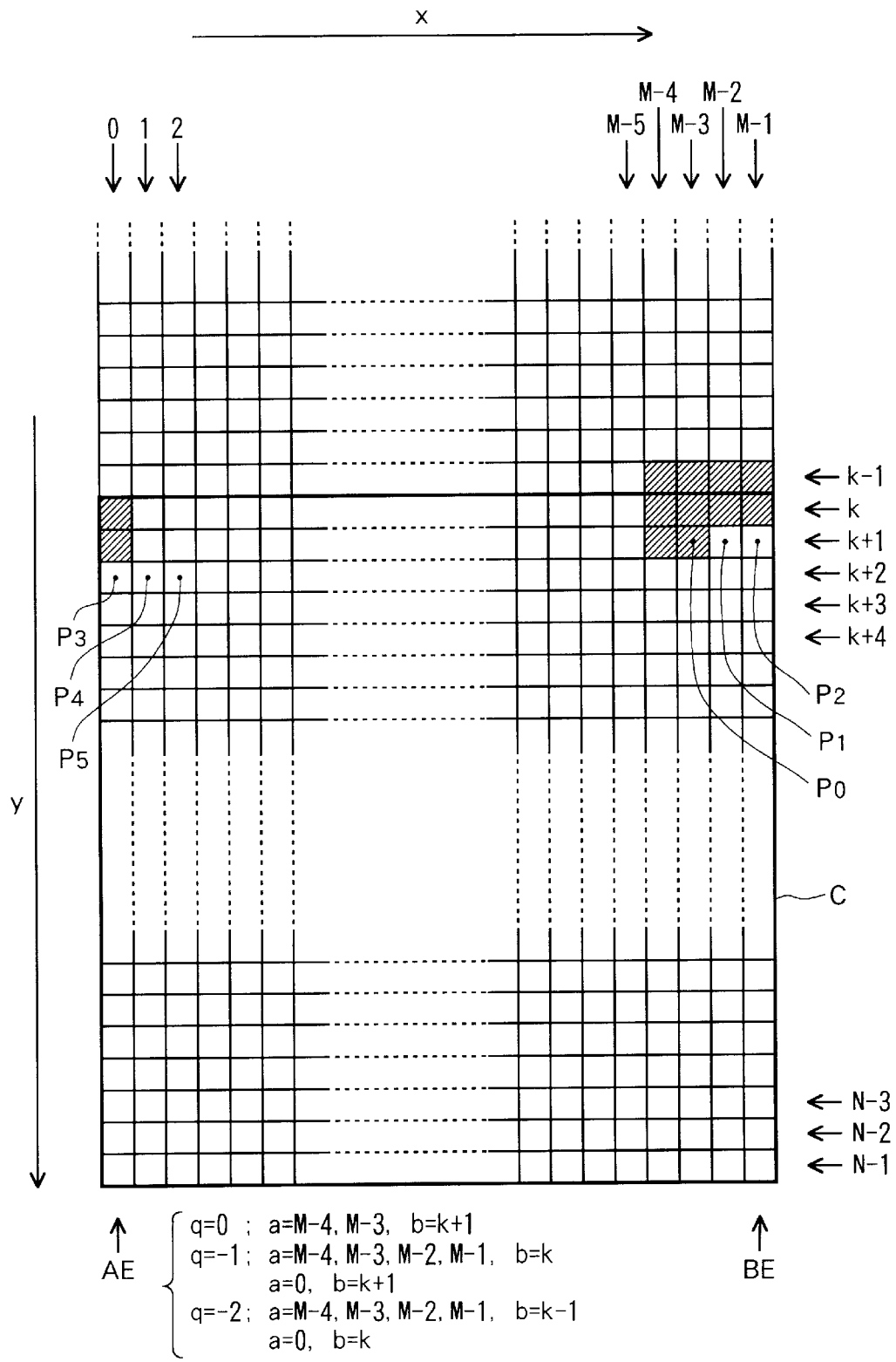
Figure 22:
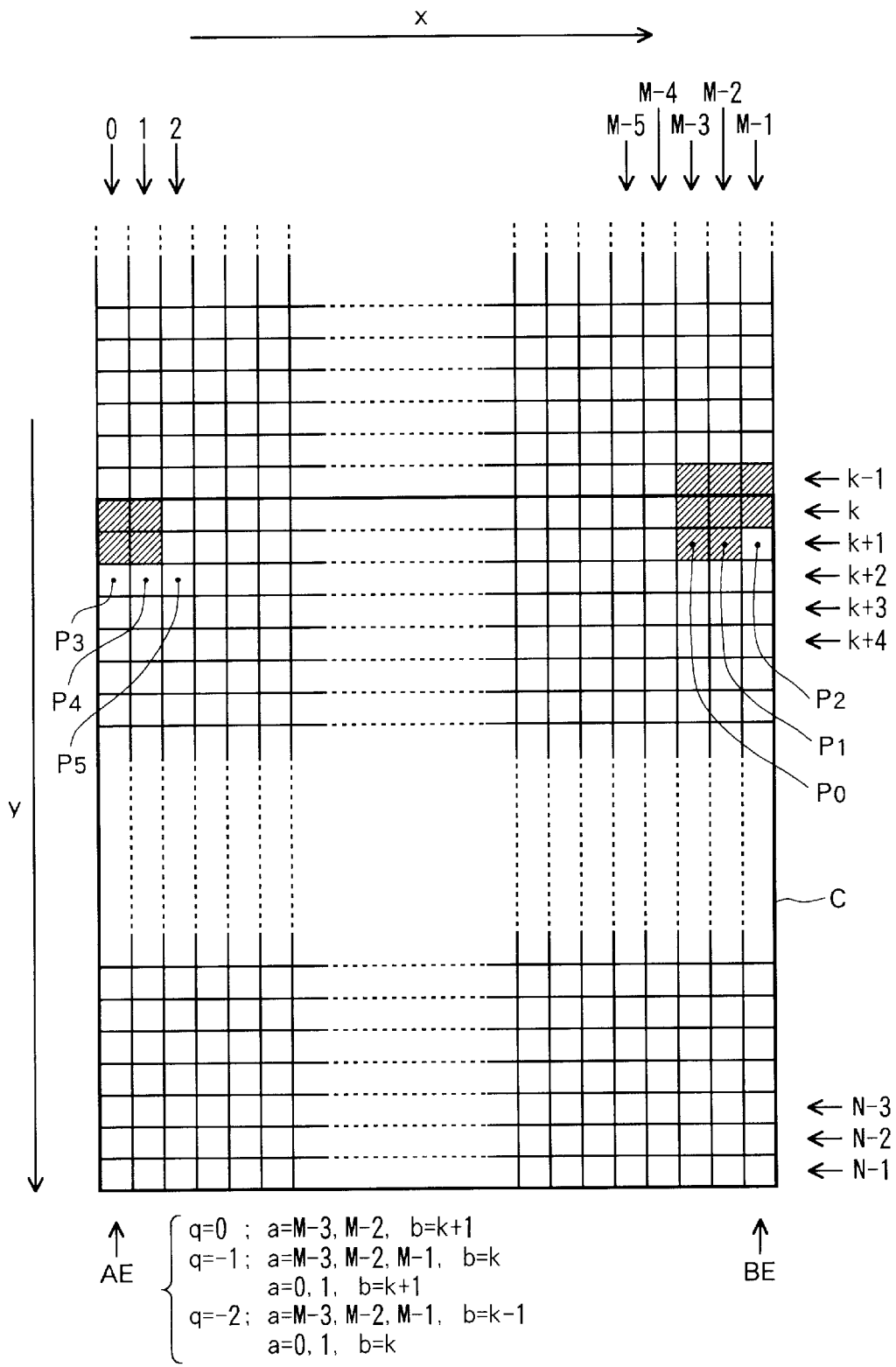
Figure 22:
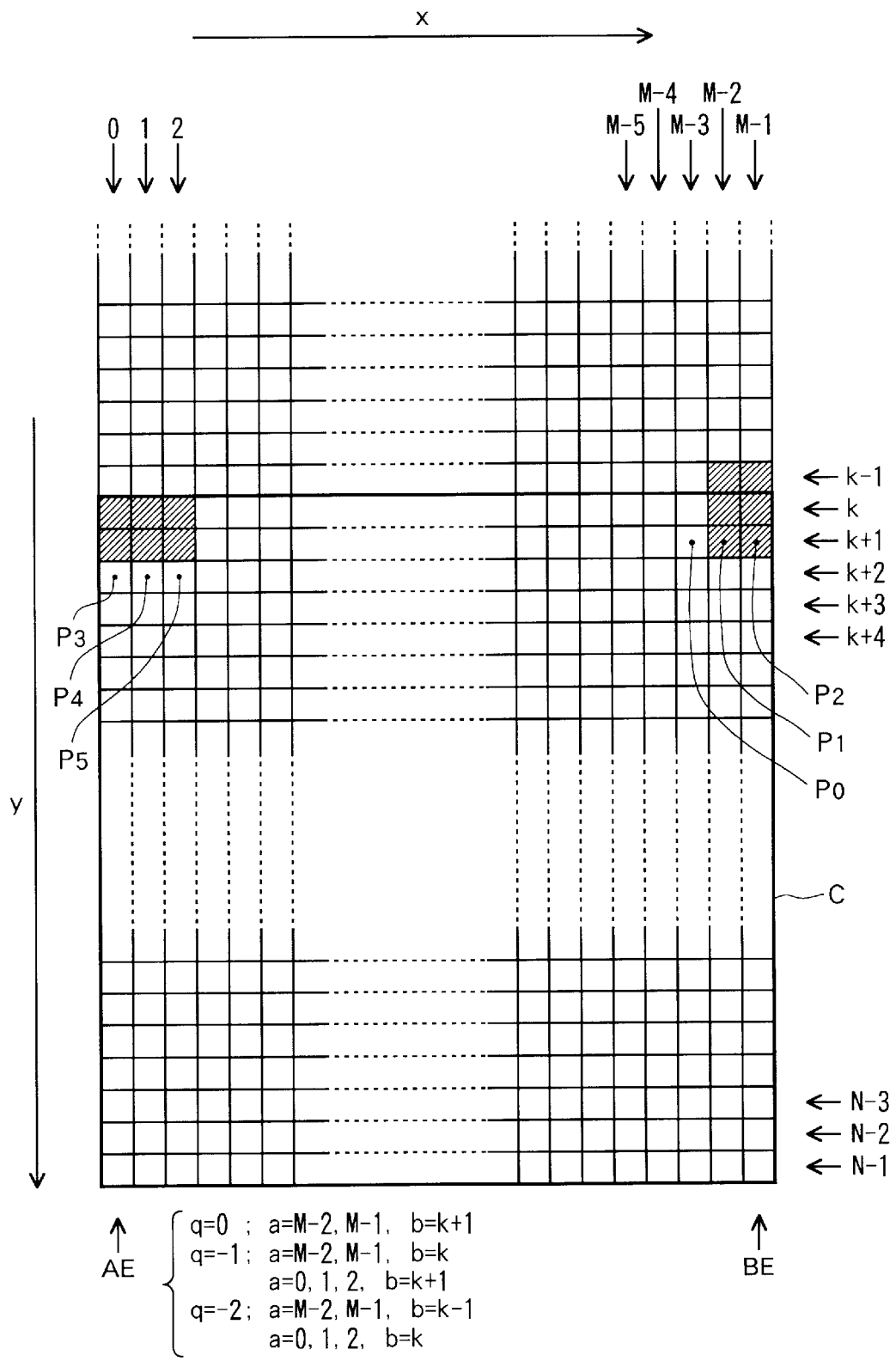
Figure 22:
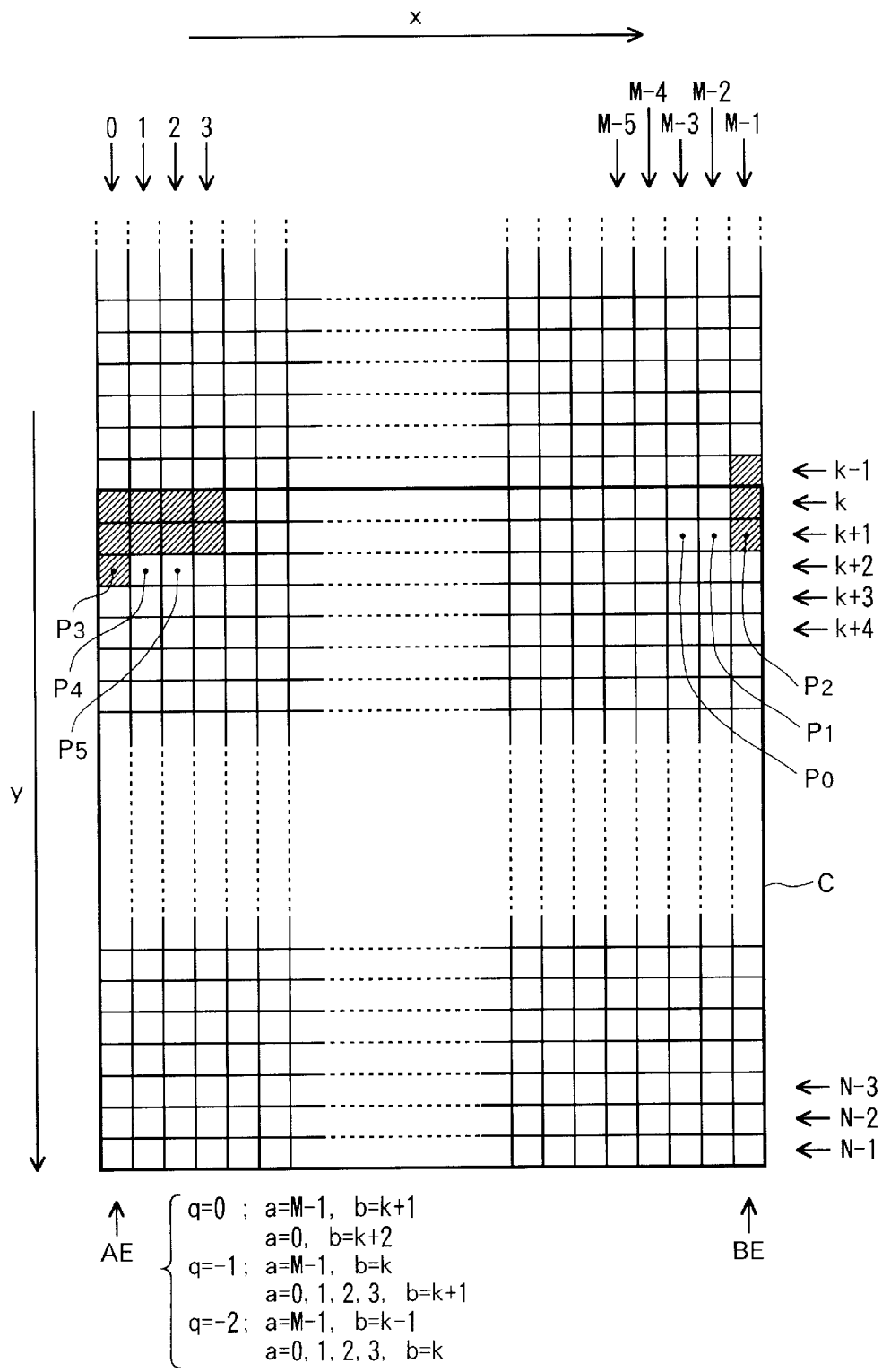
Figure 22:
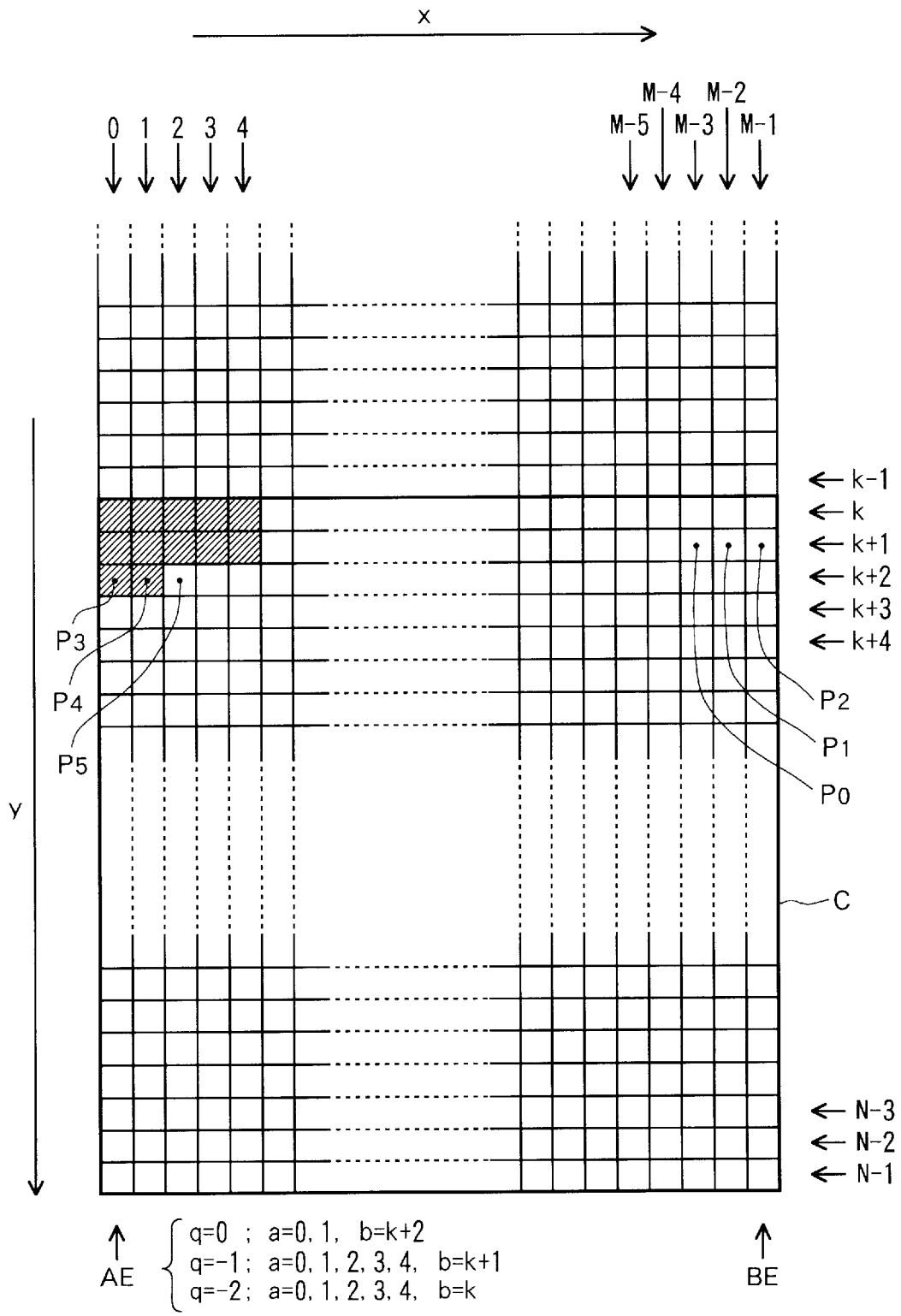

According to the present embodiment, the values "a" and "b" are set so that the leading edge AE and the trailing edge BE of the matrix Di be connected as shown in FIG. 21. Elements (M−1, y) on the trailing edge BE at respective element lines are connected to elements (0, y+1) on the leading edge AE at the next element lines. Thus, the elements are processed assuming that the "N" number of element lines continue in spiral fashion into a single scanning line.

The thus modified minimized average error method is conducted as described below.

It is now assumed that a subject element (x,y) is located at an element position P0(M−3, k+1) as shown in FIG. 22(a). (It is noted that in FIGS. 22(a)–22(f), the matrix Di is shown in its original state for simplicity and clarity.) In this case, the subject element P0 receives fractional portions of errors "e" from neighboring elements, which are indicated by slanted lines in that figure. The neighboring elements are determined by the formulas (13) and (14) wherein x and y are respectively substituted by M−3 and k+1. In this case, for q=0, a=M−5 and M−4, and b=k+1. For q=−1, a=M−5, M−4, M−3, M−2, and M−1, and b=k. For q=−2, a=M−5, M−4, M−3, M−2, and M−1, and b=k−1.

When the subject element is shifted to a next element position P1(M−2, k+1) as shown in FIG. 22(b), the subject element P1 receives errors from neighboring elements indicated by slanted lines in that figure. The neighboring elements are determined by the formulas (13) and (14) wherein x=M−2 and y=k+1. That is, for q=0, a=M−4 and M−3, and b=k+1. For q=−1, a=M−4, M−3, M−2, and M−1, and b=k, and a=0 and b=k+1. For q=−2, a=M−4, M−3, M−2, and M−1, and b=k−1, and a=0 and b=k. As apparent from the drawing, the neighboring elements, determined for distributing errors to the element P1, partly protrude out of the trailing edge BE. The protruded portion is located on the leading edge AE and is shifted downwardly by one element line from the remaining portion.

Then, in the similar manner as described above, when the subject element is located at an element position P2(M−1, k+1) on the trailing edge BE as shown in FIG. 22(c), the element P2 receives errors from neighboring elements indicated by slanted lines in that figure. The neighboring elements are determined by the formulas (13) and (14) wherein x=M−1 and y=k+1. When the subject element is further shifted to an element position P3(0, k+1) on the leading edge AE as shown in FIG. 22(d), the element P3 receives errors from neighboring elements indicated by slanted lines in that figure. The neighboring elements are determined by the formulas (13) and (14) wherein x=0 and y=k+1.

When the subject element is further shifted to the next element position P4(1, k+1) as shown in FIG. 22(e), the subject element P4 receives errors from neighboring elements indicated by slanted line in that figure. The neighboring elements are determined by the formulas (13) and (14) wherein x=1 and y=k+1. When the subject element is further shifted to the next element position P5(2, k+1) as shown in FIG. 22(f), the subject element P5 receives errors from neighboring elements indicated by slanted line in that figure. The neighboring elements are determined by the formulas (13) and (14) wherein x=2 and y=k+1.

Thus, the error distributing binary conversion operation is continuously performed while a subject element position is shifted from the trailing edge BE to the leading edge AE. Binary errors are continuously and spirally distributed from the edge BE to the edge AE.

In S624, the density value i(x,y) of the subject element (x,y) is modified by a sum E of error fractional portions distributed from its neighboring elements that are determined in the above-described manner. Thus modified density value I(x,y) is then converted into a binary state in S625. The conversion process in S625 is the same as that of the second embodiment achieved in S446. That is, when the subject element does not satisfy any of the conditions [1] and [2], the modified value I(x,y) is compared with the threshold t (128, for example). Based on the compared result, a binary state of the subject element is determined. That is, when I>t, the element is turned ON. When I≤t, the element is turned OFF. When the subject element satisfies the condition [1] or [2], the subject element (x,y) is set to the binary state of the corresponding element (x,y) at the matrix H or L.

Next in S626, the error e(x,y) is calculated by the following formula (15) or (16), and stored in the corresponding error buffer 16 for the subject element (x,y). That is, when the subject element (x, y) is turned On, the error e(x,y) is calculated by the following formula (15):

$$e(x,y)=I(x,y)-255 \qquad (15).$$

When the subject element (x, y) is turned Off, the error e(x,y) is calculated by the following formula (16):

$$e(x,y)=I(x,y) \qquad (16).$$

Next, in S627, it is judged whether or not all the elements of the subject matrix Di have been processed. When any elements remain unprocessed (no in S627), the next element position is set in S628, and the program returns to S623. When all the elements of the subject matrix Di have been processed (yes in S627), the program proceeds to S460 (FIG. 12).

The above-described operation is repeated until the matrix D128 is processed into the matrix F128.

The binary value matrix F128 is stored as a binary threshold matrix Mat2( ). When the binary threshold matrix Mat2( ) is applied to the error diffusion image conversion method of FIG. 9 to convert a continuous tone color image into a pseudo-halftone image, the advantages obtained in the second embodiment as well as the advantages described below are obtained.

According to the present embodiment, the error-distributing binary conversion process is performed assuming that elements are arranged continuously from the trailing edge BE to the leading edge AE in each matrix Di. Accordingly, it is possible to ensure continuity between the edges AE and BE in the main scanning direction. Accordingly, a binary threshold matrix Mat2( ), produced through the process of the present embodiment, will convert continuous tone image data into binary image data while preventing nonuniformity of colors or tones from occurring even at boundaries of the matrix-replicated regions.

Additionally, in each matrix Di, the elements on the trailing edge BE at respective element lines are continued to the elements on the leading edge AE at the next element lines. Accordingly, all the elements on the matrix Di are arranged spirally into a single scanning line. It is therefore possible to perform the same error distributing binary conversion operation with the same coefficient matrix α even when the element is shifted from the trailing edge BE to the leading edge AE. A binary threshold matrix Mat2( ) can therefore be produced through a simple calculation operation. The binary conversion process can be conducted more continuously, thereby more reliably preventing undesirable boundary lines from generating.

It is noted that also according to the present embodiment, only a part of the matrix F128 as produced in the above-described process may be used as a bilevel threshold matrix Mat2( ) in the same manner as in the third embodiment.

[Fifth Embodiment]

A fifth embodiment will be described below with reference to FIGS. 23–26. The fifth embodiment is directed to a method of producing a binary threshold matrix Mat2( ) which can prevent any undesirable boundary lines from appearing at upper and lower edges of the threshold value matrix-replicated regions in produced binary images.

Figure 23:
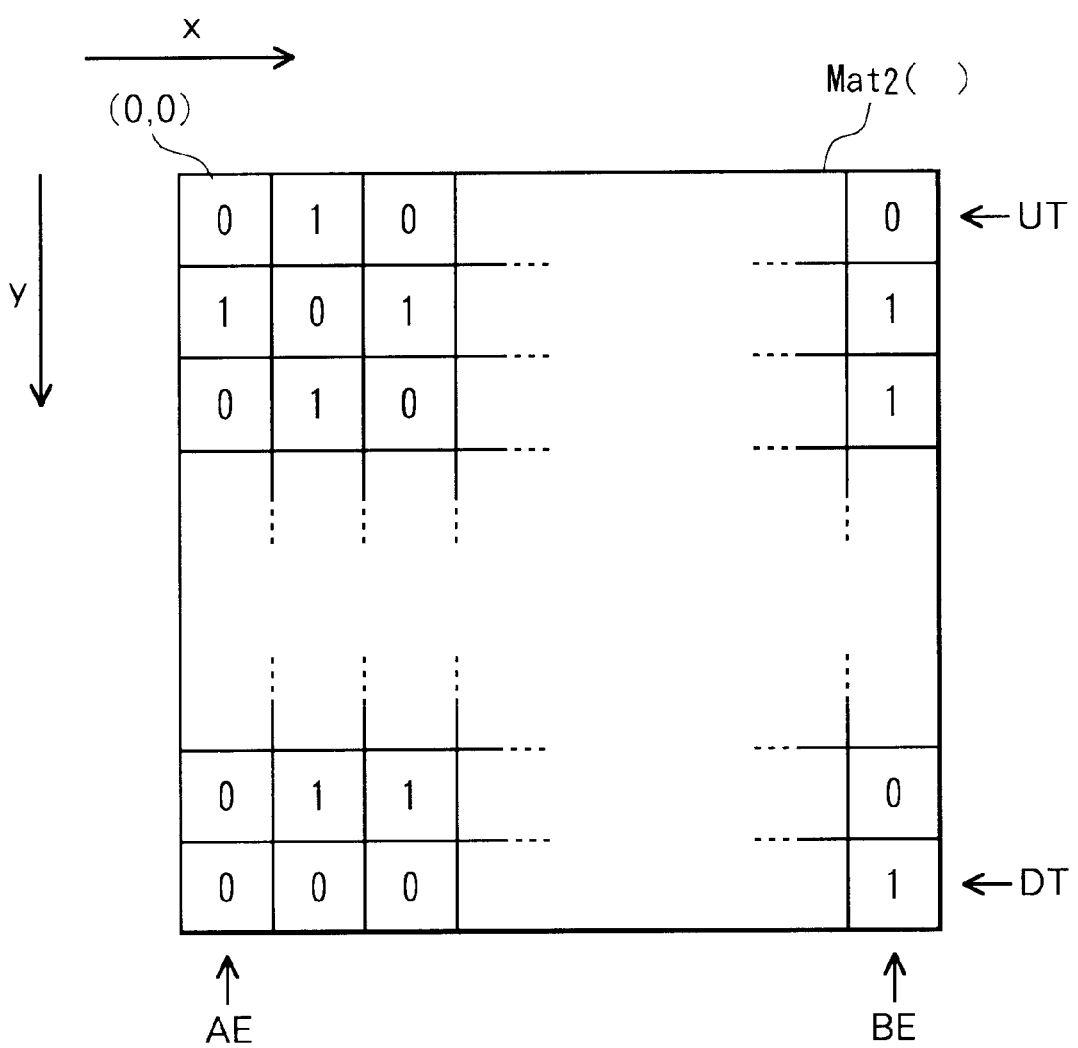
FIG. 23 illustrates one example of a produced threshold matrix.
Figure 24:
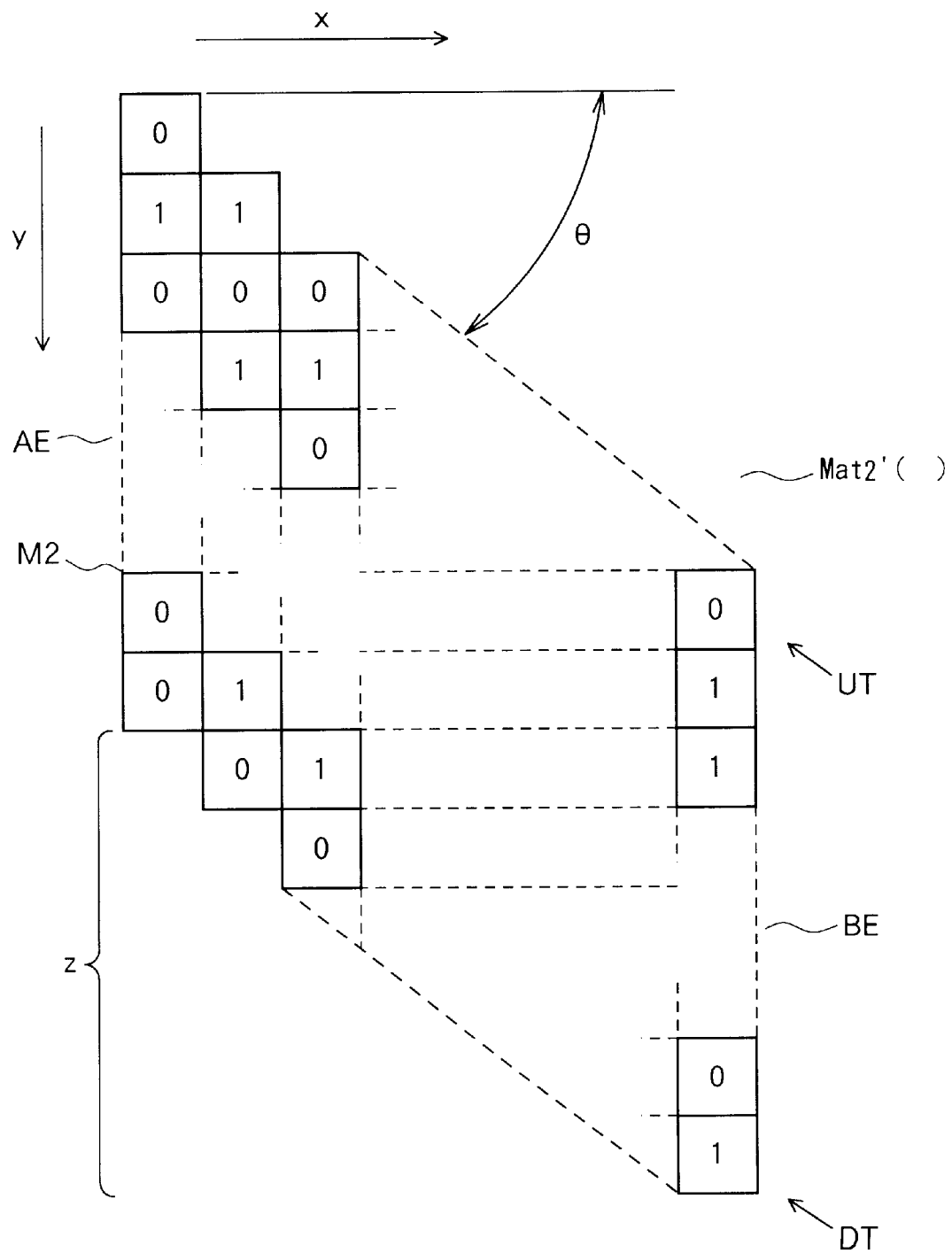
FIG. 24 illustrates one example of a threshold matrix produced based on the threshold matrix according to a fifth embodiment.

According to the present embodiment, threshold values "0" and "1" located in the binary threshold matrix Mat2( ) as shown in FIG. 23, which is produced according to each of the first through fourth embodiments, are rearranged. The threshold element columns of the matrix Mat2( ) are shifted one by one in the auxiliary scanning direction y as shown in FIG. 24. In other words, the threshold element columns arranged in the main scanning direction x are shifted one by one in the auxiliary scanning direction y. A threshold element column at the leading edge AE includes threshold values 0,1, 0, . . . , 0, and 0. A threshold element column at the trailing edge BE includes threshold values 0, 1, 1, . . . , 0, and 1. As a result, upper and lower edges of the respective columns are made inconsistent with each other.

A resultant threshold value matrix has therefore upper and lower edges UT and DT which are slanted with respect to the main scanning direction x. Thus produced threshold value matrix Mat2'( ) will be used for converting input continuous tone images into pseudo-halftone images. The edges UT and DT are thus formed as linear lines slanted with respect to the main scanning direction X with a certain angle $\theta$. The threshold value matrix Mat2'( ) therefore becomes a parallelogram shape.

Figure 25:
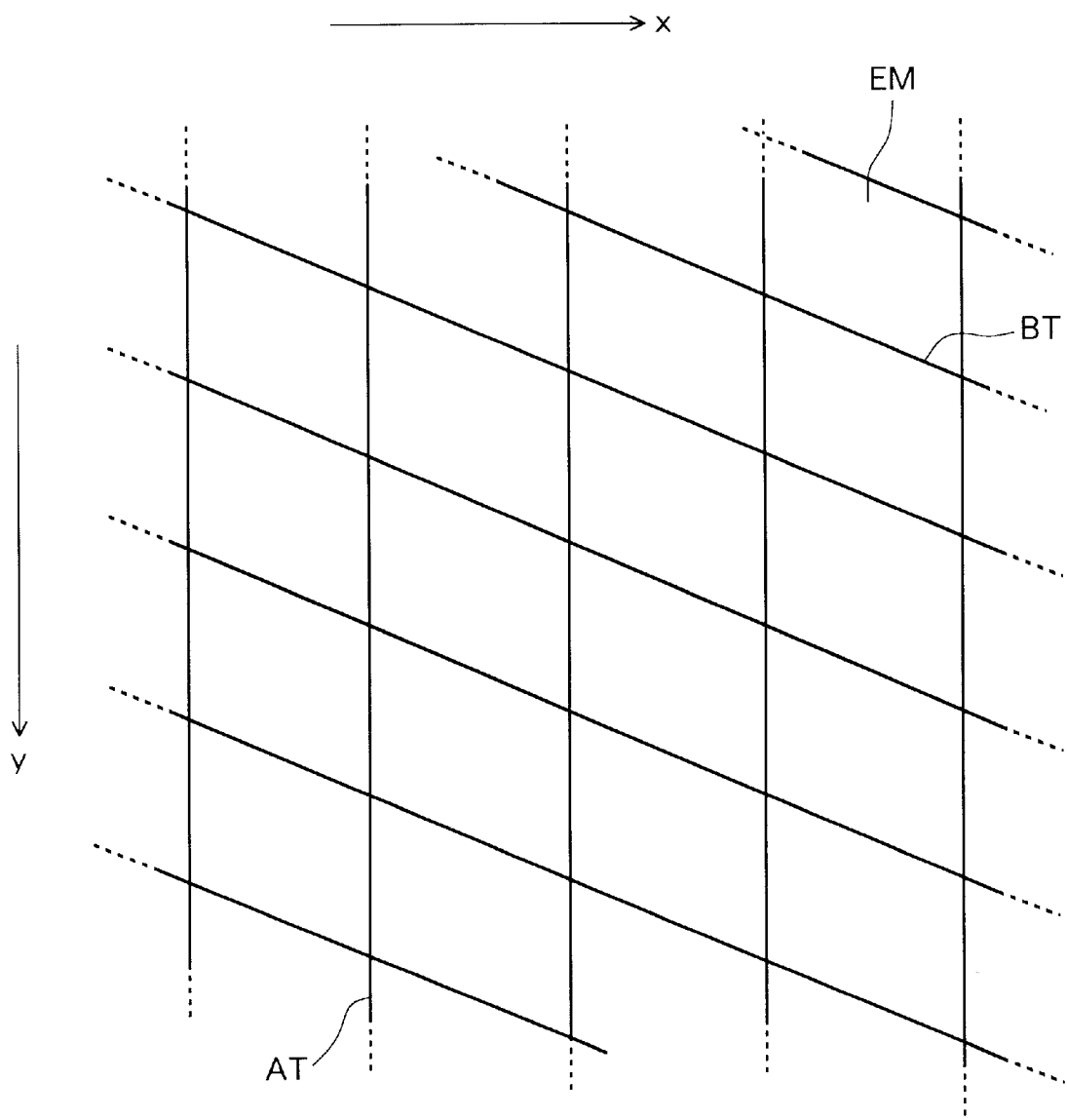
FIG. 25 illustrates how the threshold matrix of FIG. 24 is replicated over a continuous tone image.

The threshold value matrix Mat2'( ) is used for converting continuous tone images as shown in FIG. 25. That is, the threshold value matrix is located on each of the plurality of regions EM, and conversion is performed on each region EM. That is, in each region, a density of each element in the continuous tone image is compared with a threshold value H1 or H2 which is determined through the process of FIG. 10 dependent on the threshold value matrix Mat2'( ). No nonuniformity of colors or tones are generated in the boundaries AT between the matrix-replicated regions EM when the original threshold value matrix Mat2( ) is produced through the method of the fourth embodiment. Accordingly, no undesirable boundary lines will be generated along the auxiliary scanning direction Y. On the other hand, there is a possibility that nonuniformity of colors or tones will be generated in the boundaries BT and therefore that undesirable boundary lines will be generated. However, the boundary lines are slanted with respect to the main scanning direction x. When the binary images with the thus generated boundary lines are printed, the boundary lines will not appear clearly.

Those edges UT and DT in the matrix Mat2'( ) may be formed with corrugations. Or, the entire edges UT and DT may be changed into a V- or a reversed V-shape. That is, the upper and lower edges UT and DT may be changed from the linear line parallel to the main scanning direction x into other various lines, such as the slanted linear line as shown in FIG. 24, a V- or a reversed V-shaped line, the corrugated line, or the like. Thus produced binary threshold value matrix Mat2'( ) can further prevent any undesirable boundary lines from clearly appearing in produced binary images.

Figure 26:
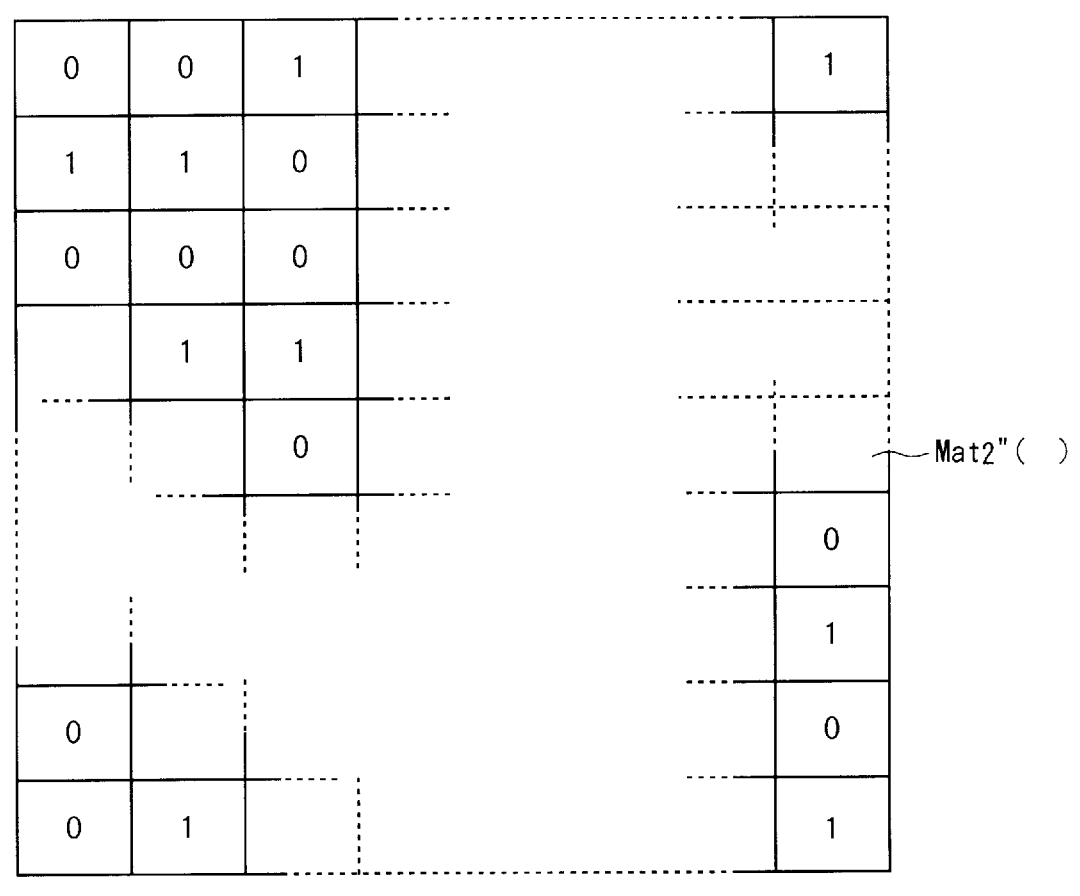

The threshold value matrix Mat2'( ) deformed as shown in FIG. 24 can be further deformed as shown in FIG. 26. That is, an element group Z in the threshold matrix Mat2'( ), protruding downwardly from the original position and shown in FIG. 24, may be shifted to an upper side of the matrix, thereby recovering an original rectangular shape. Thus produced rectangular threshold matrix Mat2"( ) can be more easily applied to input images which are generally rectangular. Accordingly, error diffusion image conversion process can be more easily performed onto each input continuous tone image.

[Sixth Embodiment]

Figure 27:
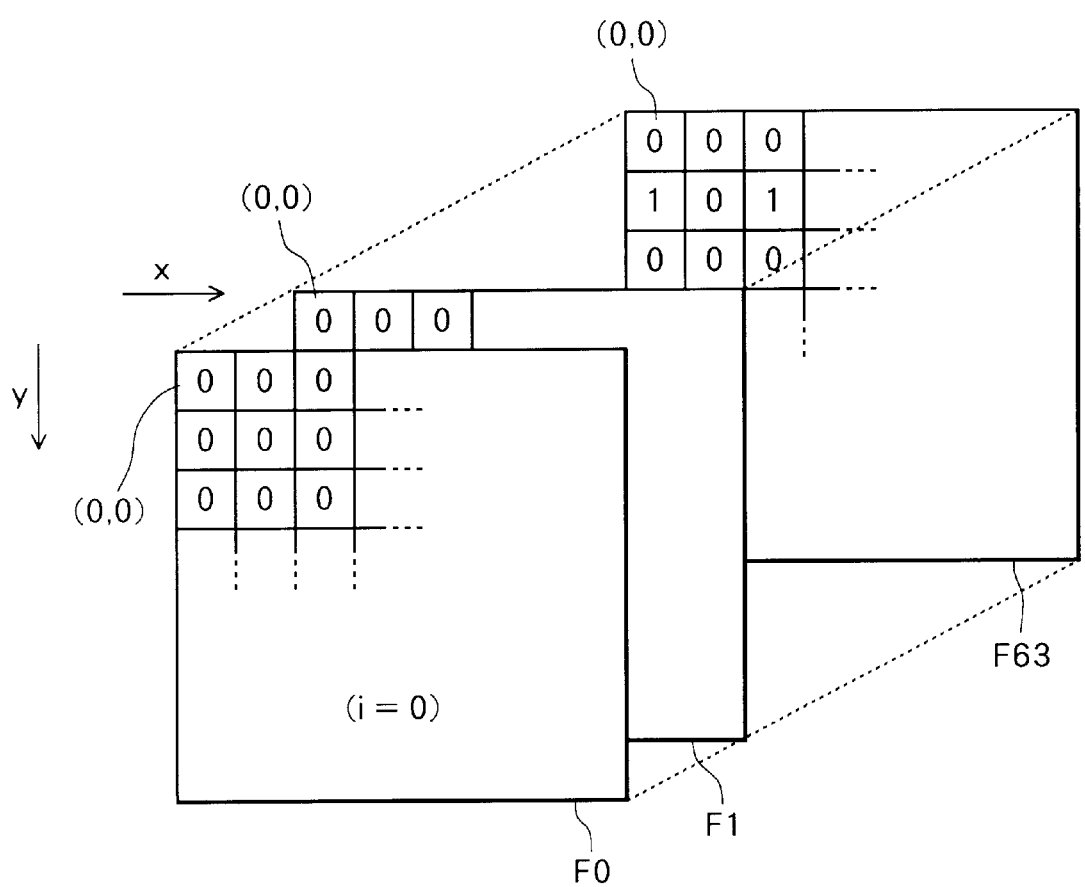
FIG. 27 illustrates binary matrices used in a sixth embodiment.

A sixth embodiment will be described below with reference to FIGS. 27 through 29.

In the above-described second through fourth embodiments, the uniform density matrices Di are successively converted into the binary density matrices Fi while the density value i is incremented one by one. The uniform density matrix Di (D128) of the desired density i of 128 is finally converted into the binary density matrix Fi (F128). The matrix Fi (F128) is used as a binary threshold matrix Mat2( ) in the error diffusion image conversion process of FIG. 9. However, a multilevel threshold matrix Matm( ) having more than three kinds of threshold values can be produced based on the plurality of binary threshold matrices F1–Fi (F128). The thus produced multilevel threshold matrix Matm( ) can be applied to the error diffusion image conversion method of FIG. 1.

Figure 28:
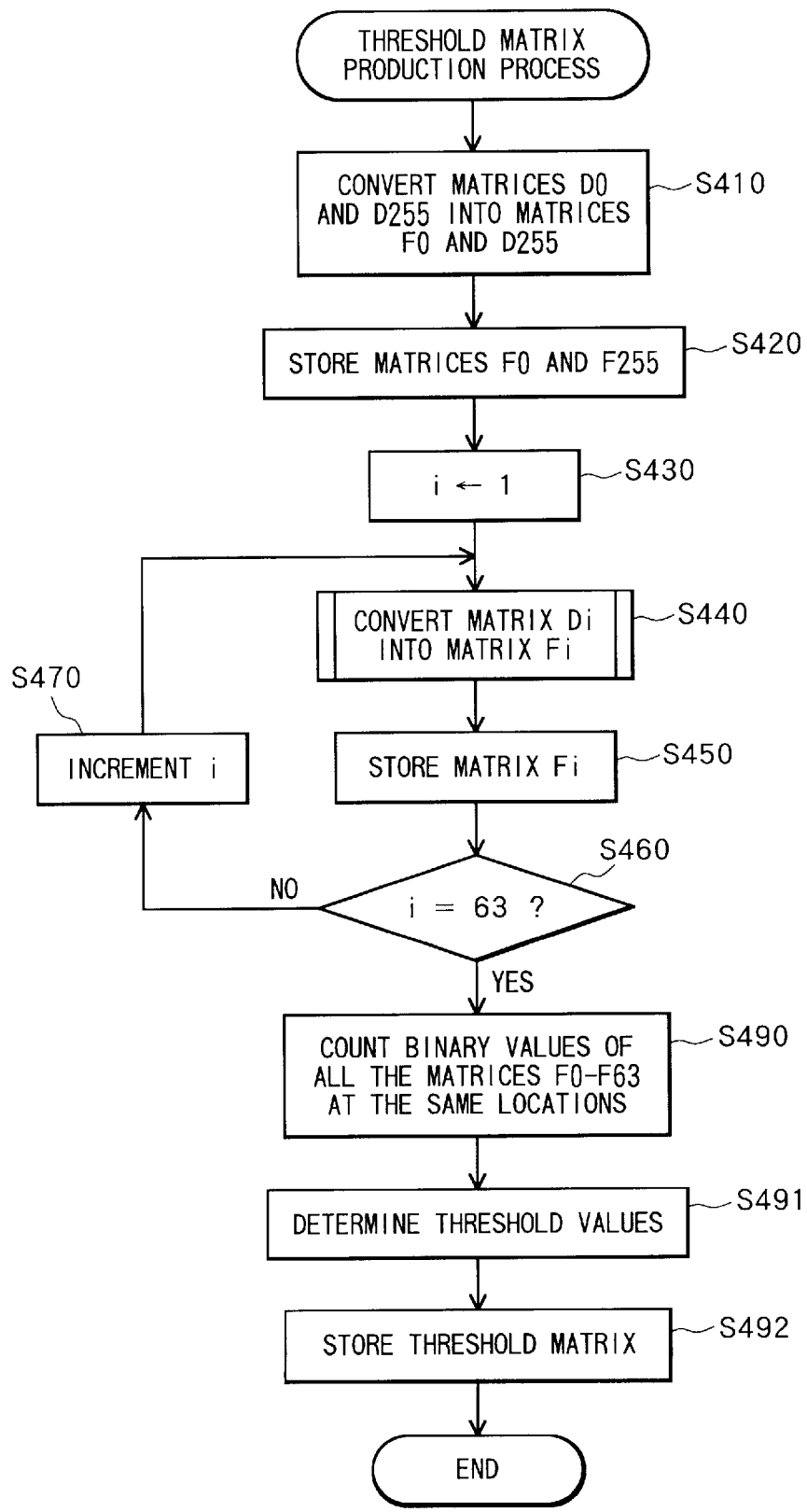
FIG. 28 is a flow chart of a threshold matrix production process according to the sixth embodiment.
Figure 29:
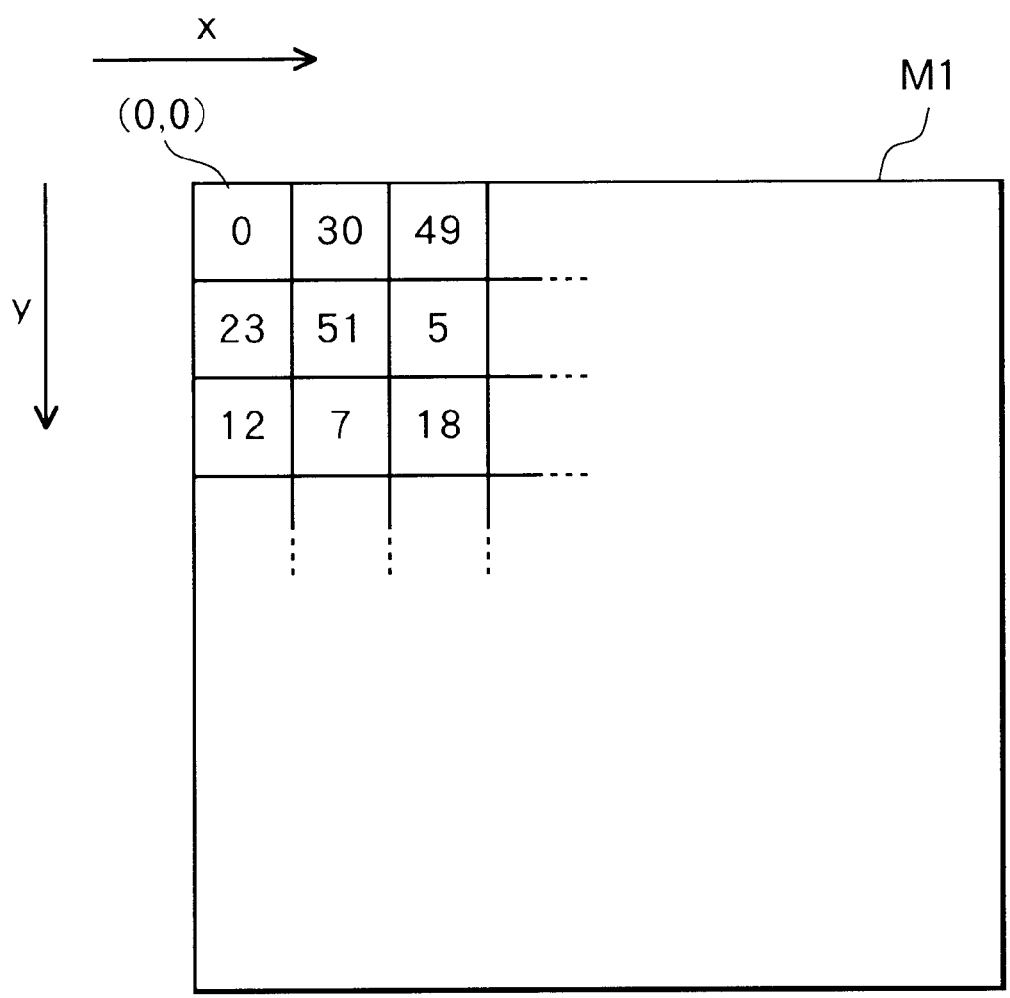
FIG. 29 illustrates an accumulated result matrix produced according to the process of the sixth embodiment.

The multilevel threshold matrix Matm( ) can be produced through the process of FIG. 28. This process is the same as that of the process of FIG. 12 except that the step S480 is replaced with steps S490–S492 in FIG. 28.

It is further assumed that it is desired to obtain a multilevel threshold matrix Matm( ) having 64 different kinds of threshold values. In this case, the desired density i, referred to in S460, is set to 63. That is, when the process for the value i of 63 is completed (Yes in S460), the matrices D0 through D63 have been converted into matrices F0 through F63 as shown in FIG. 27. Then, according to the present embodiment, the total number of turned-On elements is counted in S490 at each element position throughout all the produced binary matrices F0–F63.

This process will be described below in greater detail.

It is noted that each binary matrix Fi has the same size as that of the original matrix Di, and therefore has the size of M×N elements. All the element positions in each binary value matrix Fi are defined as (x, y). The original point (0,0) is located at an upper-and-left corner of each matrix Fi as shown in FIG. 27.

In the process of the present embodiment, therefore, when the affirmative judgment is achieved in S460, the CPU 12 counts, at each element position (x, y), the total number of the On-turned binary values V(x,y) (=1) throughout all the matrices F0–F63 in S490. The CPU 12 performs this calculation for all the element positions (0,0)–(M−1, N−1) in the matrices F0–F63. The CPU 12 then stores the resultant counted values S(0,0)–S(M−1, N−1) in corresponding element positions (0, 0) to (M−1, N−1) of an accumulated binary value memory prepared in the working memory 19, thereby producing an accumulated result matrix M1 shown in FIG. 29.

It is noted that because each turned-on element has a value of one (1) and each turned-off element has a value of zero (0), a total value S(x,y) of the binary values V(x,y) can be calculated throughout all the matrices F0–F63 at each element position (x, y). The CPU 12 performs this calculation for all the element positions (0,0)–(M−1, N−1) in the matrices F0–F63. The CPU 12 then stores the resultant total values S(0,0)–S(M−1, N−1) in the accumulated binary matrix M1.

The calculation performed in S490 will be described below in greater detail.

First, binary values V(0,0) in all the already-produced matrices F0–F63, at the original point (0, 0), are accumulated or summed into a total value S(0, 0). The resultant total value S(0, 0) is stored in a corresponding location (0, 0) of the memory area as shown in FIG. 29. The same processings are conducted for all the remaining element points (1,0)–(M−1, N−1), thereby filling all the element locations (0,0)–(M−1,N−1) of memory area with the resultant accumulated values S(0,0)–S(M−1,N−1). As a result, the accumulated value matrix M1 is obtained.

Next, in S491, a multilevel threshold matrix Matm( ) having 64 threshold values is produced based on the accumulated result matrix M1 in a manner described below.

First, the lowest accumulated value S(x,y) is selected from all the elements S(0,0)–S(M−1, N−1) in the accumulated result matrix M1. A threshold value TH(x,y) is determined based on the selected lowest accumulated value S(x,y). Then, the threshold value TH(x,y) is set as an element of the multilevel threshold matrix Matm( ) at a position (x,y) corresponding to the element position (x,y) of the lowest accumulated value S(x,y). For example, a threshold "1" is set in correspondence with the lowest accumulated value. Then, the second lowest accumulated value S(x,y) is selected and retrieved from the matrix M1. Based on the retrieved value, a threshold value TH(x,y), "2" for example, is determined for a corresponding element (x,y) of the dither matrix DM. Thus, the threshold values TH(x,y), integers between 1 and 64 in this example, are successively determined for all the elements from the lowest accumulated result element. Then, in S492, the thus determined threshold values TH(x,y) ($0 \leq x \leq M-1$, $0 \leq y \leq N-1$) are stored in corresponding memory locations (0,0)–(M−1,N−1) of the memory 14.

For example, if the lowest value is at (0, 0) in the accumulated result matrix M1, the corresponding threshold value, "1" for example, is determined and stored in a memory location (0, 0) of the memory 14. Then, all the successive threshold values 2–64 are successively stored in remaining memory locations (x, y) in accordance with the order of the amount of the values S(x, y). It is noted that each of all the integers between 1 and 64 is set as a threshold value in at least one of all the elements in the matrix Matm( ).

The multilevel threshold matrix Matm( ) may not be calculated or stored in the process of S491. However, the accumulated result matrix M1 may be stored in the memory 14. This matrix M1 has discrimination values S(x,y) as indicative of multilevel threshold values. When desiring to convert a halftone image into a binary image through the process of FIG. 1, a multilevel threshold matrix Matm( ) is produced through determining 64 different multilevel threshold values for the respective element positions (x,y) based on the discrimination values S(x,y). Because the amount of each discrimination value S(x, y) in the accumulated result matrix M1 is small, the memory amount required to store the accumulated result matrix M1 is sufficiently small. It is possible to save the memory amount.

As described above, according to the present embodiment, a multilevel threshold matrix Matm( ) can be produced in which three or more threshold values are distributed. In this case, the error-distributing binary conversion process is repeated to successively convert the plurality of uniform density matrices into a plurality of binary value matrices. Binary values, at each element position, of all the produced binary value matrices are accumulated. Based on the accumulated result, a threshold value of the threshold matrix is determined for a corresponding element location.

Through the accumulation of the binary values throughout the binary matrices, a plurality of kinds of accumulated values are generated. A plurality of different threshold values are set in correspondence with the plurality of kinds of accumulated values. A multilevel threshold matrix, where three or more threshold values are distributed, is produced.

[Seventh Embodiment]

In the above-described sixth embodiment, a multilevel threshold value matrix Matm( ), which has "n" number of different threshold values, is produced through producing "n" number of binary matrices F(0) (i=0) through F(n−1) (i=n−1) and accumulating the binary values at each element position throughout all the "n" number of binary matrices. Through this method, it is possible to produce a multilevel threshold value matrix Matm( ) which has three or more different threshold values. In the above-described embodiment, the multilevel threshold matrix Matm( ), which has 64 different threshold values, is produced through producing 64 binary matrices F0 through F63 and accumulating the binary values at each element position throughout the 64 binary matrices.

However, the above-described process can be modified as described below.

First, all the uniform density matrices D0–D255 are converted into binary matrices F0–F255. Then, at each element position (x,y), the total number S(x,y) of turned-on elements is counted throughout all the binary matrices F0–F255. In other words, the process of FIG. 28 is modified so that the desired density value i is set to 255 in S460.

It is noted that the accumulated value S(x,y) is either one in a range of 0 to 255. A table is then created to list all the element positions (x,y) in accordance with their counted values S(x,y) of 0 to 255 in the order of the amount of the counted values S(x,y) from zero (0) toward 255. Alternatively, the table is created to list all the element positions (x,y) in accordance with their counted values S(x,y) of 0 to 255 in a reversed order from 255 toward zero (0). If each binary matrix Fi has a size of 128×128, this table is prepared so as to list all the 16,384 element positions in accordance with their counted values S(x,y).

It is assumed that a bilevel threshold value matrix Mat2( ) is desired to be used in the error diffusion image conversion process of FIG. 9. In this case, a bilevel threshold matrix Mat2( ) is prepared to have 16,384 elements in total based on that table. More specifically, a half of the elements in the bilevel threshold value matrix Mat2( ) are set to one threshold value, while the remaining half of the elements are set to the other threshold value. More specifically, one threshold value is allocated to the elements of the half of the total 16,384 elements, that is, elements numbered "1" through "8,192" in the table, and the other threshold value is allocated to the elements of the remaining half of the total 16,384 elements, that is, elements numbered "8,192" through "16,384" in the table.

It is assumed that a sixteen-level threshold matrix Matm( ) is desired to be used in the error diffusion image conversion method of FIG. 1. In this case, the table is divided into sixteen blocks. Sixteen different threshold values are allocated to the sixteen blocks, respectively, whereby each of the sixteen threshold values is allocated to element positions included in the corresponding block. It is therefore possible to easily produce a sixteen-level threshold matrix Matm( ).

When the table is divided into the blocks, it is unnecessary to make equal the number of the elements included in the respective blocks. It may be preferable to change the number of elements included in the respective blocks in accordance with the input/output characteristic of an output device (color printer) or the like to be utilized. Much more advantages can be obtained.

In the present embodiment, the table is divided into blocks whose total number is equal to the required number of threshold values. Different threshold values are allocated to the element positions included in different blocks. It is thus possible to easily produce a threshold value matrix comprised of a desired arbitrary number of different threshold values. The thus obtained threshold value matrix has a threshold distribution characteristic similar to those in the first through sixth embodiments. Similar advantages are obtained.

As described above, according to the present embodiment, discrimination values, indicative of respective threshold values, are stored in the form of a table in the order of their amounts in correspondence with their assigned element positions. When using a threshold matrix, the table is divided into several groups by the number of the kinds of threshold values to be used. For example, when desiring to use a bilevel threshold matrix, the table is divided into two groups. When desiring to use a multilevel threshold matrix, the table is divided into three or more groups. A threshold value is set for those discrimination values included in each group, and is set for element positions stored in that group. It is therefore possible to freely change the number of kinds of the threshold values as well as the amounts of the threshold values, per se. It is possible to freely adjust the distribution state of the threshold values in the threshold matrix in accordance with its object to use.

[Eighth Embodiment]

An eighth embodiment will be described below with reference to FIGS. 30 through 31. According to the present embodiment, a multilevel threshold matrix Matm( ) having three or more kinds of threshold values is produced based on the threshold matrix Mat2( ) produced in the blue noise mask production method of the first embodiment.

That is, the first threshold value of a first value-assigned element, that is located in a tightest cluster where the first value-assigned elements are tightly collected, is replaced with the second threshold value. The total number of the first threshold values, left in the matrix prior to the replacement operation, is set as a multilevel threshold value at a corresponding element position in a multilevel threshold matrix to be produced. Then, this replacement-and-setting operation is repeated.

The second threshold value of a second value-assigned element, that is located in a largest void where the first value-assigned elements are thinly dispersed, is replaced with the first threshold value. The total number of the first threshold values, remaining in the matrix after the replacement operation, is set as a multilevel threshold value in a corresponding element position of the multilevel threshold matrix to be produced. Then, this replacement-and-setting operation is repeated.

Thus, the multilevel threshold matrix is prepared to have three or more threshold values distributed. The large number of kinds of threshold values can be used as discrimination values indicative of threshold values to be actually used in the error diffusion image conversion process.

This process will be described below in greater detail.

In the first embodiment, a bilevel threshold matrix Mat2( ) is produced as comprised of two different threshold values "0" and "1". Then, a multilevel threshold matrix Matm( ) is produced through the process of the flowcharts in FIGS. 30 and 31. The multilevel threshold matrix Matm( ) is comprised of a plurality of different threshold values. This multilevel threshold matrix is produced based on the bilevel threshold matrix Mat2( ) as produced in the process of FIG. 5.

It is noted that as described already, the "minority value" is defined as a value of zero (0) or one (1) set for less than half of all the elements in the bilevel matrix Mat2( ). The "majority value" is defined as a value of zero (0) or one (1) set for more than half of all the elements in the bilevel matrix Mat2( ). Elements having the majority values are referred to as majority elements, and elements having the minority values are referred to as minority elements. In the following description, even when the numbers of the majority elements and the minority elements are changed in the following processes of FIGS. 30 and 31, the values ("0" or "1") indicated by the majority values or the minority values will not change.

Figure 30:
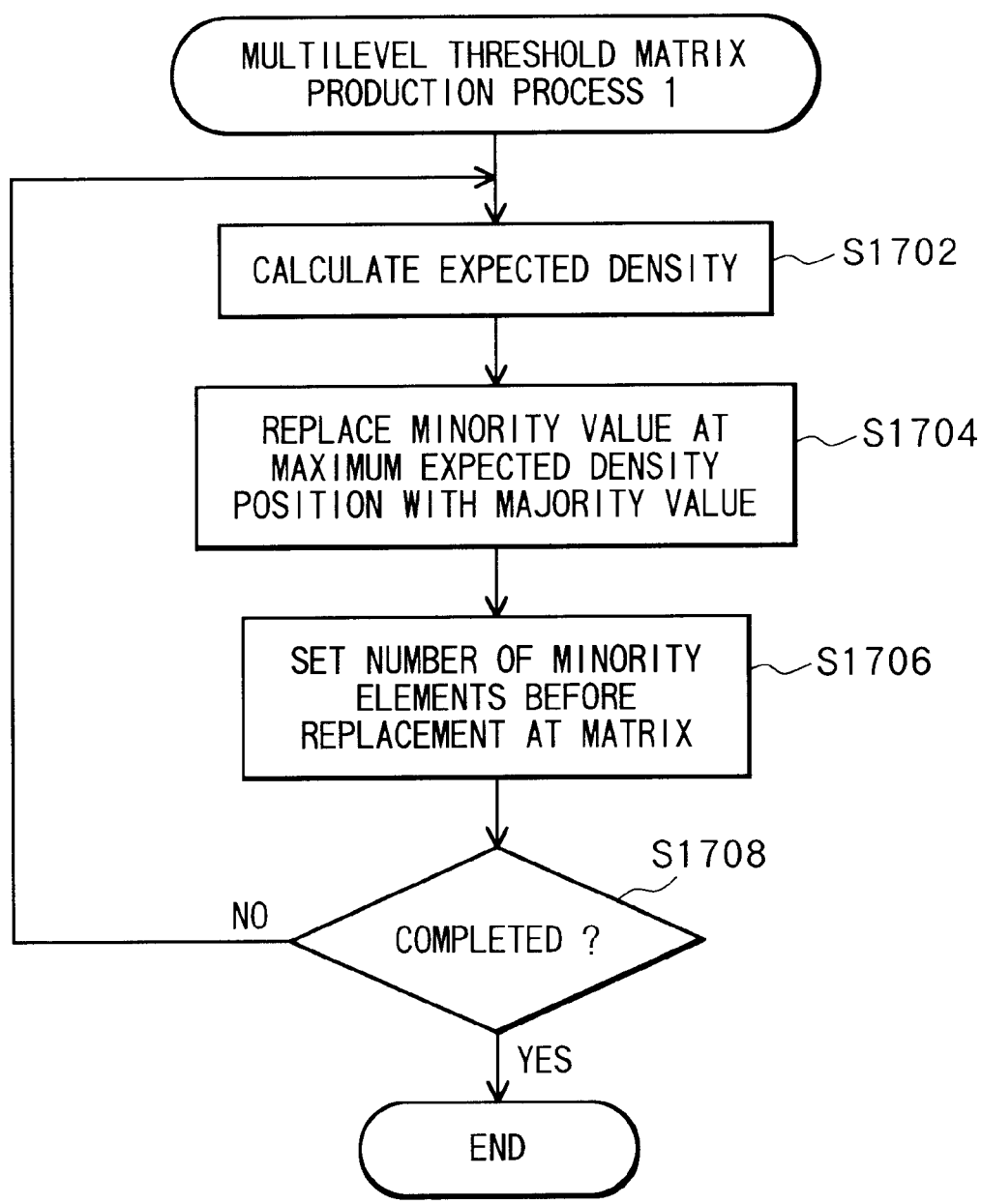
FIG. 30 is a flow chart of a part of a multilevel threshold matrix production process according to an eighth embodiment.

First, the process of FIG. 30 is attained as described below.

When the process of FIG. 30 is started, expected density values D(x, y) are calculated in S702 for all the elements (x, y) of the bilevel threshold matrix Mat2( ) as produced through the process of FIG. 5.

Then, the CPU 12 selects in S704 a minority element (x,y) that has a minority value and that has its expected density value D(x,y) highest among all the minority elements in the matrix Mat2( ). This element (x, y) is considered as a minority element as located in a largest cluster of minority elements, i.e., in a tightest grouping of minority elements. The element value J(x, y) of this element (x, y) is then replaced with a majority value.

Then, in S706, a corresponding position (x, y) of a multilevel threshold matrix Matm( ), as prepared in the memory 19, is set with a value equal to the total number of minority elements left in the bilevel threshold matrix Mat2( ) before the replacement operation of S704 is attained.

Next, it is judged in S708 whether or not any minority elements still remain in the bilevel threshold matrix Mat2( ). When any minority elements remain in the matrix mat2( ) (no in S708), the processes of S702–S706 are repeated. Thus, as the processes of S702–S706 are repeated, elements of the multilevel threshold matrix Matm( ) are set one by one with threshold values. As the processes of S702–S706 are repeated, the amount of the threshold value set in S706 is decreased one by one. When no minority elements remain in the bilevel matrix Mat2( ) (yes in S708), the process ends. At this time, all the elements remaining in the bilevel matrix Mat2( ) are set with the majority values.

Thus, according to the process of FIG. 30, threshold values are set to the multilevel threshold matrix Matm( ) at element positions as corresponding to the minority elements in the bilevel matrix Mat2( ).

Figure 31:
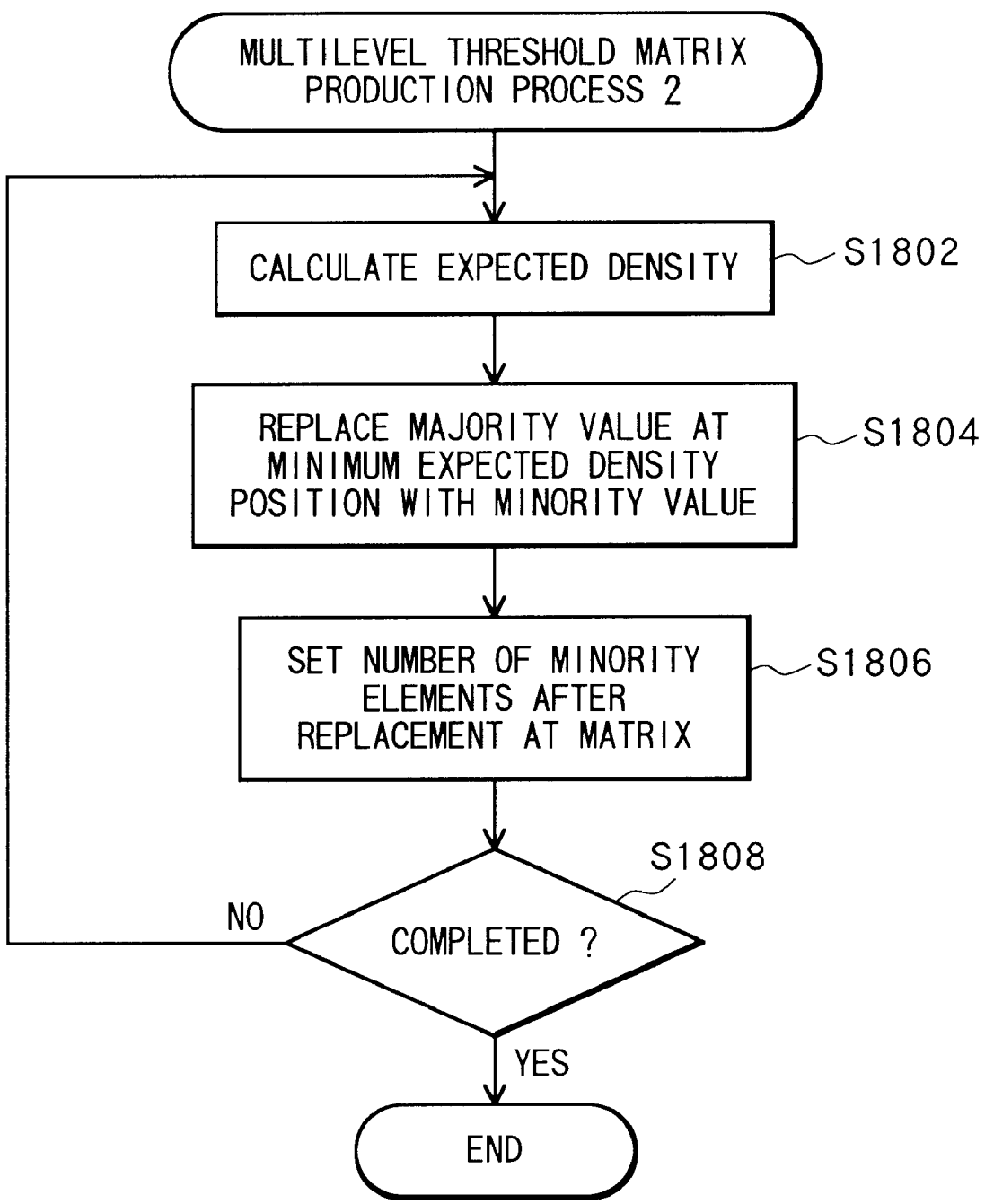
FIG. 31 is a flow chart of another part of the multilevel threshold matrix production process according to the eighth embodiment.

Then, the process of FIG. 31 is performed for successively setting threshold values to element positions in the multilevel threshold matrix Matm( ) that are not yet determined in the process of FIG. 30. That is, threshold values are set to the multilevel threshold matrix Matm( ) at element positions as corresponding to majority elements in the bilevel matrix Mat2( ).

When the process of FIG. 31 is started, expected density values D(x, y) are calculated in S802 for all the elements of the bilevel threshold matrix Mat2( ). This bilevel threshold matrix Mat2( ) is the matrix Mat2( ) originally produced through the process of FIG. 5 and stored in the memory portion 14. Accordingly, the matrix Mat2( ), subjected to the process of FIG. 31, is not the matrix which is obtained through the process of FIG. 30 to have only the majority values.

Then, the CPU 12 selects in S804 a majority element (x,y) that has a majority value and that has its expected density value D(x,y) as lowest among all the majority elements in the matrix Mat2( ). This element (x, y) is considered as a majority element located in a largest void for minority elements, i.e., in a largest space between the thinly dispersed minority elements. The majority element value of this element (x, y) is then replaced with the minority value.

Then, in S806, a corresponding position (x, y) in the multilevel threshold matrix Matm( ) is set with a value equal to the total number of the minority elements remaining in the bilevel threshold matrix Mat2( ) after the replacement operation of S804 is attained.

Next, it is judged in S808 whether or not any majority elements remain in the bilevel threshold matrix Mat2( ). When any majority elements still remain in the matrix mat2( ) (no in S808), the processes of S802–S806 are repeated. Thus, as the processes of S802–S806 are repeated, elements in the multilevel threshold matrix Matm( ) are set one by one with threshold values. As the processes of S802–S806 are repeated, the amount of the threshold value set in S806 is increased one by one. When no majority elements remain in the bilevel matrix Mat2( ) (yes in S808), the process ends.

Thus, according to the process of FIG. 31, threshold values are set to the multilevel threshold matrix Matm( ) at element positions corresponding to the majority elements in the bilevel matrix Mat2( ).

When the process of FIG. 31 is completed, all the element positions in the multilevel matrix Matm( ) corresponding to all the element positions in the bilevel matrix Mat2( ) are set with threshold values. The total M×N number of different integers, in a range of 1 to M×N, are distributed in all the M×N number of elements in the matrix Matm( ).

Thus, it is possible to obtain the multilevel threshold matrix Matm( ). The number of the kinds of threshold values distributed in the matrix is equal to the total number of its elements.

In this example, it may be possible to consider the threshold values thus distributed in the Matm( ) as discrimination values. A table may be prepared to list therein all the element positions of the matrix Matm( ) and their corresponding threshold values as discrimination values in a predetermined order. For example, the table may list all the element positions and their corresponding threshold values in an order of the amount of the threshold value from the minimum to the maximum. The table may list all the element positions and their corresponding threshold values in the reversed order, that is, in an order of the amount of the threshold value from the maximum to the minimum.

When desiring to produce a threshold matrix having a desired number of threshold values, the table is divided into several blocks, the number of which is equal to the number of threshold values desired to be used. Then, several different threshold values are assigned to the respective blocks. It is therefore possible to easily produce a threshold value matrix with a desired number of kinds of threshold values. The thus produced threshold value matrix has a blue noise mask characteristic and therefore obtains great advantages.

[Ninth Embodiment]

A ninth embodiment will be described below with reference to FIGS. 32 through 38. This embodiment is provided to further enhance the quality of a resultant pseudo-halftone image through enhancing reproducibility in narrow lines and reducing nonuniformity in dots.

Figure 32:
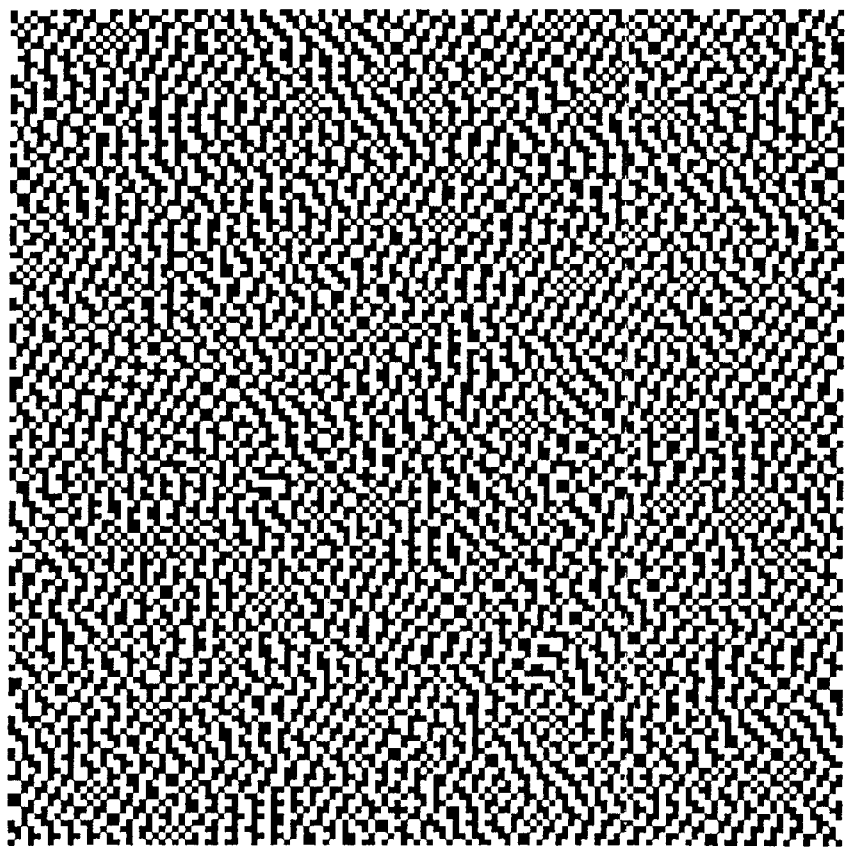
FIG. 32 illustrates an example of a bilevel threshold matrix.

FIG. 32 shows one example of a bilevel threshold matrix Mat2( ) comprised of 128×128 elements. Each element has either a discrimination value t of "1" or another discrimination value of "0". In this drawing, a black dot indicates a "0" data-assigned element, and a white dot indicates a "1" data-assigned element. In this example, the number of the "1" data-assigned elements is equal to the number of the "0" data-assigned elements.

As described in the first embodiment, when the bilevel threshold matrix Mat2( ) is used during the error diffusion image conversion process, the dark side threshold value H1 is set to the "0" data element, and the bright side threshold value H2 is set to the "1" data element. It is noted that 0<H1<H2<255 when a density of a continuous tone image to be processed by the matrix Mat2( ) is in a range of 0 to 255.

The present inventor performs several experiments for converting various images into pseudo-halftone images through the error diffusion image conversion process of FIGS. 9 and 10 with using the threshold matrix Mat2( ) of FIG. 32.

Figure 33:
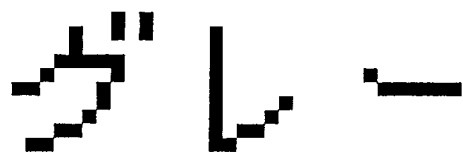
FIG. 33 shows an example of a halftone image to be subjected to the conversion process of FIG. 9 with the threshold matrix of FIG. 32.

FIG. 33 shows a series of black characters. This image is subjected to the error diffusion image conversion process of FIG. 9 and FIG. 10 with using the threshold matrix of FIG. 32. The image conversion process is repeatedly performed while changing the amount of the dark side threshold value H1. It is noted that the bright side threshold value H2 is fixed to 253.

FIG. 35(a) shows a pseudo-halftone image obtained when the image of FIG. 33 is subjected to the image conversion process where H1 is set to 2. FIG. 35(b) shows another pseudo-halftone image obtained when H1 is set to 16. FIG. 35(c) shows still another pseudo-halftone image obtained when H1 is set to 32. FIG. 35(d) shows another pseudo-halftone image obtained when H1 is set to 64.

Figure 34:
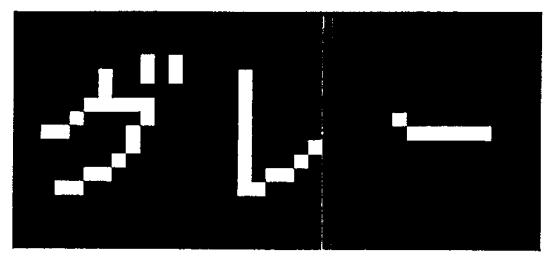
FIG. 34 shows an example of another halftone image to be subjected to the conversion process of FIG. 9 with the threshold matrix of FIG. 32.

FIG. 34 shows a series of white characters on a black background. This image is also subjected to the error diffusion image conversion process of FIG. 9 and FIG. 10 with using the threshold matrix of FIG. 32. The image conversion process is repeatedly performed while changing the amount of the bright side threshold value H2. It is noted that the dark side threshold value H1 is fixed to 2.

FIG. 35(e) shows a pseudo-halftone image obtained when the image of FIG. 34 is subjected to the image conversion process where H2 is set to 253. FIG. 35(f) shows another pseudo-halftone image obtained when H2 is set to 192.

The present inventor performs another experiment for subjecting a continuous tone image (not shown) to the error diffusion image conversion process of FIGS. 9 and 10 with using the bilevel threshold matrix Mat2( ) of FIG. 32. This continuous tone image has a bright square region having a density of 254 which is surrounded by a dark region of a density of 127. This experiment is repeatedly performed while changing the amount of the bright side threshold value H2. The dark side threshold value H1 is fixed to 64.

FIG. 36(a) shows a pseudo-halftone image obtained when H2 is set to 192. FIG. 36(b) shows a pseudo-halftone image obtained when H2 is set to 224. FIG. 36(c) shows a pseudo-halftone image obtained when H2 is set to 240. FIG. 36(d) shows a pseudo-halftone image obtained when H2 is set to 253.

Figure 35:
FIGS. 35(a) through 35(f) show pseudo-halftone images of the halftone images of FIGS. 34 and 35 produced through the conversion process of FIG. 9 with the threshold matrix of FIG. 32.
Figure 35:
Figure 35:
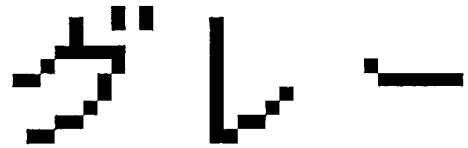
Figure 35:
Figure 35:
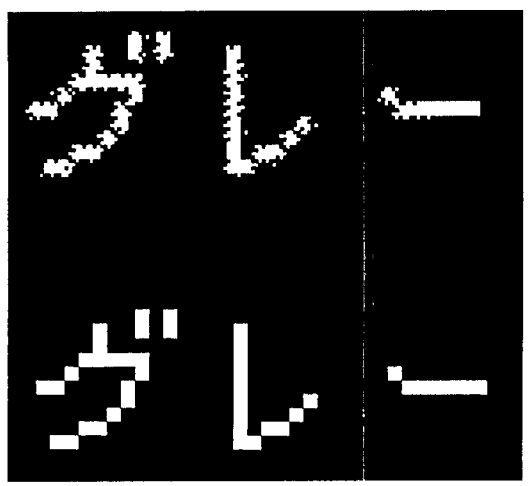
Figure 35:
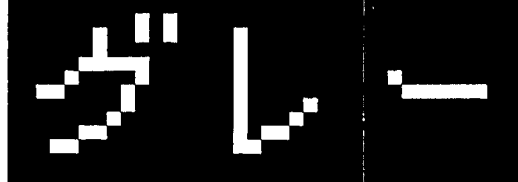
Figure 36:
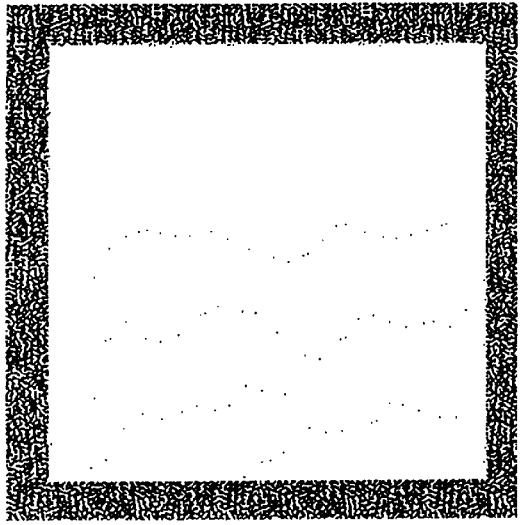
FIGS. 36(a) through 36(d) show other examples of pseudo-halftone images produced through the conversion process of FIG. 9 with the threshold matrix of FIG. 32.
Figure 36:
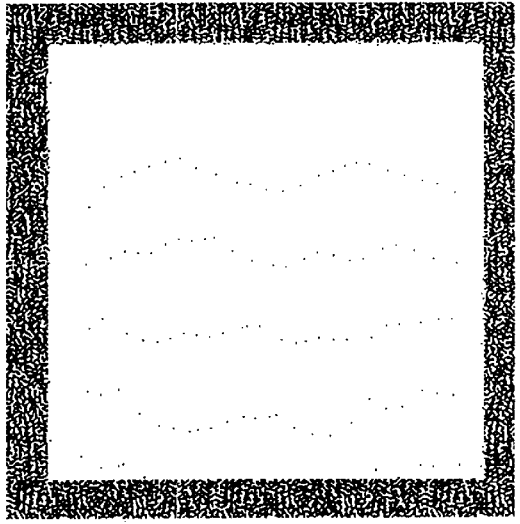
Figure 36:
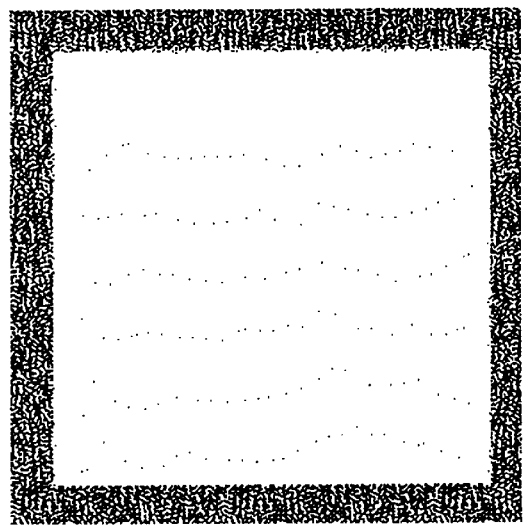
Figure 36:
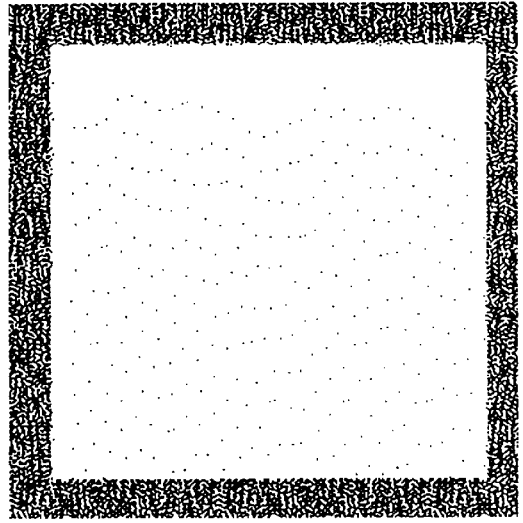

The experimental results of FIGS. 35 and 36 show a tendency as described below.

(1) FIGS. 35(a) through 35(d) show that reproducibility in black line edges is lowered when the dark side threshold H1 is decreased.

(2) FIGS. 35(e) and 35(f) show that reproducibility in white character edges is lowered when the bright side threshold H2 is increased.

(3) FIGS. 36(a) through 36(d) show that uniformity of dots dispersed in the bright region will be lowered when the bright side threshold H2 is decreased.

The present embodiment is therefore provided to enhance reproducibility in narrow lines and in edges and to provide uniform dispersion of dots in bright regions. That is, according to the present embodiment, the bright and dark side threshold values H1 and H2 are set in S256 and S258 in FIG. 10 so that the sum of the values H1 and H2 will exceed the highest density value (255, in this example) of a continuous tone image to be processed.

It is noted that the experimental results of FIGS. 35 and 36 show tendencies as described below.

(1) Reproducibility in black line edges will be enhanced when the dark side threshold H1 is increased.

(2) Reproducibility in white character edges will be enhanced when the bright side threshold H2 is decreased.

(3) Uniformity of dots dispersed in the bright region will be enhanced when the bright side threshold H2 is increased.

It is noted, however, that image output devices such as ink jet printers develop dot gain phenomenon. This is because when an ink droplet is located on an image recording medium such as a sheet of paper, the ink will spread in a range wider than a desirable diameter. Due to this phenomenon, nonuniformity in white dots dispersed in dark regions will not appear noticeably. Accordingly, when the binary image of FIG. 35(e) is printed by image output devices, nonuniformity in white dots dispersed in the dark background region will not appear noticeably. Nonuniformity in white dots dispersed even in the character edges will not appear noticeably in comparison with black character edges in FIGS. 35(a) and 35(b). It can therefore be concluded that nonuniformity in dots dispersed in bright regions will be reduced through increasing the bright side threshold value H2, and black line edges can be sharpened through increasing the dark side threshold value H1.

In the first embodiment, the two threshold values H1 and H2 are set in S256 and S258 so that a sum of the values H1 and H2 becomes almost 255 when the density of the input image is in the range of 0 to 255. However, according to the present embodiment, the sum of the two threshold values H1 and H2 is set to be higher than 255 in order to further decrease the nonuniformity of dots in bright regions and also in order to sharpen the black narrow line edges.

To generalize, when desiring to convert continuous tone images whose input densities are between a lowest (or darkest) density S and a highest (or brightest) density L where $S \geq 0$ and $L > S$, the two threshold values H1 and H2, to be set for the bilevel threshold matrix Mat2( ), are set so as to satisfy the following inequality:

$$T = H1 + H2 > L$$

Especially, in order to enhance the reproducibility of black line edges, the dark side threshold value H1 is preferably set to satisfy the following formula:

$$H1 \approx S + (L-S)/4$$

In order to sufficiently lower the nonuniformity of dots in bright regions, the bright side threshold H2 is preferably set to a value equal to or slightly smaller than the highest density L.

For example, the error diffusion image conversion process of FIG. 9 can be modified so that the values H1 and H2 are set in the processes of S256 and S258 in FIG. 10 to satisfy the inequality of H1+H2>255 when processing continuous tone images whose density values are located in the range of 0 to 255. The value H1 is preferably set to about 64 ($\approx 0+(255-0)/4$). The value H2 is preferably set equal to or slightly smaller than 255.

At least one of the thresholds H1 and H2 may not be fixed but may be set as adjustable. In this case, at least one of the thresholds H1 and H2 is adjusted before the error diffusion image conversion process is performed. In this case, it is possible to properly adjust reproducibility both in black line edges and in white character edges and to properly adjust uniformity of dots in bright regions.

Figure 37:
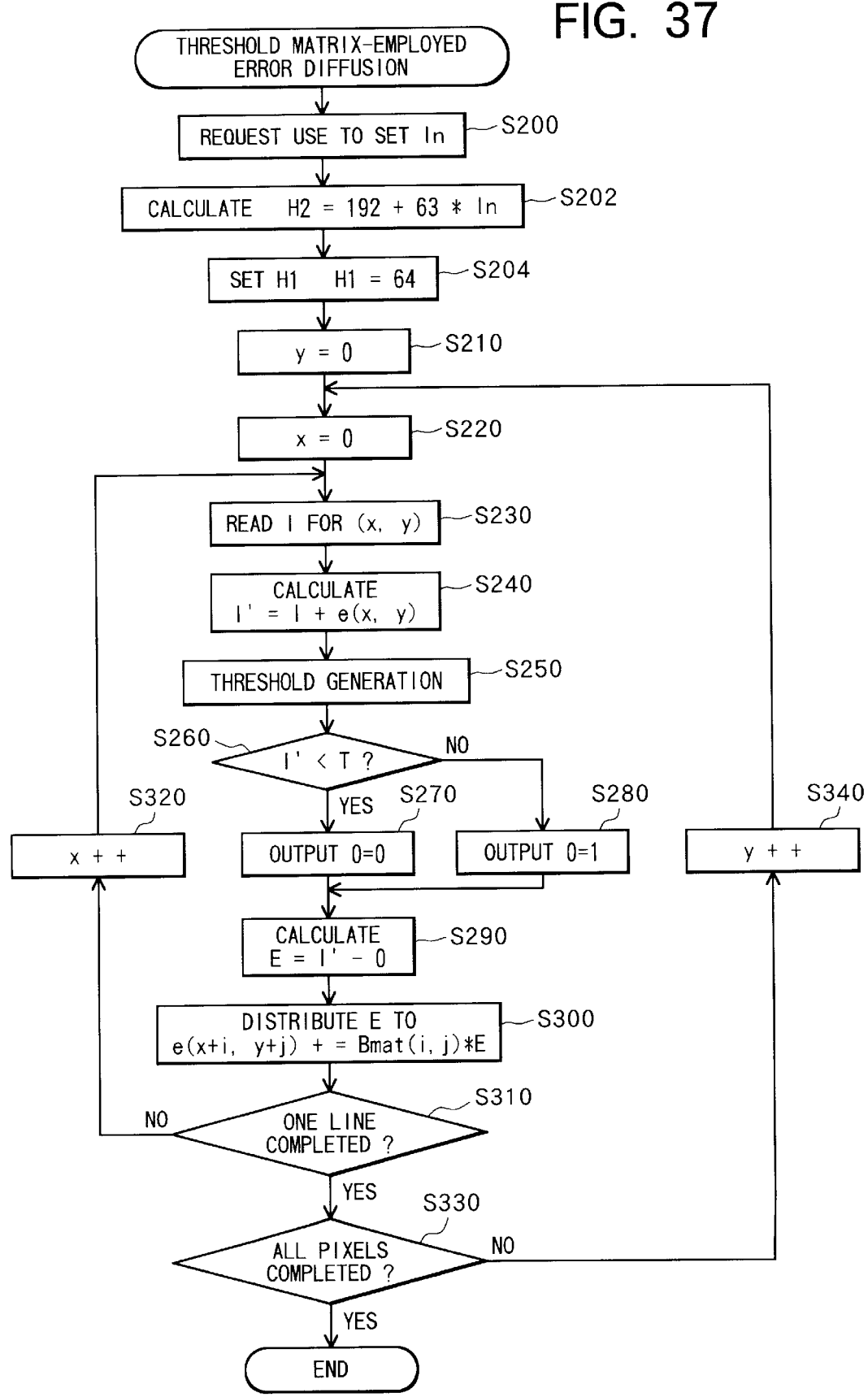
FIG. 37 is a flow chart of a threshold matrix-employed error diffusion image conversion process according to a ninth embodiment.

For example, the error diffusion image conversion process of FIG. 9 can be modified as shown in FIG. 37 so that the value H2 is adjustable.

The error diffusion image conversion process of FIG. 37 is the same as that of FIG. 9 except that steps S200 through S204 are performed before S210. In this example, the image conversion process of FIG. 37 is provided for converting continuous tone images, whose density values are located in the range of 0 to 255, into pseudo-halftone images.

Figure 38:
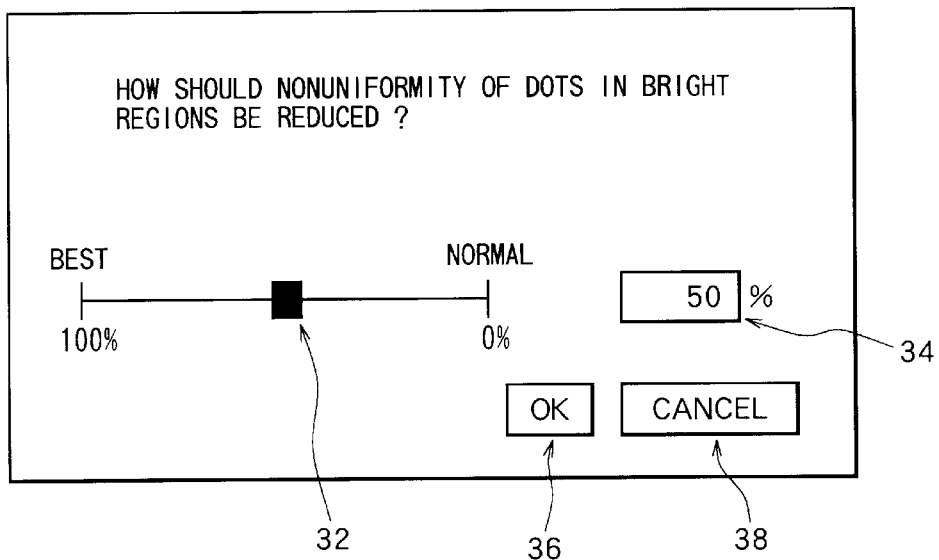
FIG. 38 illustrates an example of a display requesting a user to set a reduction rate for dot nonuniformity.

When the process of FIG. 37 is started, the device 2 requests in S200 an operator to set his/her desired reduction rate "ln" for reducing nonuniformity of dots in bright regions. This operation is performed through displaying a dialogue box as shown in FIG. 38 on the display 22.

The operator manipulates a mouse device (not show) or the keyboard 21 so as to allow a mouse cursor appearing on the display 22 to designate an adjustment button 32 on the dialogue box. The operator then performs a dragging operation to move the adjustment button 32 in a leftward or rightward direction, thereby adjusting the reduction rate to his/her desired value in a range of 0 to 100%. The operator's adjusted value is shown in a value display area 34. It is noted that a default value for the adjusted result is 0%.

When the operator has properly adjusted the reduction rate "ln" to his/her desired value, the operator manipulates the mouse device or the keyboard 21 to allow the mouse cursor to indicate an OK button 36, and then clicks a left-hand button on the mouse device (not shown). As a result, the reduction rate "ln" is set as the operator's adjusted value. Then, the program proceeds to S202. It is noted that when the operator manipulates the mouse device to allow the mouse cursor to indicate a "cancel" button 38 and clicks the left-hand button on the mouse device, the reduction rate "ln" is set to the default value of 0%.

Next, in S202, the bright side threshold H2 is calculated based on the thus set reduction rate "ln". This calculation is performed as indicated by the following formula (7):

$$H2 = 129 + 63 \times 1n$$

When the reduction rate "in" is set to be 70%, for example, in S200, H2 is set to 236 (=192+63×0.7=192+44).

Next, the dark side threshold H1 is set to 64. Then, the processes of S210 through S340 are performed in the same manner as in the process of FIG. 9. In S250, the process is performed in the same manner as in FIG. 10. It is noted that according to the present embodiment, when the discrimination value is "0" in the threshold matrix Mat2( ), the threshold value T is set in S256 to the threshold value H1 of 64 which is set in S204. When the discrimination value is "1" in the threshold matrix Mat2( ), the threshold value T is set in S258 to the threshold value H2 of 236 which is now calculated in S202. That is, when t=0, the threshold T is set to H1 of 64 in S256. When t=1, the threshold T is set to H2 of 236.

As described above, according to the process of FIG. 37, the reduction rate "ln" is first set in S200. This reduction rate "ln" is indicative of a rate, at which the user desires to reduce nonuniformity of dots in bright regions. Then, the bright side threshold H2 is calculated in S202 based on the reduction rate "ln", and the dark side threshold H1 is calculated as fixed in S204. Then, based on the thus calculated thresholds H1 and H2, the threshold value T is determined in S250 for each pixel position of the continuous tone image.

Thus, according to the process of FIG. 37, a sum of the threshold values H1 and H2 is set to 300 (=64+236). This threshold sum is sufficiently higher than 255 which is the highest density inputtable as continuous tone image density. It is therefore possible to reduce the nonuniformity of dots in bright regions and to sharpen black line edges. The dark side threshold H1 set in S204 satisfies the following equation H1≈S+(L−S)/4 where S (≧0) is the lowest (or darkest) pixel density (zero (0) in this case), and L (>S) is the highest (or brightest) pixel density (255 in this case). That is, in this example, S+(L−S)/4=0+(255−0)≈64. Thus, H1 is almost equal to S+(L−S)/4. Accordingly, reproducibility of black line edges is enhanced. It is noted that it is sufficient that H1 be approximately equal to S+(L−S)/4.

In the above description, the bright side threshold H2 is set to 236 which is very close to the highest value L of 255. The bright side threshold H2 is preferably in a range of 90% to 100% of the highest value L. More preferably, the bright side threshold H2 is in a range of 97% to 99% of the highest value L. That is, when the highest value L is 255, the threshold H2 is in a range of about 248 and about 254. In this case, it is therefore possible to sufficiently reduce the nonuniformity of dots in bright regions. It is noted that the operator's adjustment in S200 can adjust the threshold H2 closer to the highest value L, which can further decrease the nonuniformity of dots in bright regions.

The dark side threshold H1 may be set adjustable. That is, the process of S204 can be modified to request the user to adjust the dark side threshold H1 in the same manner as in S200 and then to calculate a value H1 in correspondence with the user's adjustment in the same manner as in S202. In this case, it is possible to adjust the threshold H1 in order to enhance the reproducibility in black line edges to his/her desired degree.

It is noted that the bilevel threshold matrix Mat2( ) used in the process of FIG. 37 can be produced in the same manner as in the first through eighth embodiments.

The above description is directed to the case where the bilevel threshold matrix Mat2( ) is used. That is, only two different kinds of threshold values H1 and H2 are used in the error diffusion image conversion process. However, the present embodiment can be applied to another error diffusion conversion process as shown in FIG. 1 in which a multilevel threshold matrix Matm( ) is used. The multilevel threshold matrix Matm( ) has "n" number of plural different kinds of thresholds (where "n" is an integer; 2<n≦[the total number of elements in the threshold matrix]). In other words, each element in the matrix Matm( ) is assigned to either one of the "n" number of kinds of threshold values. It is assumed that two threshold values H1 and H2 (where H1<H2) are predominant among the plurality of "n" kinds of threshold values. In other words, each of the number of H1 data-assigned elements and the number of H2 data-assigned elements is higher than the number of elements assigned to each of other remaining threshold values. In this case, the threshold matrix Matm( ) is preferably prepared to satisfy the following inequality: T=H1+H2>L where L is the highest value of the density range of the input image. It is noted that the density range has the lowest value S (≧0) and L>S.

The multilevel threshold matrix Matm( ) can be produced in the same manner as in the sixth through eighth embodiments. When the threshold matrix Matm( ) is produced in the manner of the sixth embodiment, a plurality of uniform matrices Fi are accumulated into an accumulated result matrix. The accumulated result matrix has a plurality of different kinds of values, the number of which corresponds to the total number of the accumulated binary matrices Fi. Three or more thresholds can be set in correspondence with the plurality of different kinds of values. Thus, the multilevel threshold matrix Matm( ) can be produced. In this case, a dark side threshold H1 can be set to several kinds of values. A bright side threshold H2 can be set to other several kinds of values. In this case, it is possible to produce a multilevel threshold matrix in which two thresholds H1 and H2 are predominant among the three or more threshold values. That is, each of the number of the H1-assigned elements and the number of the H2-assigned elements is higher than the number of elements assigned to each of any other values in the threshold matrix.

When the multilevel threshold matrix Matm( ) is produced through the manner the same as that of the seventh embodiment, discrimination values are prepared as indicative of the plurality of kinds of thresholds in the threshold matrix. Then, the discrimination values are stored in a table together with information of element locations, to which corresponding threshold values are assigned. When the error diffusion conversion process of FIG. 1 is attained, the table is divided into several blocks, the number of which corresponds to the number of kinds of threshold values desired to be used. The several blokes include: a block for the threshold H1; a block for the threshold H2; and other remaining blocks for other threshold values. It is noted that the size of the block assigned to the threshold value H1 and the size of the block assigned to the threshold value H2 are set larger than the sizes of any other blocks for other threshold values. The threshold values H1 and H2 thus predominant among other threshold values are preferably set to satisfy the inequality H1+H2>L.

To generalize, according to the present embodiment, an error diffusion image conversion process is performed while employing a threshold matrix having "n" number of plural different kinds of thresholds (where "n" is an integer; 2≦n≦[the total number of elements in the threshold matrix]). The threshold matrix may be a bilevel matrix where n=2 or a multilevel matrix where n≧3. Each element in the matrix is assigned to either one of the "n" number of kinds of threshold values. When two threshold values H1 and H2 (where H1<H2) are predominant among the plurality of "n" kinds of threshold values, the values H1 and H2 are set to satisfy the inequality T=H1+H2>L where L is the highest value of the density range in the input image.

[Tenth Embodiment]

A tenth embodiment will be described below with reference to FIGS. 39 through 45.

Figure 39:
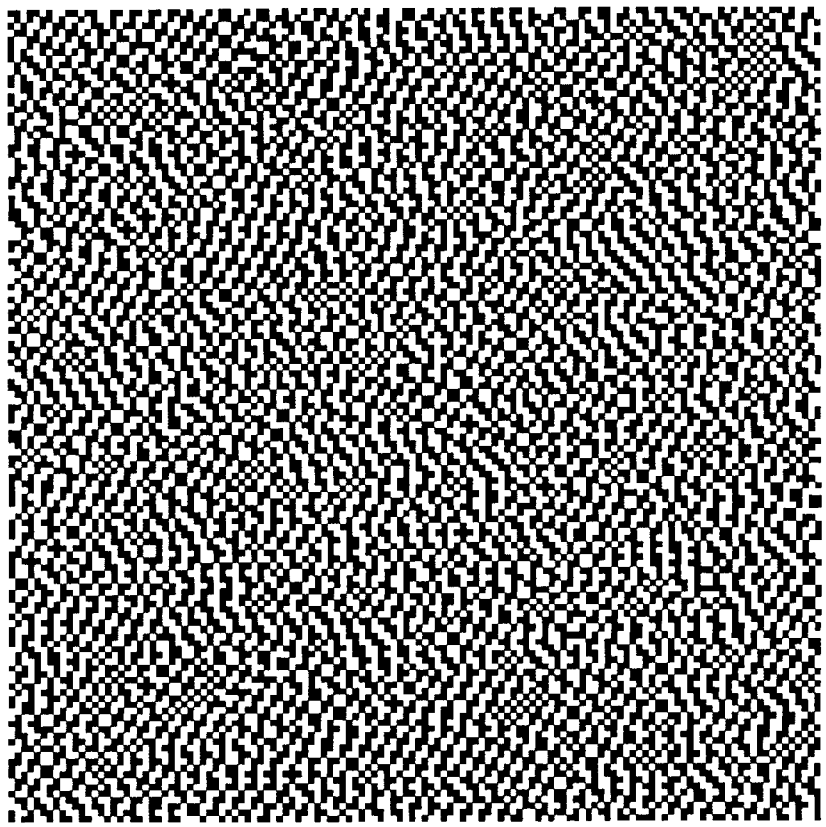
FIG. 39 illustrates an example of a bilevel threshold matrix in which two threshold values are distributed at almost equal rates.
Figure 40:
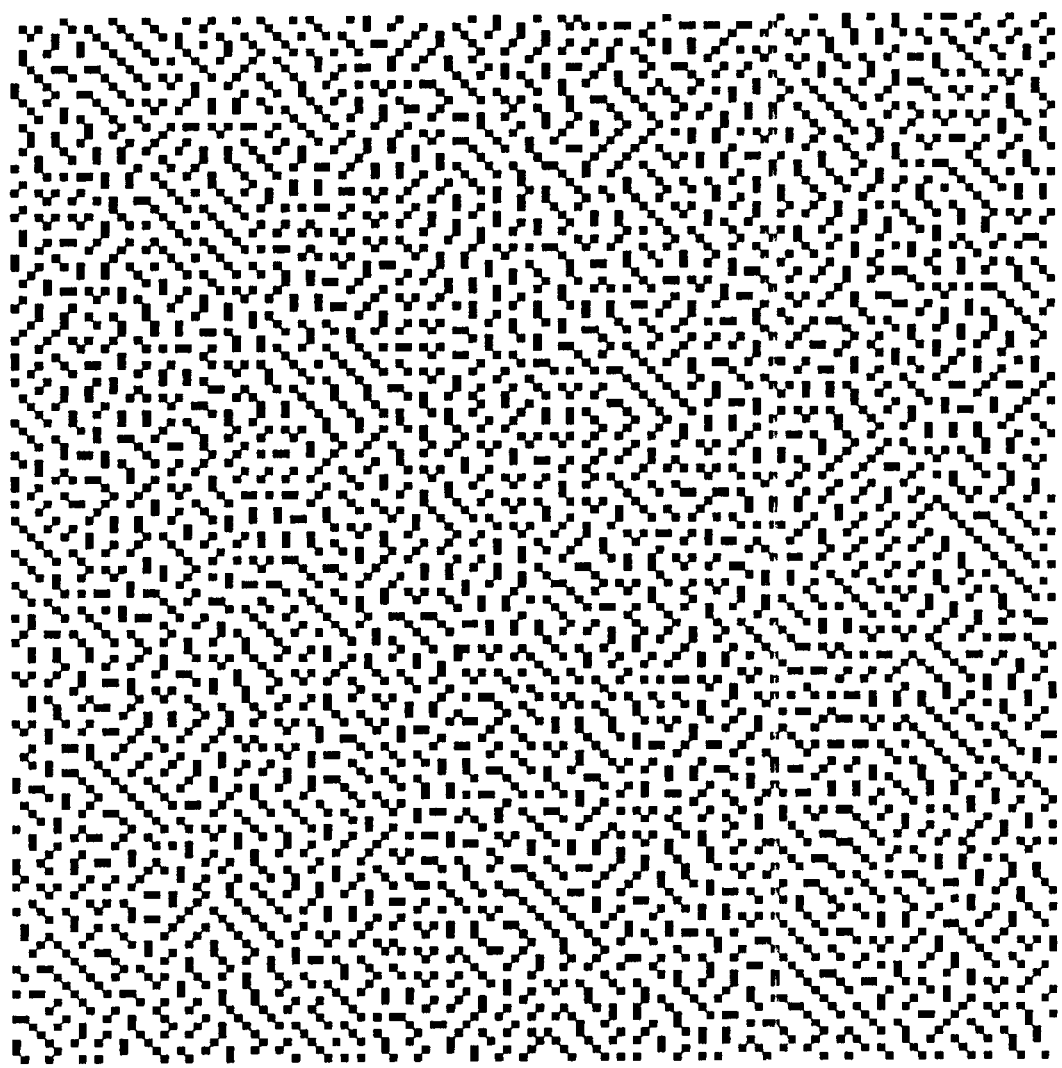
FIG. 40 illustrates an example of a bilevel threshold matrix in which two threshold values are distributed so that a bright side threshold value is distributed at a rate of about 75% in the entire area of the matrix.
Figure 41:
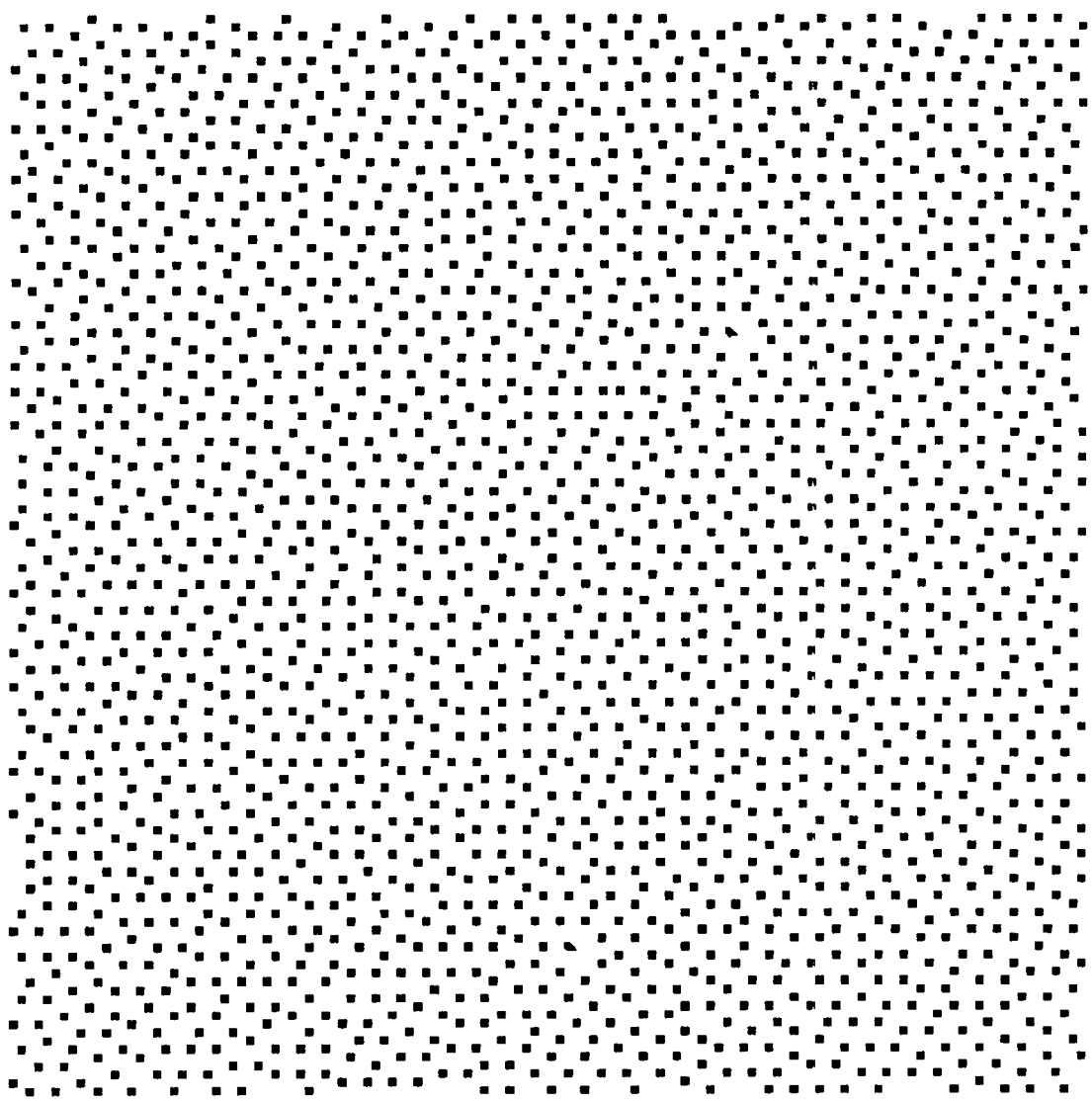
FIG. 41 illustrates an example of a bilevel threshold matrix in which two threshold values are distributed so that a bright side threshold value is distributed at a rate of about 88% in the entire area of the matrix.

The present inventor performs other several experiments through performing the error diffusion image conversion process of FIGS. 9 and 10 with using three bilevel threshold matrices Mat2( )-1, Mat2( )-2, and Mat2( )-3 shown in FIGS. 39–41. Each matrix has a size of 128×128 elements. In each matrix, each element has either a discrimination value t of "1" or another discrimination value of "0". In this drawing, a black dot indicates a "0" data-assigned element, and a white dot indicates a "1" data-assigned element.

As described in the first embodiment, when the bilevel threshold matrix Mat2( ) is used during the error diffusion image conversion process, the dark side threshold value H1 is set to the "0" data element in S256, and the bright side threshold value H2 is set to the "1" data element in S258. It is noted that H1 and H2 are set so that 0<H1<H2<255 when a density of a continuous tone image to be processed is in a range of 0 to 255 where a density level of 255 indicates white and a density level of zero (0) indicates black. During the experiments, H1 is set to 2 and H2 is set to 253.

In the bilevel threshold matrix Mat2( )-1 of FIG. 39, about 50% of all the elements in the matrix are assigned to the discrimination value t of "1", and remaining elements are assigned to the discrimination value t of "0". In other words, the number of the "1" data-assigned elements is equal to the number of the "0" data-assigned elements. Accordingly, about 50% of all the elements will be located with the bright side threshold H2, and remaining elements will be located with the dark side threshold H1. This matrix will be referred to as 50% distribution mask.

In the bilevel threshold matrix Mat2( )-2 of FIG. 40, about 75% of all the elements in the matrix are assigned to the discrimination value t of "1", and remaining elements are assigned to the discrimination value t of "0". Accordingly, about 75% of all the elements will be located with the bright side threshold H2, and remaining elements will be located with the dark side threshold H1. This matrix will be referred to as 75% distribution mask.

In the bilevel threshold matrix Mat2( )-3 of FIG. 41, about 87.5% of all the elements in the matrix are assigned to the discrimination value t of "1", and remaining elements are assigned to the discrimination value t of "0". Accordingly, about 87.5% of all the elements will be located with the bright side threshold H2, and remaining elements will be located with the dark side threshold H1. This matrix will be referred to as 87.5% distribution mask.

According to the present experiment, five different uniform density images are subjected to the error diffusion image conversion process of FIGS. 9 and 10 with using each of the above-described matrices Mat2( )-1, Mat2( )-2, and Mat2( )-2. The five different uniform density images have uniform densities represented by their darkness levels of 8%, 19%, 50%, 75%, and 88%. The darkness level of each image is defined as a level of darkness [%] of the image. When the image is completely black, its darkness level is indicated as 100%. When the image is completely white, its darkness level is indicated as 0%. Each darkness level of 8%, 19%, 50%, 75%, and 88% therefore correspond to densities of about 235, 207, 128, 64, and 31, respectively, when each darkness level is indicated by a density level in the range of 0 to 255.

Figure 42:
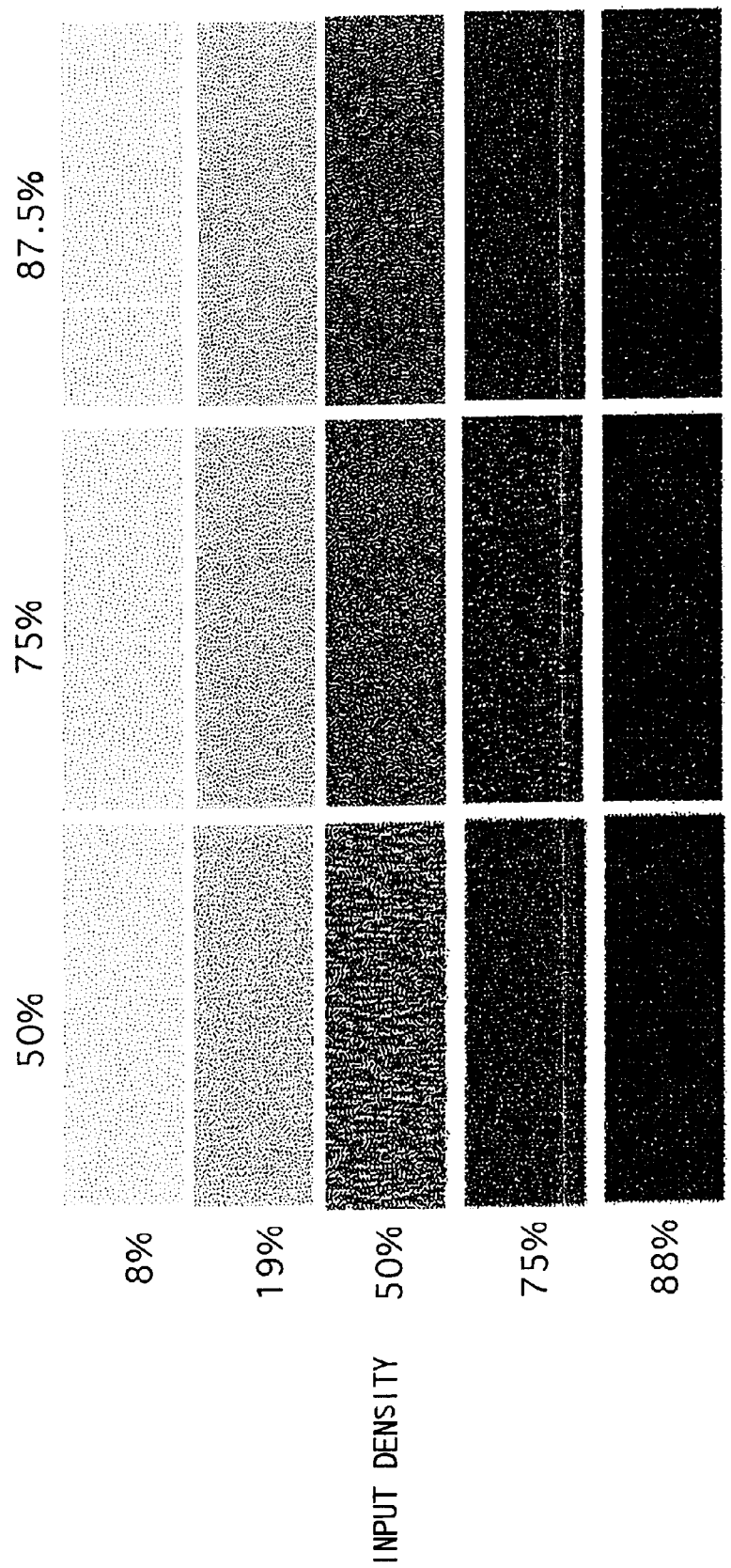
FIG. 42 show pseudo-halftone images for respective density levels obtained through the error-diffusion conversion process of FIG. 9 with the threshold matrices of FIGS. 39–41.

FIG. 42 shows fifteen pseudo-halftone binary images produced when the five uniform density images are subjected to the error diffusion image conversion process of FIGS. 9 and 10 with using the 50% threshold mask Mat2( )-1 of FIG. 39, the 75% threshold mask Mat2( )-2 of FIG. 40, and the 87.5% threshold mask Mat2( )-3 of FIG. 41. More specifically, three images located on the uppermost row are obtained when the uniform image with 8% darkness level is subjected to the image conversion process with the 50%, 75%, and 87.5% masks. Three images located at a second row are obtained when the uniform image with 19% darkness level is subjected to the image conversion process with the 50%, 75%, and 87.5% masks. Three images located at a third row are obtained when the uniform image with 50% darkness level is subjected to the image conversion process with the 50%, 75%, and 87.5% masks. Three images located at a fourth row are obtained when the uniform image with 75% darkness level is subjected to the image conversion process with the 50%, 75%, and 87.5% masks. Three images located at a fifth or lowermost row are obtained when the uniform image with 88% darkness level is subjected to the image conversion process with the 50%, 75%, and 87.5% masks.

As apparent from FIG. 42, when the image with 50% darkness level is processed with the 50% distribution threshold mask Mat2( )-1, the resultant binary image suffers from undesirable noises. Similarly, when the image with 75% darkness level is processed with the 75% distribution threshold mask Mat2( )-2, the resultant binary image suffers from undesirable noises. When the image with 88% darkness level image is processed with the 87.5% distribution threshold mask Mat2( )-3, the resultant binary image suffers from undesirable noises. These binary images are therefore very noisy and have low image quality.

The present embodiment is provided to prevent occurrence of these undesirable noises or to cause these undesirable noises not to noticeably appear in the resultant pseudo-halftone images. That is, according to the present embodiment, the threshold matrix defining two different kinds of threshold values is prepared so that the number of elements allocated to each threshold value is not equal to each other.

Analysis of the test results of FIG. 42 show tendency as described below.

(1) When the error diffusion image conversion process is performed with the 50% distribution threshold matrix, noises appear noticeable at image portions with darkness levels of 50% in comparison with other image portions.

(2) When using other threshold matrices, a darkness level that suffers from noises changes. That is, as the distribution rates of the two thresholds in the threshold matrix changes, the darkness level that suffers from noises also changes. In other words, there exists high relationship between the distribution rates of the two threshold values in the threshold matrix to be used and the density level that will suffer from noises.

(3) A darkness level that suffers from noises (which will be referred to as "noise-generating darkness level," hereinafter) largely changes when the distribution rates of the two threshold values are changed a little. In addition, the range of the noise-generating darkness level is very small with respect to the total range of input image density. When the 50% threshold matrix Mat2( ) is used in the error diffusion image conversion process, noises will appear in image portions with 50% darkness level in resultant pseudo-halftone images. It is noted, however, that the darkness level of 50% frequently appears in continuous tone images. In other words, continuous tone images have large areas with the 50% darkness level.

Taking the above into consideration, according to the present embodiment, the threshold matrix Mat2( ) is produced so that the distribution rates of the "1" data-assigned elements and the "0" data-assigned elements are set not to be equal to each other. That is, the total number of "1" data assigned-elements is not equal to the total number of "0" data-assigned elements. Accordingly, image portions with 50% darkness level will not become noisy. It is thus possible to prevent occurrence of noises in any image portion, which is desired not to be noisy, through controlling the distribution rates for the "1" data-assigned elements and the "0" data-assigned elements.

For example, the distribution rates for the "1" data-assigned elements and the "0" data-assigned elements may be controlled dependent on the distribution rates of respective density levels in a continuous tone image to be processed. That is, the distribution rates for the "1" data-assigned elements and the "0" data-assigned elements may preferably be set so that noises will be generated at a density level which is not included in the continuous tone image to be processed. Or, the distribution rates for the "1" data-assigned elements and the "0" data-assigned elements may be set so that noises will be generated at a density level which does not frequently appear in the continuous tone image to be processed.

Thus, the distribution rates of the "1" data-assigned elements and the "0" data-assigned elements are preferably set in correspondence with a density of an image portion, in the continuous tone image to be processed, that has the minimum area in the entire image. In other words, the threshold value distribution rates in the matrix are set in correspondence with a density level of an image portion that has an area with a minimum rate with respect to the entire area of the image. Or, the distribution rates of the "1" data-assigned elements and the "0" data-assigned elements are preferably set in correspondence with a density of an image portion, in the continuous tone image, that has an area smaller than both an area of another image portion with an immediately higher density and an area of still another image with an immediately lower density. In other words, the threshold value distribution rates in the matrix are set in correspondence with a density level of an image portion that has an area with a lower-peak rate with respect to the entire area of the image.

In addition, as apparent from FIG. 42, there are some density levels that cause noises to appear noticeable when the noises are introduced through the error diffusion image conversion process. There are other density levels that cause noises not to appear noticeable even when the noises are introduced. For example, when pseudo-halftone images obtained through the image conversion process are printed by printers such as ink jet printers, noises appear noticeable in bright regions defined by low darkness levels [%]. Contrarily, noises do not appear noticeable in dark regions defined by high darkness levels [%]. This phenomenon occurs due to dot gains. Accordingly, it is possible to prevent noises from appearing noticeable in resultant output images through setting the number of "1" data-assigned elements, to be located with the bright side threshold H2, larger than that of the "0" data-assigned elements to be located with the dark side threshold H1. For example, a 75% threshold matrix Mat2( )-2 is preferably produced and used in the image conversion process. In this threshold matrix, a distribution rate of the "1" data-assigned elements, to be located with the bright side threshold H2, is 75%. That is, the rate of the number of the "1" data-assigned elements with respect to the number of all the elements is about 75%.

Figure 43:
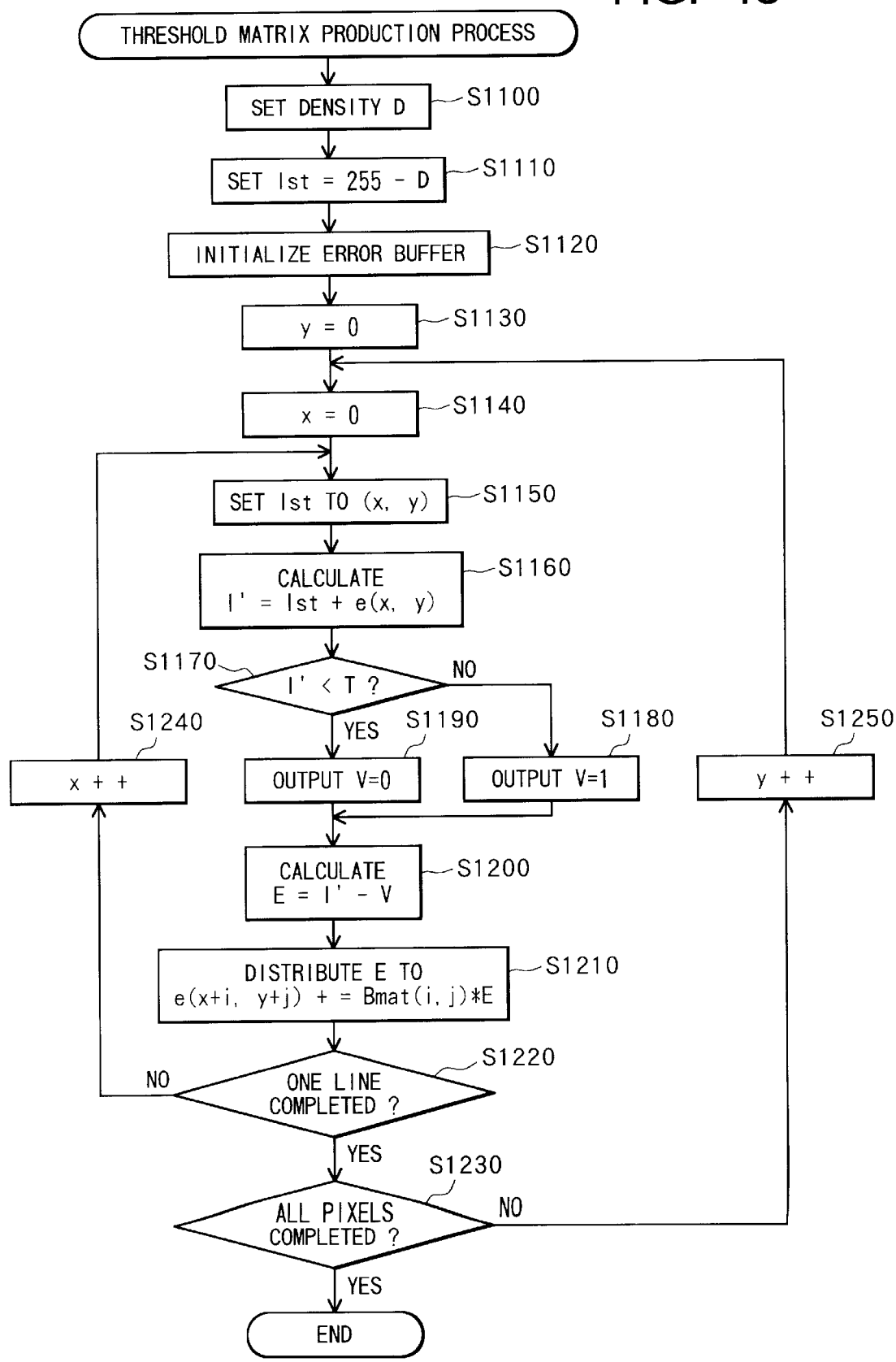
FIG. 43 is a flow chart of a bilevel threshold matrix production process according to a tenth embodiment.

The present embodiment therefore provides a method of producing a threshold matrix Mat2( ) with desired distribution rates of "1" data-assigned elements and "0" data-assigned elements as shown in FIG. 43. The threshold matrix Mat2( ) is for subjecting continuous tone images, whose density levels are discretely distributed in 256 levels from 0 to 255, to the error diffusion conversion process of FIGS. 9 and 10. It is noted that a density level of zero (0) indicates black, and density level of 255 indicates white.

First, in S1100, a density level D in the range of 0 to 255 ($0 \leq D \leq 255$) is set as a density level at which occurrence of noises is permitted. It is assumed that a continuous image to be processed has no area with a certain density value or has only a small area with that density. This density value is set as the density level D. It is noted that this density level D can be set by an operator. Or, the density level D can be set based on examination of a histogram which is produced for the continuous tone image. This method will be described later.

Next, in S1110, a reference density Ist is calculated in the following formula:

$$Ist = 255 - D.$$

It is noted that the reference density Ist is used for producing a bilevel threshold matrix Mat2( ). The calculated value Ist is stored in a reference density storage area (not shown) prepared in the threshold matrix memory 14. Then, the error buffer 16 is initialized to have zero values in S1120. Variables x and y are initialized to zero (0) in S1130 and S1140. The variables x and y are for defining a subject element position in a bilevel threshold matrix Mat2( ) to be produced. Then, in S1150, a density value for a subject element position (x, y) is set to the reference density value Ist.

The following processes from S1150 are equivalent to the error-distributing binary conversion process, as employed in the process of FIG. 12, for converting a uniform density element matrix Di with a density of Ist into a binary element matrix Fi. That is, in S1160, an error sum e(x, y) is retrieved from a corresponding memory location (x, y) in the buffer memory 16. The error sum e(x,y) is an accumulated amount of errors distributed from already-processed twelve neighboring elements. The density value Ist is then modified by the error sum e(x, y). That is, the modified density I'(x, y) is calculated through the following formula:

$$I'(x, y) = Ist + e(x, y).$$

In S1170, the modified density I'(x, y) is compared with a fixed threshold value T of 128. When I'(x, y)$\geq$T (no in S1170), the subject element is turned ON in S1180. That is, the subject element density is converted into an output density value V(x,y) of one (1). The value "1" is written into a corresponding element position of a bilevel matrix Mat2( ) prepared in the threshold matrix memory 14. When I'(x, y)<T (yes in S1170), on the other hand, the subject element is turned OFF in S1190. That is, the subject element density is converted into an output density value V(x,y) of zero (0). The value "0" is written into a corresponding element position of the bilevel matrix Mat2( )in the threshold matrix memory 14.

Next, in S1200, a binary conversion error E(x, y) is calculated for the subject element (x, y) in the following formula:

$$E(x, y) = I'(x, y) - V(x, y)$$

Thus produced binary conversion error E(x, y) is then distributed to an error buffer (x+i, y+j) for each of neighboring twelve elements not yet processed. The error E(x, y) is distributed to the neighboring elements in a weighted basis defined by the predetermined error diffusion matrix Bmat'( ) as expressed by the following formula:

$$e(x+i, y+j) += Bmat'(i,j) \times E(x, y)$$

wherein += is an operator for calculating a sum of a distributed fraction of the error E(x, y) and a value already stored in the error buffer (x+i, y+j). A representative example of the matrix Bmat'(,) is shown in FIG. 3. The matrix Bmat'( ) is stored in the memory 13.

Next, in S1220, it is judged whether or not all the elements in the present element line along the main scanning direction (x direction) have been processed. When any elements remain unprocessed (no in S1220), a element position is shifted to the next element position (x+1, y) in S1240, and the process returns to S1150. Then, the process from S1150 is repeated.

When all the elements have been processed in the subject element line (yes in S1220), on the other hand, it is judged in S1230 whether or not all the elements in the matrix have been processed. When any elements remain unprocessed (no in S1230), the element position is shifted to the next element line in the auxiliary scanning direction in S1250. That is, y is incremented by one. Then, the process returns to S1140. Then, the process from S1140 is repeated. When all the elements have been processed (yes in S1230), on the other hand, this process ends. At this time, the threshold matrix memory 14 stores therein a bilevel threshold matrix Mat2( ) where binary density data V(x, y) are set at all the element positions (x, y). That is, each element is assigned with either "0" or "1".

Thus, according to the present embodiment, the noise-permitted density level D is set, and the reference density Ist is determined based on the density level D. Then, the reference density Ist is converted into a binary value with using the threshold value T, 128 in this example. Accordingly, the rate of the number of the "0" data-assigned elements with respect to the number of all the matrix-constituting elements is equal to D/256. The rate of the number of the "1" data-assigned elements with respect to all the matrix-constituting elements is equal to Ist/256=(256−D)/256.

When the threshold matrix Mat2( ) having the above-described distribution rates of the "0" data-assigned elements and the "1" data-assigned elements is used in the image conversion process of FIG. 9, the bright side threshold value H2 will be located with "1"-assigned elements, and the dark side threshold value H1 will be located with "0"-assigned elements. Accordingly, noises will appear at image portions with a density value D.

Because the density level D can be freely set within the range of 0 to 255, the rate of the number of "1"-assigned elements with respect to the number of all the matrix-constituting elements can be freely set, and the rate of the number of "0"-assinged elements with respect to the number of all the matrix-constituting elements can be freely set. When the bright side threshold value H2 and the dark side threshold value H1 are set to the values "1" and "0" and a continuous tone image is converted into a pseudo-halftone image with using the threshold values H2 and H1 through the process of FIGS. 9 and 10, areas with the density D in the pseudo-halftone image will be generated with noises. Because the original continuous tone image has no area with the density D or has only a small area with the density D, the noises will not appear noticeable in the entire resultant pseudo-halftone image.

It is unnecessary that the operator does not know the accurate density distribution state of a continuous tone image to be processed, and therefore that the operator does not know which level should be set as the density level D. In this case, the operator may first set the density level D as a trial value (128, for example). Then, a bilevel threshold matrix Mat2( ) is produced through the above-described process of FIG. 43. In the produced matrix Mat2( ), the number of the "1"-assinged elements is equal to the number of "0"-assinged elements. This is because D/256=0.50. Then, the image conversion process of FIG. 9 is performed onto the continuous tone image with the thus produced matrix Mat2( ). If it is confirmed that a pseudo-halftone image is produced as noisy, the process of FIG. 43 may be performed again while resetting the density level D to a value which is away from the value of 128. For example, the value D is reset to a value that can cause the value of D/256 to have a value of 0.75, 0.15, or the like. Then, the above-described process of FIG. 43 is performed again to produce another threshold matrix Mat2( ). Then, the halftone image is again converted into a pseudo-halftone image with the thus produced matrix Mat2( ).

It is noted that regardless of this adjustment operation, the resultant pseudo-halftone image may possibly be still noisy. This is because the newly-set density level D will induce noises at another density region in the image. In such a case, the above-described process of FIG. 43 may be repeatedly performed while repeatedly changing the density level D until an allowable quality pseudo-halftone image will be obtained.

As described above, according to the above-described operation, the density level D for permitting occurrence of noises is set in S1100. Then, based on the density level D, the reference density level Ist is calculated in S1110 for producing a bilevel threshold matrix. Then, the reference density Ist is set as input density for a subject element position (x, y) in S1150. A modified density value I' is calculated based on the error buffer value e(x,y) in S1160. Then, the modified value I' is compared with a threshold value T in S1170, and an output density V is calculated in S1180 or S1190. Then, an error value E is calculated in S1200. The error value is distributed to neighboring elements with using the error diffusion matrix in S1210. The above-described process is performed onto a predetermined-sized matrix. As a result, a bilevel threshold matrix Mat2( ) of the predetermined size is obtained. The bilevel threshold matrix Mat2( ) is used in the error diffusion image conversion process to convert continuous tone images into pseudo-halftone images.

It is noted that the density level D and the reference density value Ist can be automatically set. That is, the steps S1100 and S1110 in FIG. 43 may be replaced with steps S1500–S1525 shown in FIG. 44.

Figure 45:
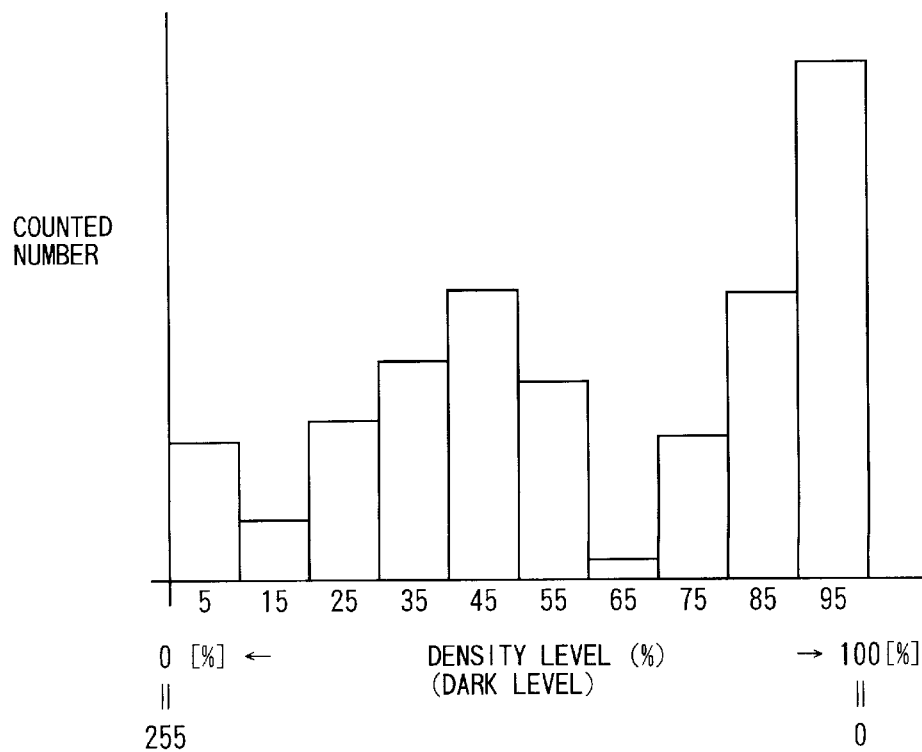
FIG. 45 is a histogram for density distribution of the continuous tone image.

In S1500, the CPU 12 receives data of a continuous tone image desired to be converted into a pseudo-halftone image. Then, in S1510, the CPU 12 counts the total number of pixels for each density level. The CPU 12 then produces a histogram showing the detected result. An example of the histogram is shown in FIG. 45. In the histogram, the horizontal axis denotes density levels in the range of 0 to 255 as darkness level values of 100% to 0%. That is, the density level of 255 corresponds to the darkness level value of 0%, and the density level of zero (0) corresponds to the darkness level value of 100%. Distribution states of respective densities in the continuous tone image is represented by a plurality of rectangles in the histogram. Each rectangle has a width indicative of a class interval of a predetermined density width, ten (10) %, for example.

Next, in S1520, the histogram of FIG. 45 is searched to determine a density level that is darker than the 50% darkness level and that has the minimum distribution rate. That is, the CPU 12 searches a density level whose darkness level is higher than 50% and whose corresponding rectangle has the smallest height. Or, the CPU 12 may search a density level that is darker than 50% darkness level and whose distribution rate presents a low peak. That is, the CPU 12 searches a density level whose darkness level is higher than 50% and whose corresponding rectangle has a height smaller than heights in both of two rectangles that sandwich the subject rectangle therebetween. The thus searched density level is set as the density level D.

In the example of the continuous tone image having the histogram of FIG. 45, the density level of 65% is selected in S1520. Accordingly, a corresponding density level of 89 ($\approx$255x (1−0.65)) is set as the density level D. Then, the reference density Ist is set to 166 (=255−89) in S1525 based on the thus set density level D. Then, the process from S1120 in FIG. 43 is performed.

As described above, in S1520, the density level D is selected from density regions darker than the density of 50%. This is because as shown in FIG. 42, noises do not appear noticeable in dark regions due to dot gains. The density level D is selected also as a density level of an image portion whose area has the smallest or small peak value throughout the entire continuous tone image. Accordingly, even when noises are generated in the image portion of the selected density level D, the noises will not appear noticeable in the entire image.

Thus, according to the above-described method, a threshold matrix Mat2( ), which is capable of producing a -less noisy pseudo-halftone image, can be automatically produced in correspondence with the continuous tone image to be processed. The operator does not need to repeatedly perform the operation of FIG. 43 to seek a threshold matrix Mat2( ) suitable for the continuous tone image to be processed.

In the above-described process of FIG. 43, the threshold matrix Mat2( ) of the desired distribution rates is produced through the error distribution binary conversion process, in which a density i of the uniform density element matrix Di is adjusted to the value Ist in S1110. Then, the matrix Di is converted into a binary matrix Fi, and the matrix Fi is stored as the threshold matrix Mat2( ). However, the threshold value T, employed in S1170 for performing the error diffusion binary conversion operation, may be adjusted so that a threshold matrix Mat2( ) will be produced to have threshold values "0" and "1" with desired distribution rates.

In addition, the binary matrix Mat2( ) obtained through the process of FIG. 43 may be further subjected to the process of FIG. 30 or 31 of the eighth embodiment. In this case, the process may be stopped when a threshold mask having desired distribution rates of threshold values is obtained. Thus, it is possible to obtain a threshold matrix with threshold values with desired distribution rates.

The threshold matrix Mat2( ) having desired distribution rates of "1"-assigned elements and "0"-assigned elements can be produced also through the process of FIG. 5 employing the blue noise mask production method. That is, the process of FIG. 5 may be modified as described below.

Figure 44:
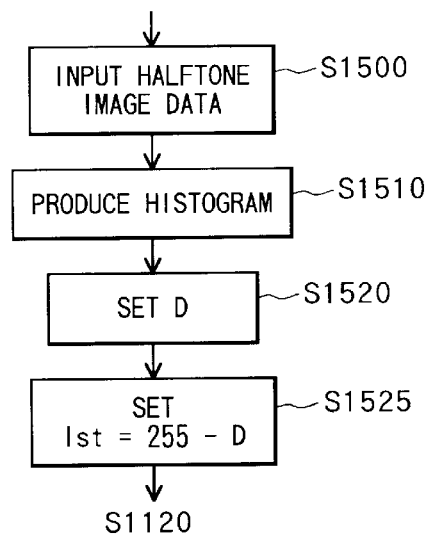
FIG. 44 show a process for investigating density distribution of a continuous tone image to be processed and for setting a reference density according to the investigated result.

When a binary matrix is first prepared with randomly arranged two kinds of values "0" and "1" in S100, the number of elements to be assigned with "0" and the number of elements to be assigned with "1" are adjusted so that a bilevel threshold matrix Mat2( ) with desired distribution rates of "0" data-assigned elements and "1" data-assigned elements will be obtained in S150. More specifically, before the process of FIG. 5 is started, the above-described steps of S1100 to S1110 in FIG. 43 or the above-described steps of S1500–S1525 in FIG. 44 are attained to determine the reference density Ist. When the process of FIG. 5 is started, the step of S100 is modified as described below. That is, when randomly locating the values of zero (0) and one (1) to all the element positions, the random operation is attained so that the number of "0"-assigned elements and the number of "1"-assigned elements will satisfy the following relationship:

[the number of "1"-assigned elements]:[the number of "0"-assigned elements]=Ist:D=(255−D):D.

This operation is performed by controlling generation rates of respective random numbers.

Then, the processes of S110 through S150 are performed in the same manner as in the first embodiment. The thus produced bilevel threshold matrix Mat2( ) can convert the continuous tone image into a pseudo-halftone image which suffers from no noises and therefore which has high quality.

The threshold matrix Mat2( ) with desired distribution rates of the "1"-assigned elements and the "0"-assigned elements can be produced through the error-distributing binary conversion process employed in the second embodiment. In this case, the process of FIG. 12 in the second embodiment is performed in the same manner as described in the second embodiment except for points described below. That is, before the process of FIG. 12 is started, the above-described steps of S1100 to S1110 in FIG. 43 or the above-described steps of S1500–S1525 in FIG. 44 are attained to determine the reference density Ist. When the continuous tone image having the histogram of FIG. 45 is desired to be processed, the density value D is set to 65%, and the density value Ist is set to 166 (=255−255 x (1−0.65)). Then, the process of FIG. 12 is started in the same manner as described in the second embodiment except that the desired density value, referred to in S460 in the process, is set as the reference density value Ist (=166 in the example). Accordingly, in S460, the present uniform density value i is compared with the density value of 166. The routines from S440 to S470 are therefore repeated until i reaches 166. When a binary element matrix F166 is finally produced, the binary element matrix F166 is stored in the threshold matrix memory 14 in S480 as a binary threshold matrix Mat2( ). In the thus produced matrix F166, "0" dots and "1" dots are dispersed uniformly to a proper degree and nonperiodically. Additionally, the ratio between the number of "0" dots relative to the number of "1" dots is properly set as the desired value in correspondence with the continuous tone image to be processed. The thus produced matrix F166 can convert the continuous tone image indicated by the histogram of FIG. 45 into a pseudo-halftone image which suffers from no noises and therefore which has high quality.

Thus, the plurality of uniform density matrices Di are successively converted into binary value matrices until the uniform density matrix Di (i=Ist) with a desired density Ist is converted into a binary value matrix. The desired density is determined in correspondence with desired distribution rates, with which the two threshold values are desired to be distributed in the threshold matrix. Then, the finally-produced binary element matrix Fi is used as the threshold matrix in which two threshold values are distributed with the desired distribution rates.

It is noted that in each binary matrix Fi, "0" dots and "1" dots are dispersed uniformly to a proper degree and nonperiodically. Additionally, in each binary matrix Fi, the ratio between the number of "0" dots relative to the number of "1" dots properly corresponds to the uniform density value i. Accordingly, all the binary element matrices F1 through F165 which are produced during the process of FIG. 12 may be stored in the memory together with the binary element matrix F166. When any other continuous image is to be processed, the reference value Ist is set to some value i in the range of 1 to 165 in the process of S1110 or S1525. In this case, a corresponding binary value matrix Fi where i=Ist can be simply retrieved and used as a bilevel threshold matrix Mat2( ) during the image conversion process of FIG. 9.

Similarly, all the uniform density element matrices D1–D254 may be converted into binary element matrices F1–F254 as described shown in the seventh embodiment, and the matrices F1–F254 may be stored in the memory. Then, according to the set reference value Ist, a corresponding binary value matrix Fi whose value i is equal to Ist can be used as a bilevel threshold matrix Mat2( ) during the image conversion process of FIG. 9.

It is noted that the above-described binary element matrix production process can be performed in the same manner as in the third through fifth embodiments.

It is also possible to obtain a bilevel threshold matrix with desired "0" and "1"-element distribution rates through repeatedly performing either the process of FIG. 30 or 31 onto an original threshold mask Mat2( ) as produced through the process of FIG. 5. In this case, the process is stopped when a threshold mask is obtained to have desired distribution rates of "1"-assigned elements and "0"-assigned elements. Also in this case, it is possible to obtain a threshold matrix with two threshold value-assigned elements at desired distribution rates.

Further, in the same manner as in the sixth and seventh embodiments, a plurality of binary element matrices may be produced through repeatedly performing the processes of S440–S470 of FIG. 12 until reaching the desired density value i of Ist (166, in this example) or until all the uniform density matrices D1–D254 are converted into binary density matrices F1–F254. Then, a multilevel threshold matrix is produced based on the plurality of binary element matrices. For example, all the uniform density matrices D0–D255 may be converted into binary matrices F0–F255. Then, at each element position (x,y), the total number S(x,y) of turned-on elements ("1"-assigned elements) is counted throughout all the binary matrices F0–F255. It is noted that the total number or accumulated value S(x,y) is a value of either one in a range of 0 to 255. Accordingly, a table is created to list all the element positions (x,y) in accordance with their counted values S(x,y) of 0 to 255 in the order of the amount of the counted values S(x,y) from zero (0) toward 255. Alternatively, the table is created to list all the element positions (x,y) in accordance with their counted values S(x,y) of 0 to 255 in the reversed order from zero 255 toward zero (0). If each binary matrix Fi has a size of 128×128, for example, this table is prepared so as to list all the 16,384 element positions in accordance with their counted values S(x,y). Thus, this table is stored instead of a threshold matrix.

When converting a continuous image into a pseudo-continuous image through the process of FIG. 9, the table is divided into several blocks according to the reference density Ist or the density level D. It is now assumed that the continuous tone image whose density distribution is represented by the histogram of FIG. 45 is desired to be converted into a pseudo-halftone image. In this case, a bilevel threshold matrix Mat2( ) is produced so as to generate noises in the 65% darkness level. In this case, the density level D is set in a range of 76 through 102. That is, D=255 x (1−0.7) through 255 x (1−0.6)≈76 through 102. Accordingly, the entire length of the table is divided into two sections at a position 35% distant from the lowest counted number S. Then, the dark side threshold value H1 is allocated to those element positions set in the portion of the table in a counted number smaller side of the 35% position. The bright side threshold value H2 is allocated to those element positions set in the portion of the table in a counted number larger side of the 35% position. For example, the dark side threshold value H1 is allocated to positions numbered one to 5,734, and the bright side threshold value H2 is allocated to positions numbered 5,735 to 16,384. It is therefore possible to produce a bilevel threshold matrix which can produce pseudo-halftone images in which no noises appear noticeably. Thus, the table is divided into several sections at a desired ratio. Then, one of the two threshold values is allocated to each section. The threshold value is set to all the element positions set in the corresponding block.

As apparent from the above, it is possible to produce a threshold matrix in which two or more threshold values are distributed at any desirable rates. That is, a plurality of discrimination values are stored in the table together with their element positions. The table may be divided into several blocks of several sizes so that each of the plurality of discrimination values is allocated to each of several kinds of threshold values. In this case, the sizes of the several blocks may be freely adjusted so that the distribution rates of the threshold values can be freely adjusted.

Additionally, the threshold matrix can be produced in the same manner as in the eighth embodiment. That is, after the processes of FIGS. 30 and 31 are completed and a multilevel threshold matrix is produced, the following operation is attained. In the produced multilevel threshold value matrix, the number of the different kinds of threshold values distributed in the matrix is equal to the total number of its constituting elements. A table is prepared to list all the element positions in accordance with their threshold values in the order from the lowest value toward the highest value or in the reversed order from the highest to the lowest. The table is then divided into several blocks in accordance with the reference density value Ist or the density level D. Then, several different threshold values are allocated to the respective blocks. It is therefore possible to easily produce a threshold value matrix in which several threshold values are distributed at any desired rates.

According to the present embodiment, when the threshold matrix is distributed with "n" number of different kinds of threshold values (where n is an integer equal to or higher than two and equal to or lower than the total number of elements in the threshold matrix), the distribution rate of each threshold is preferably set not to equal to each other. That is, the total number of elements allocated with any one threshold value is not equal to the number of elements allocated with any other threshold value. Accordingly, pseudo-halftone images at the 50% darkness level will not suffer from undesirable noises.

The distribution rate for each of the "n" number of different kinds of thresholds is set so that noises will not occur or will not appear noticeable. More specifically, the distribution rates for the "n" number of different kinds of thresholds are set dependent on the distribution rates of respective density levels in a continuous tone image to be processed. That is, the distribution rate for each threshold is set so that noises will occur at a density level which is not included in the continuous tone image to be processed. Or, the distribution rate for each threshold is set so that noises will occur at a density level whose distribution rate in the continuous tone image is very small. When the continuous tone image is processed with the threshold matrix, a binary image with no noticeable noises is produced. For example, the distribution rate for each threshold in the threshold matrix is set in correspondence with a value of a density, in the original continuous tone image, that has the minimum or lower peak distribution rate.

It is now assumed that the "n" number of different kinds of threshold values include: a first group of threshold values which is comprised of threshold values which are higher than a 50% of the inputtable highest density of the continuous tone image; and a second group of threshold values which is comprised of threshold values which are lower than the 50% of the inputtable highest density of the continuous tone image. For example, the "n" number of different kinds of threshold values include: a first group of threshold values higher than 128; and a second group of threshold values which are lower than 128. In this case, according to the present embodiment, the total number of elements assigned to the threshold values of the first group is set different from the total number of elements assigned to the threshold values of the second group. For example, when n=2, the total number of elements assigned to the bright side threshold value higher than 128 is set different from the total number of elements assigned to the dark side threshold value lower than 128.

It is noted that data of the method for producing the threshold matrix and the method for performing the error diffusion image conversion process of the above-described embodiments can be stored as a program to be executed by a computer system, for example. The program can be stored in a storage medium such as a floppy disk, a magnetooptical disk, a CD-ROM or the like. The program will be loaded to the computer system to be used when needed. The program can be stored in other types of storage media such as a ROM, a back up RAM, etc. The ROM or the back up RAM will be installed in the computer system.

While the invention has been described in detail with reference to specific embodiments thereof, it would be apparent to those skilled in the art that various changes and modifications may be made therein without departing from the spirit of the invention.

For example, in the second embodiment, the desired density i of 128 may be set in S430, and a binary-converted result obtained in S440 may be stored in the threshold value matrix storage portion 14 as a binary matrix F128.

In the fourth embodiment, the minimized average error method is employed. However, the error diffusion method can be used. Both of the minimized average error method and the error diffusion method can be employed in the error-distributing binary conversion process employed in the threshold matrix production process of each of the above-described embodiments.

The threshold matrix may be produced so that each element is used for processing a corresponding one pixel in the continuous tone image to be processed. However, one threshold value on one element position can be used for processing several pixels, that are located neighboring to one another, on the continuous tone image.

The thus produced threshold value matrix may be stored in a ROM, and can be used in various types of image forming devices, such as a laser printer, an ink jet printer, and a copy machine, and in various types of image reading devices such as an image scanner.

The bilevel threshold matrix, produced through the error-distributing binary conversion process of the second through seventh, and tenth embodiments, can be further subjected to the location arrangement process of S110–S140 as employed in the blue noise mask production process so that a further desired distribution state can be obtained.

In the above-described embodiments, when the bilevel threshold matrix Mat2( ) is produced from values "0" and "1", the matrix Mat2( ) is stored in the memory. However, the matrix Mat2( ) may be allocated with the bright side threshold value H2 and the dark side threshold value H1 in accordance with the values "0" and "1," before being stored in the memory. The matrix Mat2( ) can be directly applied to the image conversion process of FIG. 9.

In the above description, the image conversion process in each of FIGS. 1, 9 and 37 employs the error diffusion binary conversion method. However, the image conversion process in each of FIGS. 1, 9 and 37 can employ other various types of error distribution binary conversion methods. That is, each image conversion process can be designed so as to convert density at each pixel into a binary value with using the threshold matrix Mat2( ) while distributing binary errors to neighboring pixels. For example, each image conversion process can employ the minimized average error method. That is, the process of FIG. 9 can be modified as described below. In S240, the binary error sum e(x,y) may be calculated with using the already-described coefficient matrix a based on binary errors E which have been generated during the conversion process at neighboring twelve pixels. That is, the processing of S240 can be modified to calculated the following formula:

$$e(x,y) = (1/\Sigma \alpha ab) \times \Sigma(\alpha ab \times Eab)$$

Eab is a binary conversion error E(x+a,y+b) generated at a neighboring element (x+a,y+b), and aab (where $-2 \leq a \leq 2$, $-2 \leq b \leq 0$) is a coefficient value located at a location (a, b) in the coefficient matrix a as shown below.

$$\alpha \equiv \begin{pmatrix} 1 & 3 & 5 & 3 & 1 \\ 3 & 5 & 7 & 5 & 3 \\ 5 & 7 & * & & \end{pmatrix}$$

The neighboring element (x+a,y+b) is located at a position corresponding to a location (a, b) relative to the subject element (x,y) indicated by * in the coefficient matrix α. The error Eab, i.e., E(x+a,y+b) is retrieved from a corresponding location (x+a,y+b) of the error buffer 16. Then, the subject density value I(x,y) is added with a sum e of the error fractions distributed from the already-processed twelve neighboring elements. Then, the same processings are performed in S250–S290. In S300, the error sum E calculated in S290 for the subject pixel (x,y) is simply stored in the error buffer 16 at the corresponding location (x,y).

In the above description, the sum e(x,y) for the subject pixel (x,y) is obtained based on twelve already-processed neighboring pixels. However, the sum e(x,y) can be obtained based on only two already-processed pixels. In this case, the matrix α can be simplified in the similar manner as the matrix Bmat( ) shown in FIG. 11. Still in this case, it is possible to obtain sufficiently high quality pseudo-halftone images.

What is claimed is:

1. A method for converting a continuous tone image into a pseudo-halftone image, the method comprising the steps of:

preparing a threshold matrix which has several elements which are two-dimensionally arranged, each element defining one threshold value receiving data of a continuous tone image desired to be converted into a pseudo-halftone image, the continuous tone image having a plurality of pixels which are two-dimensionally arranged, each pixel having one density value; and subjecting all the pixels of the continuous tone image to an error-distribution binary conversion process using the threshold matrix, to thereby convert the density values of the pixels into binary values while distributing generated errors to neighboring pixels, wherein the threshold matrix is prepared to define the threshold values which are determined according to a blue noise mask producing manner.

2. A method as claimed in claim 1, wherein the error-distribution binary conversion process includes the steps of:

comparing a density value of each pixel on the continuous tone image with a threshold value defined by a corresponding element of the threshold matrix;

converting the density value of the pixel into a binary value based on the compared result; and diffusing an error, generated between the binary value and the density value, to neighboring pixels.

3. A method as claimed in claim 2, wherein the comparing step includes the steps of:

modifying the density value of each pixel with errors distributed from already-converted neighboring pixels; and comparing the modified density value with the corresponding threshold value.

4. A method as claimed in claim 1, wherein the threshold matrix includes a bilevel threshold matrix, each element in the threshold matrix defining either a first threshold value or a second threshold value different from the first threshold value.

5. A method as claimed in claim 4, wherein the threshold matrix preparing step includes the steps of:

preparing an initial matrix which has a plurality of elements, the plurality of elements being two-dimensionally arranged, each element having either a first value and a second value so that the first and second values being randomly arranged in the initial matrix; and rearranging the first and second values in the initial matrix, thereby converting the initial matrix into the bilevel threshold matrix having a desired distribution state of the first and second values.

6. A method as claimed in claim 5, wherein the rearranging step includes the step of repeatedly performing a replacing step for replacing the first value at one element with the second value while replacing the second value at one element with the first value.

7. A method as claimed in claim 6, wherein the replacing step includes the steps of:

calculating, for each element, density of neighboring elements that have a value equal to the value of the subject element;

determining, for the first value, a first maximum density element that has a maximum neighboring element density among all the elements that have the first value;

determining, for the second value, a second maximum density element that has a maximum density among several elements that have the second value; and setting the second value into the first maximum density element and setting the first value into the second maximum density element.

8. A method as claimed in claim 5, wherein the threshold matrix preparing step further includes the step of producing a multilevel threshold matrix based on the bilevel threshold matrix, the multilevel threshold matrix having the several elements arranged two-dimensionally, each element having either one of more than two different values, and wherein the multilevel threshold matrix producing step includes the step of repeatedly performing a first setting step for setting a value in one of several elements in the multilevel threshold matrix to be produced, the value being decremented one by one as the first setting operation is repeated.

9. A method as claimed in claim 8, wherein the first setting step includes the steps of:

replacing, with the second value, the first value in the bilevel threshold matrix at an element located within a tight cluster of elements having the first value;

setting the total number of the first values left in the bilevel threshold matrix prior to the replacement operation onto an element of the multilevel threshold matrix that corresponds to the element of the bilevel threshold matrix, at which the first value is replaced with the second value.

10. A method as claimed in claim 9, wherein the multilevel threshold matrix producing step further includes the step of repeatedly performing a second setting step for setting a value in one of the several elements in the multilevel threshold matrix to be produced, the value being incremented one by one as the second setting operation is repeated.

11. A method as claimed in claim 10, wherein the second setting step includes the steps of:

replacing, with the first value, the second value in the bilevel threshold matrix at an element located within a void where elements having the first value are thinly dispersed;

setting the total number of the first values left in the bilevel threshold matrix after the replacement operation onto an element of the multilevel threshold matrix that corresponds to the element of the bilevel threshold matrix, at which the second value is replaced with the first value.

12. A method as claimed in claim 1, wherein the error-distribution binary conversion process step subjects all the pixels of the continuous tone image to an error-diffusion binary conversion process with using the threshold matrix, to thereby convert the density values of the pixels into binary values while diffusing generated errors to neighboring pixels.

13. A method as claimed in claim 1, wherein the error-distribution binary conversion process step subjects all the pixels of the continuous tone image to a minimized average error process with using the threshold matrix, to thereby convert the density values of the pixels into binary values while distributing generated errors to neighboring pixels.

14. A method for converting a continuous tone image into a pseudo-halftone image, the method comprising the steps of:

preparing a threshold matrix which has several elements which are two-dimensionally arranged, each element defining one threshold value;

receiving data of a continuous tone image desired to be converted into a pseudo-halftone image, the continuous tone image having a plurality of pixels which are two-dimensionally arranged, each pixel having one density value; and subjecting all the pixels of the continuous tone image to an error-distribution binary conversion process using the threshold matrix, to thereby convert the density values of the pixels into binary values while distributing generated errors to neighboring pixels, wherein the threshold matrix preparing step includes the steps of:

preparing a uniform density matrix provided with several elements which are arranged two-dimensionally and which have equal density values;

subjecting all the elements of the uniform density matrix to an error-distribution binary conversion process to convert the density values of the elements into binary values while distributing generated errors to neighboring elements, thereby producing a binary value matrix based on the binary values produced for at least a part of all the elements; and producing the threshold matrix based on the binary values located at least within a part of the binary value matrix.

15. A method as claimed in claim 14 wherein the error-distribution binary conversion process includes the steps of:

comparing a density value of each element on the uniform density matrix with a predetermined threshold value;

converting the density value of the pixel into a binary value based on the compared result; and distributing an error generated between the binary value and the density value to neighboring elements.

16. A method as claimed in claim 15, wherein the comparing step includes the steps of:
   modifying the density value of each element with errors distributed from already-converted neighboring elements; and
   comparing the modified density value with the predetermined threshold value.

17. A method as claimed in claim 14, wherein the uniform density matrix preparing step prepares a plurality of uniform density matrices for a plurality of density values, each uniform density matrix being provided with several elements which are arranged two-dimensionally and which have a corresponding density value, and
   wherein the error-distribution binary conversion step successively subjects the plurality of uniform density matrices to the error-distribution binary conversion process to convert the density values of the elements in each uniform density matrix into binary values while referring to binary values at corresponding elements on another already-processed uniform density matrix and while distributing generated errors to neighboring elements on the same uniform density matrix, thereby producing a plurality of binary value matrices.

18. A method as claimed in claim 17, wherein the threshold matrix preparing step further includes the step of producing a bilevel threshold matrix based on a binary value matrix which is produced through subjecting the uniform density matrix having a desired density to the error-distribution binary conversion process.

19. A method as claimed in claim 17, wherein the threshold matrix preparing step further includes the step of producing a threshold matrix through accumulating, at each element position, the binary values of all the produced plurality of binary value matrices and determining, based on the accumulated result, the threshold value of an element located at a corresponding position in the threshold matrix.

20. A method as claimed in claim 17, wherein the error-distribution binary conversion step subjects each uniform density matrix to the error-distribution binary conversion process to convert the density value at each element in the uniform density matrix into a binary value dependent on a binary value of a corresponding element on another uniform density matrix which has been already processed and which has a density value closest to that of the uniform density matrix.

21. A method as claimed in claim 20, wherein the density value of each element on each uniform density matrix is converted compulsively into a first value with a generated error being distributed to neighboring elements when a corresponding element on a closest uniform density matrix, which has been already processed and which has a density value closest to that of the uniform density matrix, has been converted to the first value.

22. A method as claimed in claim 17, wherein the error-distribution binary conversion step subjects each uniform density matrix to the error-distribution binary conversion process to convert the density value at each element in the uniform density matrix into a binary value dependent on both a binary value at a corresponding element on a higher-closest uniform density matrix, which has been already processed and which has a density value closest to and higher than that of the uniform density matrix, and a binary value of a corresponding element on a lower-closest uniform density matrix, which has been already processed and which has a density value closest to and lower than that of the uniform density matrix.

23. A method as claimed in claim 22, wherein the density value of each element on each uniform density matrix is converted compulsively into a first value with a generated error being distributed to neighboring elements when both of a corresponding element on the lower-closest uniform density matrix and a corresponding element on the upper-closest uniform density matrix have been converted to the first value, and
   wherein the density value of each element on each uniform density matrix is converted compulsively into a second value with a generated error being distributed to neighboring elements when both of a corresponding element on the lower-closest uniform density matrix and a corresponding element on the upper-closest uniform density matrix have been converted to the second value.

24. A method as claimed in claim 14, wherein the threshold matrix producing step includes the step of producing a bilevel threshold matrix based on the binary values produced for a part of all the elements.

25. A method as claimed in claim 14, wherein the error-distribution binary conversion process includes the steps of:
   comparing a density value of each pixel on the continuous tone image with a threshold value defined by a corresponding element of the threshold matrix;
   converting the density value of the pixel into a binary value based on the compared result; and
   diffusing an error, generated between the binary value and the density value, to neighboring pixels.

26. A method as claimed in claim 25, wherein the comparing steps includes the steps of:
   modifying the density value of each pixel with errors distributed from already-converted neighboring pixels; and
   comparing the modified density value with the corresponding threshold value.

27. A method as claimed in claim 14, wherein the error-distribution binary conversion process step subjects all the pixels of the continuous tone image to an error-diffusion binary conversion process with using the threshold matrix, to thereby convert the density values of the pixels into binary values while diffusing generated errors to neighboring pixels.

28. A method as claimed in claim 14, wherein the error-distribution binary conversion process step subjects all the pixels of the continuous tone image to a minimized average error process with using the threshold matrix, to thereby convert the density values of the pixels into binary values while distributing generated error to neighboring pixels.

29. A method for converting a continuous tone image into a pseudo-halftone image, the method comprising the steps of:
   preparing a threshold matrix which has several elements which are two-dimensionally arranged, each element defining one threshold value;
   receiving data of a continuous tone image desired to be converted into a pseudo-halftone image, the continuous tone image having a plurality of pixels which are two-dimensionally arranged, each pixel having one density value; and
   subjecting all the pixels of the continuous tone image to an error-distribution binary conversion process using the threshold matrix, to thereby convert the density values of the pixels into binary values while distributing generated errors to neighboring pixels,
   wherein the threshold matrix preparing step includes the steps of:

storing, into a storage device, discrimination values indicative of the threshold values defined for all the elements in the threshold matrix, data amount of each discrimination value being smaller than that of a corresponding threshold value; and producing a threshold value for each element position based on a discrimination value read from the storage device at a corresponding position.

30. A method as claimed in claim 29, wherein the storing step includes the step of storing, in a table, the discrimination values of all the elements in an order of the amount of the discrimination values together with information on corresponding element positions, and wherein the threshold value production step includes the step of dividing the table into several groups in correspondence with the total number of kinds of threshold values to be used and to set one threshold value onto element positions stored at each group in the table.

31. A method as claimed in claim 29, wherein the threshold matrix is prepared to define the threshold values which are determined according to a blue noise mask producing manner.

32. A method as claimed in claim 29, wherein the threshold matrix preparing step further includes the steps of:

preparing a uniform density matrix provided with several elements which are arranged two-dimensionally and which have equal density values;

subjecting all the elements of the uniform density matrix to an error-distribution binary conversion process to convert the density values of the elements into binary values while distributing generated errors to neighboring elements, thereby producing a binary value matrix based on the binary values produced for at least a part of all the elements; and producing the threshold matrix based on the binary values located at least within a part of the binary value matrix, the discrimination values indicative of the threshold values in the threshold matrix being stored in the storage device.

33. A method as claimed in claim 29, wherein the error-distribution binary conversion process step subjects all the pixels of the continuous tone image to an error-diffusion binary conversion process with using the threshold matrix, to thereby convert the density values of the pixels into binary values while diffusing generated errors to neighboring pixels.

34. A method as claimed in claim 29, wherein the error-distribution binary conversion process step subjects all the pixels of the continuous tone image to a minimized average error process with using the threshold matrix, to thereby convert the density values of the pixels into binary values while distributing generated errors to neighboring pixels.

35. A method for converting a continuous tone image into a pseudo-halftone image, the method comprising the steps of:

preparing a threshold matrix which has several elements which are two-dimensionally arranged, each element defining one threshold value;

receiving data of a continuous tone image desired to be converted into a pseudo-halftone image, the continuous tone image having a plurality of pixels which are two-dimensionally arranged, each pixel having one density value; and subjecting all the pixels of the continuous tone image to an error-distribution binary conversion process using the threshold matrix, to thereby convert the density values of the pixels into binary values while distributing generated errors to neighboring pixels, wherein each pixel of the continuous tone image has a density in a range defined between a lowest density value S and a highest density value L, where S is equal to or higher than zero, and L is higher than S, and wherein the threshold matrix preparing step prepares the threshold matrix so that n kinds of different threshold values are distributed in the threshold matrix where n is an integer in a range from two to the total number of the elements, the n kinds of threshold values including at least a first threshold value H1 and a second threshold value H2, the first threshold value H2 being higher than the first threshold value H1, the number of the elements having the first threshold value H1 and the number of the elements having the second threshold value H2 being higher than those of elements having each of other threshold values, a sum T of the first and second threshold values H1 and H2 satisfying an inequality T>L.

36. A method as claimed in claim 35, wherein the first threshold value H1 satisfies the following formula:

$$H1 \approx S+(L-S)/4.$$

37. A method as claimed in claim 35, wherein the second threshold value H2 is preferably set to a value equal to or slightly smaller than the highest density L.

38. A method as claimed in claim 35, wherein the threshold matrix preparing step includes the step of adjusting at least one of the threshold values H1 and H2 before the error-distribution binary conversion process.

39. A method as claimed in claim 35, wherein the threshold matrix is prepared so that only the first and second threshold values H1 and H2 are distributed in the threshold matrix.

40. A method as claimed in claim 35, wherein the threshold matrix is prepared to define the threshold values which are determined according to a blue noise mask producing manner.

41. A method as claimed in claim 35, wherein the threshold matrix preparing step includes the steps of:

preparing a uniform density matrix provided with several elements which are arranged two-dimensionally and which have equal density values;

subjecting all the elements of the uniform density matrix to an error-distribution binary conversion process to convert the density values of the elements into binary values while distributing generated errors to neighboring elements, thereby producing a binary value matrix based on the binary values produced for at least a part of all the elements; and producing the threshold matrix based on the binary values located at least within a part of the binary value matrix.

42. A method as claimed in claim 35, wherein the error-distribution binary conversion process step subjects all the pixels of the continuous tone image to an error-diffusion binary conversion process with using the threshold matrix, to thereby convert the density values of the pixels into binary values while diffusing generated errors to neighboring pixels.

43. A method as claimed in claim 35, wherein the error-distribution binary conversion process step subjects all the pixels of the continuous tone image to a minimized average error process with using the threshold matrix, to thereby convert the density values of the pixels into binary values while distributing generated errors to neighboring pixels.

44. A method for converting a continuous tone image into a pseudo-halftone image, the method comprising the steps of:

preparing a threshold matrix which has several elements which are two-dimensionally arranged, each element defining one threshold value;

receiving data of a continuous tone image desired to be converted into a pseudo-halftone image, the continuous tone image having a plurality of pixels which are two-dimensionally arranged, each pixel having one density value; and subjecting all the pixels of the continuous tone image to an error-distribution binary conversion process using the threshold matrix, to thereby convert the density values of the pixels into binary values while distributing generated errors to neighboring pixels, wherein the threshold matrix preparing step prepares the threshold matrix so that n different threshold values are distributed in the threshold matrix where n is an integer in a range from two to the total number of the elements, the numbers of elements having the respective different threshold values being different from one another.

45. A method as claimed in claim 44, wherein the threshold matrix preparing step prepares the threshold matrix so that first and second threshold values are distributed in the threshold matrix, the number of first elements having the first threshold value being different from the number of second elements having the second threshold value.

46. A method as claimed in claim 45, wherein the threshold matrix preparing step includes the step of setting a rate of the number of the first elements relative to the number of the second elements.

47. A method as claimed in claim 46, the rate is set in accordance with a rate of an area of each density in the continuous tone image with respect to the total area of the continuous tone image.

48. A method as claimed in claim 47, the rate is set in correspondence with a density whose area is the minimum among all the areas for the respective densities.

49. A method as claimed in claim 48, wherein the second threshold value is higher than a 50% level of a highest density inputtable for the continuous tone image and the first threshold value is lower than a 50% level of the highest density inputtable for the continuous tone image, the number of the first elements being different from that of the second elements.

50. A method as claimed in claim 49, wherein the number of the second elements is higher than the number of the first elements.

51. A method as claimed in claim 50, wherein the rate of the number of the second elements is about 75% with respect to the total number of the elements.

52. A method as claimed in claim 44, wherein the threshold matrix is prepared to define the threshold values which are determined according to a blue noise mask producing manner.

53. A method as claimed in claim 44, wherein the threshold matrix preparing step includes the steps of:

preparing a uniform density matrix provided with several elements which are arranged two-dimensionally and which have equal density values;

subjecting all the elements of the uniform density matrix to an error-distribution binary conversion process to convert the density values of the elements into binary values while distributing generated errors to neighboring elements, thereby producing a binary value matrix based on the binary values produced for at least a part of all the elements; and producing the threshold matrix based on the binary values located at least within a part of the binary value matrix.

54. A method as claimed in claim 44, wherein the error-distribution binary conversion process step subjects all the pixels of the continuous tone image to an error-diffusion binary conversion process with using the threshold matrix, to thereby convert the density values of the pixels into binary values while diffusing generated errors to neighboring pixels.

55. A method as claimed in claim 44, wherein the error-distribution binary conversion process step subjects all the pixels of the continuous tone image to a minimized average error process with using the threshold matrix, to thereby convert the density values of the pixels into binary values of the pixels into binary values while distributing generated errors to neighboring pixels.

56. A data recording medium for storing data of a program for converting a continuous tone image into a pseudo-halftone image, the program comprising:

a program for preparing a threshold matrix which has several elements which are two-dimensionally arranged, each element defining one threshold value;

a program for receiving data of a continuous tone image desired to be converted into a pseudo-halftone image, the continuous tone image having a plurality of pixels which are two-dimensionally arranged, each pixel having one density value; and a program for subjecting all the pixels of the continuous tone image to an error-distribution binary conversion process using the threshold matrix, to thereby convert the density values of the pixels into binary values while distributing generated errors to neighboring pixels, wherein the threshold matrix is prepared to define the threshold values which are determined according to a blue noise mask producing manner.

57. A data recording medium for storing data of a program for converting a continuous tone image into a pseudo-halftone image, the program comprising:

a program of preparing a threshold matrix which has several elements which are two-dimensionally arranged, each element defining one threshold value;

a program of receiving data of a continuous tone image desired to be converted into a pseudo-halftone image, the continuous tone image having a plurality of pixels which are two-dimensionally arranged, each pixel having one density value; and a program of subjecting all the pixels of the continuous tone image to an error-distribution binary conversion process using the threshold matrix, to thereby convert the density values of the pixels into binary values while distributing generated errors to neighboring pixels;

wherein the threshold matrix preparing program includes:

a program of preparing a uniform density matrix provided with several elements which are arranged two-dimensionally and which have equal density values;

a program of subjecting all the elements of the uniform density matrix to an error-distribution binary conversion process to convert the density values of the elements into binary values while distributing generated errors to neighboring elements, thereby producing a binary value matrix based on the binary values produced for at least a part of all the elements; and a program of producing the threshold matrix based on the binary values located at least within a part of the binary value matrix.

58. A data recording medium for storing data of a program for converting a continuous tone image into a pseudo-halftone image, the program comprising:

a program of preparing a threshold matrix which has several elements which are two-dimensionally arranged, each element defining one threshold value;

a program of receiving data of a continuous tone image desired to be converted into a pseudo-halftone image, the continuous tone image having a plurality of pixels which are two-dimensionally arranged, each pixel having one density value; and a program of subjecting all the pixels of the continuous tone image to an error-distribution binary conversion process using the threshold matrix, to thereby convert the density values of the pixels into binary values while distributing generated errors to neighboring pixels;

wherein the threshold matrix preparing program includes:

a program of storing, into a storage device, discrimination values indicative of the threshold values defined for all the elements in the threshold matrix, data amount of each discrimination value being smaller than that of a corresponding threshold value; and a program of producing a threshold value for each element position based on a discrimination value read from the storage device at a corresponding position.

59. A data recording medium for storing data of a program for converting a continuous tone image into a pseudo-halftone image, the program comprising:

a program of preparing a threshold matrix which has several elements which are two-dimensionally arranged, each element defining one threshold value;

a program of receiving data of a continuous tone image desired to be converted into a pseudo-halftone image, the continuous tone image having a plurality of pixels which are two-dimensionally arranged, each pixel having one density value; and a program of subjecting all the pixels of the continuous tone image to an error-distribution binary conversion process using the threshold matrix, to thereby convert the density values of the pixels into binary values while distributing generated errors to neighboring pixels, wherein each pixel of the continuous tone image has a density in a range defined between a lowest density value S and a highest density value L, where S is equal to or higher than zero, and L is higher than S, and wherein the threshold matrix preparing program prepares the threshold matrix so that n kinds of different threshold values are distributed in the threshold matrix where n is an integer in a range from two to the total number of the elements, the n kinds of threshold values including at least a first threshold value H1 and a second threshold value H2, the first threshold value H2 being higher than the first threshold value H1, the number of the elements having the first threshold value H1 and the number of the elements having the second threshold value H2 being higher than those of elements having each of other threshold values, a sum T of the first and second threshold values H1 and H2 satisfying an inequality T>L.

60. A data recording medium for storing data of a program for converting a continuous tone image into a pseudo-halftone image, the program comprising:

a program of preparing a threshold matrix which has several elements which are two-dimensionally arranged, each element defining one threshold value;

a program of receiving data of a continuous tone image desired to be converted into a pseudo-halftone image, the continuous tone image having a plurality of pixels which are two-dimensionally arranged, each pixel having one density value; and a program of subjecting all the pixels of the continuous tone image to an error-distribution binary conversion process using the threshold matrix, to thereby convert the density values of the pixels into binary values while distributing generated errors to neighboring pixels, wherein the threshold matrix preparing program prepares the threshold matrix so that n different threshold values are distributed in the threshold matrix where n is an integer in a range from two to the total number of the elements, the numbers of elements having the respective different threshold values being different from one another.

* * * * *